(12) United States Patent
Ohta et al.

(10) Patent No.: US 8,708,824 B2
(45) Date of Patent: *Apr. 29, 2014

(54) INFORMATION PROCESSING PROGRAM

(75) Inventors: Keizo Ohta, Kyoto (JP); Kenta Sato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 228 days.

This patent is subject to a terminal disclaimer.

(21) Appl. No.: 13/419,292

(22) Filed: Mar. 13, 2012

(65) Prior Publication Data

US 2012/0200500 A1    Aug. 9, 2012

Related U.S. Application Data

(63) Continuation of application No. 11/445,280, filed on Jun. 2, 2006, now Pat. No. 8,157,651.

(60) Provisional application No. 60/732,648, filed on Nov. 3, 2005.

(30) Foreign Application Priority Data

Sep. 12, 2005    (JP) .................................. 2005-264207

(51) Int. Cl.
    *A63F 9/24*    (2006.01)
(52) U.S. Cl.
    USPC .................. 463/37; 463/34; 463/32; 345/158
(58) Field of Classification Search
    USPC ........................... 463/37, 38, 32, 34; 345/158
    See application file for complete search history.

(56) References Cited

U.S. PATENT DOCUMENTS

| | | |
|---|---|---|
| 3,454,920 A | 7/1969 | Mehr |
| 3,474,241 A | 10/1969 | Kuipers |
| D220,268 S | 3/1971 | Kliewer |
| 3,660,648 A | 5/1972 | Kuipers |
| 3,973,257 A | 8/1976 | Rowe |
| 4,009,619 A | 3/1977 | Snyman |
| 4,038,876 A | 8/1977 | Morris |
| 4,166,406 A | 9/1979 | Maughmer |

(Continued)

FOREIGN PATENT DOCUMENTS

| | | |
|---|---|---|
| CN | 1338961 | 3/2002 |
| CN | 1559644 | 1/2005 |

(Continued)

OTHER PUBLICATIONS

English Abstract for Japanese Patent No. JP10021000, published Jan. 23, 1998.

(Continued)

*Primary Examiner* — Pierre E Elisca
(74) *Attorney, Agent, or Firm* — Nixon & Vanderhye PC

(57) ABSTRACT

A game system comprises image obtaining means, direction calculation means, first rotation means, and display control means. The image obtaining means obtains an image taken by an imaging device. The direction calculation means calculates a direction originally determined from the image of an imaging target included in the image taken by the imaging device. The first rotation means rotates an operation target in accordance with the calculated direction. The display control means generates an image in accordance with the rotation of the operation target performed by the first rotation means and displays the generated image on a screen of a display device.

26 Claims, 32 Drawing Sheets

(56) References Cited

U.S. PATENT DOCUMENTS

| | | |
|---|---|---|
| 4,240,638 A | 12/1980 | Morrison et al. |
| 4,287,765 A | 9/1981 | Kreft |
| 4,303,978 A | 12/1981 | Shaw et al. |
| 4,318,245 A | 3/1982 | Stowell et al. |
| 4,321,678 A | 3/1982 | Krogmann |
| 4,337,948 A | 7/1982 | Breslow |
| 4,342,985 A | 8/1982 | Desjardins |
| 4,402,250 A | 9/1983 | Baasch |
| 4,425,488 A | 1/1984 | Moskin |
| 4,443,866 A | 4/1984 | Burgiss, Sr. |
| 4,450,325 A | 5/1984 | Luque |
| 4,503,299 A | 3/1985 | Henrard |
| 4,514,600 A | 4/1985 | Lentz |
| 4,514,798 A | 4/1985 | Lesche |
| 4,540,176 A | 9/1985 | Baer |
| 4,546,551 A | 10/1985 | Franks |
| 4,558,604 A | 12/1985 | Auer |
| 4,561,299 A | 12/1985 | Orlando et al. |
| 4,578,674 A | 3/1986 | Baker et al. |
| 4,623,930 A | 11/1986 | Oshima et al. |
| 4,672,374 A | 6/1987 | Desjardins |
| 4,739,128 A | 4/1988 | Grisham |
| 4,761,540 A | 8/1988 | McGeorge |
| 4,787,051 A | 11/1988 | Olson |
| 4,816,810 A | 3/1989 | Moore |
| 4,839,838 A | 6/1989 | LaBiche et al. |
| 4,849,655 A | 7/1989 | Bennett |
| 4,851,685 A | 7/1989 | Dubgen |
| 4,862,165 A | 8/1989 | Gent |
| 4,914,598 A | 4/1990 | Krogmann et al. |
| 4,918,293 A | 4/1990 | McGeorge |
| 4,957,291 A | 9/1990 | Miffitt et al. |
| 4,961,369 A | 10/1990 | McGill |
| 4,969,647 A | 11/1990 | Mical et al. |
| 4,988,981 A | 1/1991 | Zimmerman et al. |
| 4,994,795 A | 2/1991 | MacKenzie |
| 5,045,843 A | 9/1991 | Hansen |
| D320,624 S | 10/1991 | Taylor |
| 5,059,958 A | 10/1991 | Jacobs et al. |
| 5,062,696 A | 11/1991 | Oshima et al. |
| 5,068,645 A | 11/1991 | Drumm |
| D322,242 S | 12/1991 | Cordell |
| D325,225 S | 4/1992 | Adhida |
| 5,124,938 A | 6/1992 | Algrain |
| 5,128,671 A | 7/1992 | Thomas, Jr. |
| D328,463 S | 8/1992 | King et al. |
| 5,136,222 A | 8/1992 | Yamamoto |
| 5,138,154 A | 8/1992 | Hotelling |
| D331,058 S | 11/1992 | Morales |
| 5,175,481 A | 12/1992 | Kanno |
| 5,178,477 A | 1/1993 | Gambaro |
| 5,181,181 A | 1/1993 | Glynn |
| 5,192,082 A | 3/1993 | Inoue et al. |
| 5,202,844 A | 4/1993 | Kamio et al. |
| 5,207,426 A | 5/1993 | Inoue et al. |
| D338,242 S | 8/1993 | Cordell |
| D340,042 S | 10/1993 | Copper et al. |
| 5,259,626 A | 11/1993 | Ho |
| 5,262,777 A | 11/1993 | Low et al. |
| D342,256 S | 12/1993 | Payne |
| 5,280,744 A | 1/1994 | DeCarlo et al. |
| D345,164 S | 3/1994 | Grae |
| 5,296,871 A | 3/1994 | Paley |
| 5,307,325 A | 4/1994 | Scheiber |
| 5,309,137 A | 5/1994 | Kajiwara |
| 5,317,394 A | 5/1994 | Hale et al. |
| 5,319,387 A | 6/1994 | Yoshikawa |
| 5,329,276 A | 7/1994 | Hirabayashi |
| 5,332,322 A | 7/1994 | Gambaro |
| 5,339,095 A | 8/1994 | Redford |
| D350,736 S | 9/1994 | Takahashi et al. |
| D350,782 S | 9/1994 | Barr |
| D351,430 S | 10/1994 | Barr |
| 5,357,267 A | 10/1994 | Inoue |
| 5,359,321 A | 10/1994 | Ribic |
| 5,359,348 A | 10/1994 | Pilcher et al. |
| 5,363,120 A | 11/1994 | Drumm |
| 5,369,580 A | 11/1994 | Monji et al. |
| H1383 H | 12/1994 | Kaplan et al. |
| 5,369,889 A | 12/1994 | Callaghan |
| 5,373,857 A | 12/1994 | Travers et al. |
| 5,396,265 A | 3/1995 | Ulrich et al. |
| 5,421,590 A | 6/1995 | Robbins |
| 5,430,435 A | 7/1995 | Hoch et al. |
| D360,903 S | 8/1995 | Barr et al. |
| 5,440,326 A | 8/1995 | Quinn |
| 5,453,758 A | 9/1995 | Sato |
| D362,870 S | 10/1995 | Oikawa |
| 5,459,489 A | 10/1995 | Redford |
| 5,469,194 A | 11/1995 | Clark et al. |
| 5,481,957 A | 1/1996 | Paley et al. |
| 5,484,355 A | 1/1996 | King, II et al. |
| 5,485,171 A | 1/1996 | Copper et al. |
| 5,490,058 A | 2/1996 | Yamasaki et al. |
| 5,502,486 A | 3/1996 | Ueda et al. |
| 5,506,605 A | 4/1996 | Paley |
| 5,512,892 A | 4/1996 | Corballis et al. |
| 5,517,183 A | 5/1996 | Bozeman, Jr. |
| 5,523,800 A | 6/1996 | Dudek |
| 5,526,022 A | 6/1996 | Donahue et al. |
| 5,528,265 A | 6/1996 | Harrison |
| 5,531,443 A | 7/1996 | Cruz |
| 5,541,860 A | 7/1996 | Takei et al. |
| 5,551,701 A | 9/1996 | Bouton et al. |
| 5,554,033 A | 9/1996 | Bizzi et al. |
| 5,554,980 A | 9/1996 | Hashimoto et al. |
| 5,561,543 A | 10/1996 | Ogawa |
| 5,563,628 A | 10/1996 | Stroop |
| 5,569,085 A | 10/1996 | Igarashi et al. |
| D375,326 S | 11/1996 | Yokoi et al. |
| 5,573,011 A | 11/1996 | Felsing |
| 5,574,479 A | 11/1996 | Odell |
| 5,579,025 A | 11/1996 | Itoh |
| D376,826 S | 12/1996 | Ashida |
| 5,587,558 A | 12/1996 | Matsushima |
| 5,594,465 A | 1/1997 | Poulachon |
| 5,598,187 A | 1/1997 | Ide et al. |
| 5,602,569 A | 2/1997 | Kato |
| 5,603,658 A | 2/1997 | Cohen |
| 5,605,505 A | 2/1997 | Han |
| 5,606,343 A | 2/1997 | Tsuboyama et al. |
| 5,611,731 A | 3/1997 | Bouton et al. |
| 5,615,132 A | 3/1997 | Horton et al. |
| 5,621,459 A | 4/1997 | Ueda et al. |
| 5,624,117 A | 4/1997 | Ohkubo et al. |
| 5,627,565 A | 5/1997 | Morishita et al. |
| D379,832 S | 6/1997 | Ashida |
| 5,640,152 A | 6/1997 | Copper |
| 5,641,288 A | 6/1997 | Zaenglein, Jr. |
| 5,643,087 A | 7/1997 | Marcus et al. |
| 5,645,077 A | 7/1997 | Foxlin |
| 5,645,277 A | 7/1997 | Cheng |
| 5,666,138 A | 9/1997 | Culver |
| 5,667,220 A | 9/1997 | Cheng |
| 5,670,845 A | 9/1997 | Grant et al. |
| 5,670,988 A | 9/1997 | Tickle |
| 5,676,673 A | 10/1997 | Ferre et al. |
| 5,679,004 A | 10/1997 | McGowan et al. |
| 5,682,181 A | 10/1997 | Nguyen et al. |
| 5,698,784 A | 12/1997 | Hotelling et al. |
| 5,701,131 A | 12/1997 | Kuga |
| 5,702,305 A | 12/1997 | Norman et al. |
| 5,703,623 A | 12/1997 | Hall et al. |
| 5,724,106 A | 3/1998 | Autry et al. |
| 5,726,675 A | 3/1998 | Inoue |
| 5,734,371 A | 3/1998 | Kaplan |
| 5,734,373 A | 3/1998 | Rosenberg et al. |
| 5,734,807 A | 3/1998 | Sumi |
| D393,884 S | 4/1998 | Hayami |
| 5,736,970 A | 4/1998 | Bozeman, Jr. |
| 5,739,811 A | 4/1998 | Rosenberg et al. |
| 5,741,182 A | 4/1998 | Lipps et al. |
| 5,742,331 A | 4/1998 | Uomori et al. |
| 5,745,226 A | 4/1998 | Gigioli, Jr. |

(56) References Cited

U.S. PATENT DOCUMENTS

| | | |
|---|---|---|
| D394,264 S | 5/1998 | Sakamoto et al. |
| 5,746,602 A | 5/1998 | Kikinis |
| 5,751,273 A | 5/1998 | Cohen |
| 5,752,880 A | 5/1998 | Gabai et al. |
| 5,757,354 A | 5/1998 | Kawamura |
| 5,757,360 A | 5/1998 | Nitta et al. |
| D395,464 S | 6/1998 | Shiibashi et al. |
| 5,764,224 A | 6/1998 | Lilja et al. |
| 5,769,719 A | 6/1998 | Hsu |
| 5,771,038 A | 6/1998 | Wang |
| D396,468 S | 7/1998 | Schindler et al. |
| 5,785,317 A | 7/1998 | Sasaki |
| D397,162 S | 8/1998 | Yokoi et al. |
| 5,794,081 A | 8/1998 | Itoh et al. |
| 5,796,354 A | 8/1998 | Cartabiano et al. |
| 5,807,284 A | 9/1998 | Foxlin |
| 5,819,206 A | 10/1998 | Horton |
| 5,820,462 A | 10/1998 | Yokoi et al. |
| 5,822,713 A | 10/1998 | Profeta |
| 5,825,350 A | 10/1998 | Case, Jr. et al. |
| D400,885 S | 11/1998 | Goto |
| 5,831,553 A | 11/1998 | Lenssen et al. |
| 5,835,077 A | 11/1998 | Dao |
| 5,835,156 A | 11/1998 | Blonstein et al. |
| 5,841,409 A | 11/1998 | Ishibashi et al. |
| D402,328 S | 12/1998 | Ashida |
| 5,847,854 A | 12/1998 | Benson, Jr. |
| 5,850,624 A | 12/1998 | Gard et al. |
| 5,854,622 A | 12/1998 | Brannon |
| D405,071 S | 2/1999 | Gambaro |
| 5,867,146 A | 2/1999 | Kim et al. |
| 5,874,941 A | 2/1999 | Yamada |
| 5,875,257 A | 2/1999 | Marrin et al. |
| D407,071 S | 3/1999 | Keating |
| D407,761 S | 4/1999 | Barr |
| 5,897,437 A | 4/1999 | Nishiumi et al. |
| 5,898,421 A | 4/1999 | Quinn |
| 5,900,867 A | 5/1999 | Schindler et al. |
| 5,902,968 A | 5/1999 | Sato et al. |
| D410,909 S | 6/1999 | Tickle |
| 5,912,612 A | 6/1999 | DeVolpi |
| 5,919,149 A | 7/1999 | Allum |
| 5,923,317 A | 7/1999 | Sayler et al. |
| 5,926,780 A | 7/1999 | Fox et al. |
| 5,929,782 A | 7/1999 | Stark et al. |
| D412,940 S | 8/1999 | Kato |
| 5,947,868 A | 9/1999 | Dugan |
| 5,955,713 A | 9/1999 | Titus et al. |
| 5,955,988 A | 9/1999 | Blonstein et al. |
| 5,956,035 A | 9/1999 | Sciammarella et al. |
| 5,967,898 A | 10/1999 | Takasaka et al. |
| 5,973,757 A | 10/1999 | Aubuchon et al. |
| 5,982,352 A | 11/1999 | Pryor |
| 5,982,356 A | 11/1999 | Akiyama |
| 5,984,785 A | 11/1999 | Takeda |
| 5,986,644 A | 11/1999 | Herder et al. |
| 5,991,085 A | 11/1999 | Rallison et al. |
| 5,999,168 A | 12/1999 | Rosenberg et al. |
| 6,002,394 A | 12/1999 | Schein et al. |
| D419,199 S | 1/2000 | Cordell et al. |
| D419,200 S | 1/2000 | Ashida |
| 6,010,406 A | 1/2000 | Kajikawa et al. |
| 6,011,526 A | 1/2000 | Toyoshima et al. |
| 6,012,980 A | 1/2000 | Yoshida et al. |
| 6,013,007 A | 1/2000 | Root et al. |
| 6,016,144 A | 1/2000 | Blonstein et al. |
| 6,019,680 A | 2/2000 | Cheng |
| 6,020,876 A | 2/2000 | Rosenberg et al. |
| 6,037,882 A | 3/2000 | Levy |
| 6,044,297 A | 3/2000 | Sheldon et al. |
| 6,049,823 A | 4/2000 | Hwang |
| 6,052,083 A | 4/2000 | Wilson |
| 6,057,788 A | 5/2000 | Cummings |
| 6,058,342 A | 5/2000 | Orbach et al. |
| 6,059,576 A | 5/2000 | Brann |
| 6,069,594 A | 5/2000 | Barnes et al. |
| 6,072,467 A | 6/2000 | Walker |
| 6,072,470 A | 6/2000 | Ishigaki |
| 6,075,575 A | 6/2000 | Schein et al. |
| 6,081,819 A | 6/2000 | Ogino |
| 6,084,315 A | 7/2000 | Schmitt |
| 6,084,577 A | 7/2000 | Sato et al. |
| 6,087,950 A | 7/2000 | Capan |
| D429,718 S | 8/2000 | Rudolph |
| 6,110,039 A | 8/2000 | Oh |
| 6,115,028 A | 9/2000 | Balakrishnan |
| 6,137,457 A | 10/2000 | Tokuhashi et al. |
| D433,381 S | 11/2000 | Talesfore |
| 6,146,278 A | 11/2000 | Kobayashi |
| 6,148,100 A | 11/2000 | Anderson et al. |
| 6,155,926 A | 12/2000 | Miyamoto et al. |
| 6,160,405 A | 12/2000 | Needle et al. |
| 6,160,540 A | 12/2000 | Fishkin et al. |
| 6,162,191 A | 12/2000 | Foxlin |
| 6,164,808 A | 12/2000 | Shibata et al. |
| 6,171,190 B1 | 1/2001 | Thanasack et al. |
| 6,176,837 B1 | 1/2001 | Foxlin |
| 6,181,329 B1 | 1/2001 | Stork et al. |
| 6,183,365 B1 | 2/2001 | Tonomura et al. |
| 6,184,862 B1 | 2/2001 | Leiper |
| 6,184,863 B1 | 2/2001 | Sibert et al. |
| 6,191,774 B1 | 2/2001 | Schena et al. |
| 6,198,295 B1 | 3/2001 | Hill |
| 6,198,470 B1 | 3/2001 | Agam et al. |
| 6,198,471 B1 | 3/2001 | Cook |
| 6,200,219 B1 | 3/2001 | Rudell et al. |
| 6,200,253 B1 | 3/2001 | Nishiumi et al. |
| 6,201,554 B1 | 3/2001 | Lands |
| 6,211,861 B1 | 4/2001 | Rosenberg et al. |
| 6,217,450 B1 | 4/2001 | Meredith |
| 6,217,478 B1 | 4/2001 | Vohmann et al. |
| D442,998 S | 5/2001 | Ashida |
| 6,225,987 B1 | 5/2001 | Matsuda |
| 6,226,534 B1 | 5/2001 | Aizawa |
| 6,238,291 B1 | 5/2001 | Fujimoto et al. |
| 6,239,806 B1 | 5/2001 | Nishiumi et al. |
| 6,241,611 B1 | 6/2001 | Takeda et al. |
| 6,243,658 B1 | 6/2001 | Raby |
| 6,244,987 B1 | 6/2001 | Oshuga et al. |
| 6,245,014 B1 | 6/2001 | Brainard, II |
| 6,264,558 B1 | 7/2001 | Nishiumi et al. |
| 6,273,819 B1 | 8/2001 | Strauss et al. |
| 6,280,327 B1 | 8/2001 | Leifer et al. |
| 6,287,198 B1 | 9/2001 | McCauley |
| 6,297,751 B1 | 10/2001 | Fadavi-Ardekani |
| 6,301,534 B1 | 10/2001 | McDermott, Jr. et al. |
| 6,304,250 B1 | 10/2001 | Yang et al. |
| 6,315,673 B1 | 11/2001 | Kopera et al. |
| 6,323,614 B1 | 11/2001 | Palazzolo et al. |
| 6,323,654 B1 | 11/2001 | Needle et al. |
| 6,325,718 B1 | 12/2001 | Nishiumi et al. |
| 6,331,841 B1 | 12/2001 | Tokuhashi et al. |
| 6,331,856 B1 | 12/2001 | Van Hook et al. |
| 6,337,954 B1 | 1/2002 | Soshi et al. |
| 6,347,998 B1 | 2/2002 | Yoshitomi et al. |
| 6,361,507 B1 | 3/2002 | Foxlin |
| D456,410 S | 4/2002 | Ashida |
| 6,369,794 B1 | 4/2002 | Sakurai et al. |
| 6,375,572 B1 | 4/2002 | Masuyama et al. |
| 6,377,793 B1 | 4/2002 | Jenkins |
| 6,377,906 B1 | 4/2002 | Rowe |
| D456,854 S | 5/2002 | Ashida |
| 6,383,079 B1 | 5/2002 | Takeda et al. |
| 6,392,613 B1 | 5/2002 | Goto |
| 6,394,904 B1 | 5/2002 | Stalker |
| D458,972 S | 6/2002 | Ashida |
| 6,400,480 B1 | 6/2002 | Thomas |
| 6,400,996 B1 | 6/2002 | Hoffberg et al. |
| 6,409,687 B1 | 6/2002 | Foxlin |
| D459,727 S | 7/2002 | Ashida |
| D460,787 S | 7/2002 | Nishikawa |
| 6,415,223 B1 | 7/2002 | Lin et al. |
| 6,421,056 B1 | 7/2002 | Nishiumi et al. |
| 6,424,333 B1 | 7/2002 | Tremblay |

(56) References Cited

U.S. PATENT DOCUMENTS

| | | |
|---|---|---|
| 6,426,719 B1 | 7/2002 | Nagareda et al. |
| 6,426,741 B1 | 7/2002 | Goldsmith et al. |
| D462,683 S | 9/2002 | Ashida |
| 6,452,494 B1 | 9/2002 | Harrison |
| 6,456,276 B1 | 9/2002 | Park |
| D464,052 S | 10/2002 | Fletcher |
| D464,950 S | 10/2002 | Fraquelli |
| 6,466,198 B1 | 10/2002 | Feinstein |
| 6,466,831 B1 | 10/2002 | Shibata et al. |
| 6,473,070 B2 | 10/2002 | Mishra et al. |
| 6,473,713 B1 | 10/2002 | McCall et al. |
| 6,474,159 B1 | 11/2002 | Foxlin et al. |
| 6,484,080 B2 | 11/2002 | Breed |
| 6,492,981 B1 | 12/2002 | Stork et al. |
| 6,496,122 B2 | 12/2002 | Sampsell |
| 6,518,952 B1 | 2/2003 | Leiper |
| 6,530,838 B2 | 3/2003 | Ha |
| 6,538,675 B2 | 3/2003 | Aratani et al. |
| D473,942 S | 4/2003 | Motoki et al. |
| 6,540,607 B2 | 4/2003 | Mokris et al. |
| 6,540,611 B1 | 4/2003 | Nagata |
| 6,544,124 B2 | 4/2003 | Ireland et al. |
| 6,544,126 B2 | 4/2003 | Sawano et al. |
| 6,545,661 B1 | 4/2003 | Goschy et al. |
| 6,554,781 B1 | 4/2003 | Carter et al. |
| D474,763 S | 5/2003 | Tozaki et al. |
| 6,565,444 B2 | 5/2003 | Nagata et al. |
| 6,567,536 B2 | 5/2003 | McNitt et al. |
| 6,572,108 B1 | 6/2003 | Bristow |
| 6,577,350 B1 | 6/2003 | Proehl et al. |
| 6,582,299 B1 | 6/2003 | Matsuyama et al. |
| 6,582,380 B2 | 6/2003 | Kazlausky et al. |
| 6,585,596 B1 | 7/2003 | Leifer |
| 6,590,536 B1 | 7/2003 | Walton |
| 6,591,677 B2 | 7/2003 | Rothoff |
| 6,597,342 B1 | 7/2003 | Haruta |
| 6,597,443 B2 | 7/2003 | Boman |
| 6,599,194 B1 | 7/2003 | Smith et al. |
| 6,605,038 B1 | 8/2003 | Teller et al. |
| 6,608,563 B2 | 8/2003 | Weston et al. |
| 6,609,977 B1 | 8/2003 | Shimizu et al. |
| 6,616,607 B2 | 9/2003 | Hashimoto et al. |
| 6,628,257 B1 | 9/2003 | Oka et al. |
| 6,634,949 B1 | 10/2003 | Briggs et al. |
| 6,636,826 B1 | 10/2003 | Abe et al. |
| 6,650,029 B1 | 11/2003 | Johnston |
| 6,650,313 B2 | 11/2003 | Levine et al. |
| 6,650,345 B1 | 11/2003 | Saito et al. |
| 6,654,001 B1 | 11/2003 | Su |
| 6,672,962 B1 | 1/2004 | Ozaki et al. |
| 6,676,520 B2 | 1/2004 | Nishiumi |
| 6,677,990 B1 | 1/2004 | Kawahara |
| 6,681,629 B2 | 1/2004 | Foxlin et al. |
| 6,682,351 B1 | 1/2004 | Abraham-Fuchs et al. |
| 6,684,062 B1 | 1/2004 | Gosior et al. |
| D486,145 S | 2/2004 | Kaminski et al. |
| 6,686,954 B1 | 2/2004 | Kitaguchi et al. |
| 6,692,170 B2 | 2/2004 | Abir |
| 6,693,622 B1 | 2/2004 | Shahoian et al. |
| 6,712,692 B2 | 3/2004 | Basson et al. |
| 6,717,573 B1 | 4/2004 | Shahoian et al. |
| 6,718,280 B2 | 4/2004 | Hermann |
| 6,725,173 B2 | 4/2004 | An et al. |
| D489,361 S | 5/2004 | Mori et al. |
| 6,736,009 B1 | 5/2004 | Schwabe |
| D491,924 S | 6/2004 | Kaminski et al. |
| D492,285 S | 6/2004 | Ombao et al. |
| 6,743,104 B1 | 6/2004 | Ota et al. |
| 6,747,632 B2 | 6/2004 | Howard |
| 6,747,690 B2 | 6/2004 | Mølgaard |
| 6,749,432 B2 | 6/2004 | French et al. |
| 6,752,719 B2 | 6/2004 | Himoto et al. |
| 6,753,849 B1 | 6/2004 | Curran et al. |
| 6,753,888 B2 | 6/2004 | Kamiwada et al. |
| 6,757,068 B2 | 6/2004 | Foxlin |
| 6,757,446 B1 | 6/2004 | Li et al. |
| 6,761,637 B2 | 7/2004 | Weston et al. |
| 6,765,553 B1 | 7/2004 | Odamura |
| D495,336 S | 8/2004 | Andre et al. |
| 6,786,877 B2 | 9/2004 | Foxlin |
| 6,796,177 B2 | 9/2004 | Mori |
| 6,811,489 B1 | 11/2004 | Shimizu et al. |
| 6,811,491 B1 | 11/2004 | Levenberg et al. |
| 6,812,881 B1 | 11/2004 | Mullaly et al. |
| 6,813,525 B2 | 11/2004 | Reid et al. |
| 6,813,584 B2 | 11/2004 | Zhou et al. |
| 6,816,151 B2 | 11/2004 | Dellinger |
| 6,821,204 B2 | 11/2004 | Aonuma et al. |
| 6,821,206 B1 | 11/2004 | Ishida et al. |
| 6,836,705 B2 | 12/2004 | Hellmann et al. |
| 6,836,751 B2 | 12/2004 | Paxton et al. |
| 6,836,971 B1 | 1/2005 | Wan |
| 6,842,991 B2 | 1/2005 | Levi et al. |
| 6,850,221 B1 | 2/2005 | Tickle |
| 6,850,844 B1 | 2/2005 | Walters et al. |
| 6,852,032 B2 | 2/2005 | Ishino |
| 6,856,327 B2 | 2/2005 | Choi |
| D502,468 S | 3/2005 | Knight et al. |
| 6,868,738 B2 | 3/2005 | Moscrip et al. |
| 6,872,139 B2 | 3/2005 | Sato et al. |
| 6,873,406 B1 | 3/2005 | Hines et al. |
| D503,750 S | 4/2005 | Kit et al. |
| D504,677 S | 5/2005 | Kaminski et al. |
| D505,424 S | 5/2005 | Ashida et al. |
| 6,897,845 B2 | 5/2005 | Ozawa |
| 6,897,854 B2 | 5/2005 | Cho et al. |
| 6,906,700 B1 | 6/2005 | Armstrong |
| 6,908,388 B2 | 6/2005 | Shimizu et al. |
| 6,922,632 B2 | 7/2005 | Foxlin |
| 6,925,410 B2 | 8/2005 | Narayanan |
| 6,929,543 B1 | 8/2005 | Ueshima et al. |
| 6,929,548 B2 | 8/2005 | Wang |
| 6,933,861 B2 | 8/2005 | Wang |
| 6,933,923 B2 | 8/2005 | Feinstein |
| 6,954,980 B2 | 10/2005 | Song |
| 6,955,606 B2 | 10/2005 | Taho et al. |
| 6,956,564 B1 | 10/2005 | Williams |
| 6,967,566 B2 | 11/2005 | Weston et al. |
| 6,982,697 B2 | 1/2006 | Wilson et al. |
| 6,984,208 B2 | 1/2006 | Zheng |
| 6,990,639 B2 | 1/2006 | Wilson |
| 6,993,451 B2 | 1/2006 | Chang et al. |
| 6,995,748 B2 | 2/2006 | Gordon et al. |
| 6,998,966 B2 | 2/2006 | Pederson et al. |
| 7,000,469 B2 | 2/2006 | Foxlin et al. |
| 7,002,591 B1 | 2/2006 | Leather et al. |
| 7,031,875 B2 | 4/2006 | Ellenby et al. |
| 7,066,781 B2 | 6/2006 | Weston |
| D524,298 S | 7/2006 | Hedderich et al. |
| 7,081,051 B2 | 7/2006 | Himoto et al. |
| 7,090,582 B2 | 8/2006 | Danieli et al. |
| 7,098,891 B1 | 8/2006 | Pryor |
| 7,098,894 B2 | 8/2006 | Yang et al. |
| 7,102,616 B1 | 9/2006 | Sleator |
| 7,107,168 B2 | 9/2006 | Oystol et al. |
| D531,228 S | 10/2006 | Ashida et al. |
| 7,115,032 B2 | 10/2006 | Cantu et al. |
| 7,126,584 B1 | 10/2006 | Nishiumi et al. |
| 7,127,370 B2 | 10/2006 | Kelly et al. |
| D531,585 S | 11/2006 | Weitgasser et al. |
| 7,133,026 B2 | 11/2006 | Horie et al. |
| 7,136,674 B2 | 11/2006 | Yoshie et al. |
| 7,139,983 B2 | 11/2006 | Kelts |
| 7,140,962 B2 | 11/2006 | Okuda et al. |
| 7,142,191 B2 | 11/2006 | Idesawa et al. |
| 7,149,627 B2 | 12/2006 | Ockerse et al. |
| 7,154,475 B2 | 12/2006 | Crew |
| 7,155,604 B2 | 12/2006 | Kawai |
| 7,158,118 B2 | 1/2007 | Liberty |
| 7,173,604 B2 | 2/2007 | Marvit et al. |
| 7,176,919 B2 | 2/2007 | Drebin et al. |
| 7,182,691 B1 | 2/2007 | Schena |
| 7,183,480 B2 | 2/2007 | Nishitani et al. |
| 7,184,059 B1 | 2/2007 | Fouladi et al. |

(56) References Cited

U.S. PATENT DOCUMENTS

| | | |
|---|---|---|
| D543,246 S | 5/2007 | Ashida et al. |
| 7,220,220 B2 | 5/2007 | Stubbs et al. |
| 7,225,101 B2 | 5/2007 | Usuda et al. |
| 7,231,063 B2 | 6/2007 | Naimark et al. |
| 7,233,316 B2 | 6/2007 | Smith et al. |
| 7,236,156 B2 | 6/2007 | Liberty et al. |
| 7,239,301 B2 | 7/2007 | Liberty et al. |
| 7,261,690 B2 | 8/2007 | Teller et al. |
| 7,262,760 B2 | 8/2007 | Liberty |
| D556,201 S | 11/2007 | Ashida et al. |
| 7,292,151 B2 | 11/2007 | Ferguson et al. |
| 7,301,527 B2 | 11/2007 | Marvit |
| 7,301,648 B2 | 11/2007 | Foxlin |
| D556,760 S | 12/2007 | Ashida et al. |
| D559,847 S | 1/2008 | Ashida et al. |
| D561,178 S | 2/2008 | Azuma |
| 7,335,134 B1 | 2/2008 | LaVelle |
| D563,948 S | 3/2008 | d'Hore |
| D567,243 S | 4/2008 | Ashida et al. |
| 7,359,121 B2 | 4/2008 | French et al. |
| RE40,324 E | 5/2008 | Crawford |
| 7,379,078 B1 | 5/2008 | Gossweiler, III et al. |
| 7,379,566 B2 | 5/2008 | Hildreth |
| 7,395,181 B2 | 7/2008 | Foxlin |
| 7,414,611 B2 | 8/2008 | Liberty |
| 7,445,550 B2 | 11/2008 | Barney et al. |
| 7,488,231 B2 | 2/2009 | Weston |
| 7,500,917 B2 | 3/2009 | Barney et al. |
| 7,545,956 B2 | 6/2009 | Miyahara |
| 7,568,289 B2 | 8/2009 | Burlingham et al. |
| 7,582,016 B2 | 9/2009 | Suzuki |
| 7,614,958 B2 | 11/2009 | Weston et al. |
| 7,663,509 B2 | 2/2010 | Shen |
| 7,672,543 B2 | 3/2010 | Hull et al. |
| 7,774,155 B2 | 8/2010 | Sato et al. |
| 7,775,882 B2 | 8/2010 | Kawamura et al. |
| 7,783,076 B2 * | 8/2010 | Tsunashima ................. 382/103 |
| 7,796,116 B2 | 9/2010 | Salsman |
| 7,831,064 B2 | 11/2010 | Ohta |
| 7,937,878 B2 * | 5/2011 | Sammut et al. ................. 42/122 |
| 2001/0010514 A1 | 8/2001 | Ishino |
| 2001/0015123 A1 | 8/2001 | Nishitani et al. |
| 2001/0024973 A1 | 9/2001 | Meredith |
| 2001/0031662 A1 | 10/2001 | Larian |
| 2001/0049302 A1 | 12/2001 | Hagiwara |
| 2002/0024500 A1 | 2/2002 | Howard |
| 2002/0024675 A1 | 2/2002 | Foxlin |
| 2002/0028071 A1 | 3/2002 | Mølgaard |
| 2002/0072418 A1 | 6/2002 | Masuyama et al. |
| 2002/0075335 A1 | 6/2002 | Rekimoto |
| 2002/0098887 A1 | 7/2002 | Himoto et al. |
| 2002/0103026 A1 | 8/2002 | Himoto et al. |
| 2002/0107069 A1 | 8/2002 | Ishino |
| 2002/0126026 A1 | 9/2002 | Lee |
| 2002/0137567 A1 | 9/2002 | Cheng |
| 2002/0140666 A1 | 10/2002 | Bradski |
| 2002/0140745 A1 | 10/2002 | Ellenby et al. |
| 2002/0158843 A1 | 10/2002 | Levine et al. |
| 2002/0183961 A1 | 12/2002 | French et al. |
| 2003/0038778 A1 | 2/2003 | Noguera et al. |
| 2003/0052860 A1 | 3/2003 | Park et al. |
| 2003/0057808 A1 | 3/2003 | Lee et al. |
| 2003/0063068 A1 | 4/2003 | Anton et al. |
| 2003/0069077 A1 | 4/2003 | Korienek |
| 2003/0107551 A1 | 6/2003 | Dunker |
| 2003/0144056 A1 | 7/2003 | Leifer et al. |
| 2003/0193572 A1 | 10/2003 | Wilson et al. |
| 2003/0195041 A1 | 10/2003 | McCauley |
| 2003/0204361 A1 | 10/2003 | Townsend et al. |
| 2003/0216176 A1 | 11/2003 | Shimizu et al. |
| 2003/0222851 A1 | 12/2003 | Lai et al. |
| 2004/0028258 A1 | 2/2004 | Naimark et al. |
| 2004/0034289 A1 | 2/2004 | Teller et al. |
| 2004/0046736 A1 | 3/2004 | Pryor et al. |
| 2004/0048666 A1 | 3/2004 | Bagley |
| 2004/0070564 A1 | 4/2004 | Dawson |
| 2004/0075650 A1 | 4/2004 | Paul et al. |
| 2004/0095317 A1 | 5/2004 | Zhang et al. |
| 2004/0134341 A1 | 7/2004 | Sandoz et al. |
| 2004/0140954 A1 | 7/2004 | Faeth |
| 2004/0143413 A1 | 7/2004 | Oystol et al. |
| 2004/0147317 A1 | 7/2004 | Ito et al. |
| 2004/0152515 A1 | 8/2004 | Wegmuller et al. |
| 2004/0174340 A1 | 9/2004 | Bruneau et al. |
| 2004/0193413 A1 | 9/2004 | Wilson et al. |
| 2004/0203638 A1 | 10/2004 | Chan |
| 2004/0204240 A1 | 10/2004 | Barney |
| 2004/0218104 A1 | 11/2004 | Smith et al. |
| 2004/0222969 A1 | 11/2004 | Buchenrieder |
| 2004/0227725 A1 | 11/2004 | Calarco et al. |
| 2004/0229693 A1 | 11/2004 | Lind et al. |
| 2004/0233223 A1 | 11/2004 | Schkolne et al. |
| 2004/0239626 A1 | 12/2004 | Noguera |
| 2004/0252109 A1 | 12/2004 | Trent et al. |
| 2004/0254020 A1 | 12/2004 | Dragusin |
| 2004/0259651 A1 | 12/2004 | Storek |
| 2004/0268393 A1 | 12/2004 | Hunleth et al. |
| 2005/0017454 A1 | 1/2005 | Endo et al. |
| 2005/0020369 A1 | 1/2005 | Davis et al. |
| 2005/0021048 A1 | 1/2005 | Kuhlman et al. |
| 2005/0024360 A1 | 2/2005 | Abe et al. |
| 2005/0032582 A1 | 2/2005 | Mahajan |
| 2005/0047621 A1 | 3/2005 | Cranfill |
| 2005/0052415 A1 | 3/2005 | Braun et al. |
| 2005/0054457 A1 | 3/2005 | Eyestone et al. |
| 2005/0070359 A1 | 3/2005 | Rodriguez et al. |
| 2005/0076161 A1 | 4/2005 | Albanna et al. |
| 2005/0085298 A1 | 4/2005 | Woolston |
| 2005/0125826 A1 | 6/2005 | Hunleth et al. |
| 2005/0130739 A1 | 6/2005 | Argentar |
| 2005/0134555 A1 | 6/2005 | Liao |
| 2005/0137774 A1 | 6/2005 | Rupp |
| 2005/0143173 A1 | 6/2005 | Barney et al. |
| 2005/0170889 A1 | 8/2005 | Lum et al. |
| 2005/0172734 A1 | 8/2005 | Alsio |
| 2005/0174324 A1 | 8/2005 | Liberty et al. |
| 2005/0176485 A1 | 8/2005 | Ueshima |
| 2005/0179644 A1 | 8/2005 | Alsio |
| 2005/0210419 A1 | 9/2005 | Kela |
| 2005/0212749 A1 | 9/2005 | Marvit |
| 2005/0212750 A1 | 9/2005 | Marvit |
| 2005/0212751 A1 | 9/2005 | Marvit |
| 2005/0212752 A1 | 9/2005 | Marvit |
| 2005/0212753 A1 | 9/2005 | Marvit |
| 2005/0212754 A1 | 9/2005 | Marvit |
| 2005/0212755 A1 | 9/2005 | Marvit |
| 2005/0212756 A1 | 9/2005 | Marvit |
| 2005/0212757 A1 | 9/2005 | Marvit |
| 2005/0212758 A1 | 9/2005 | Marvit |
| 2005/0212759 A1 | 9/2005 | Marvit |
| 2005/0212760 A1 | 9/2005 | Marvit |
| 2005/0212764 A1 | 9/2005 | Toba |
| 2005/0212767 A1 | 9/2005 | Marvit et al. |
| 2005/0215295 A1 | 9/2005 | Arneson |
| 2005/0215322 A1 | 9/2005 | Himoto et al. |
| 2005/0217525 A1 | 10/2005 | McClure |
| 2005/0233808 A1 | 10/2005 | Himoto et al. |
| 2005/0239548 A1 | 10/2005 | Ueshima et al. |
| 2005/0243061 A1 | 11/2005 | Liberty et al. |
| 2005/0243062 A1 | 11/2005 | Liberty |
| 2005/0244034 A1 | 11/2005 | Miyahara |
| 2005/0253806 A1 | 11/2005 | Liberty et al. |
| 2005/0256675 A1 | 11/2005 | Kurata |
| 2006/0028446 A1 | 2/2006 | Liberty et al. |
| 2006/0030385 A1 | 2/2006 | Barnet et al. |
| 2006/0040738 A1 | 2/2006 | Okazaki et al. |
| 2006/0046849 A1 | 3/2006 | Kovacs |
| 2006/0092133 A1 | 5/2006 | Touma et al. |
| 2006/0094502 A1 | 5/2006 | Katayama et al. |
| 2006/0122474 A1 | 6/2006 | Teller et al. |
| 2006/0123146 A1 | 6/2006 | Wu et al. |
| 2006/0139327 A1 | 6/2006 | Dawson et al. |
| 2006/0148563 A1 | 7/2006 | Yang |
| 2006/0152487 A1 | 7/2006 | Grunnet-Jepsen et al. |

(56) References Cited

U.S. PATENT DOCUMENTS

| | | |
|---|---|---|
| 2006/0152488 A1 | 7/2006 | Salsman et al. |
| 2006/0152489 A1 | 7/2006 | Sweetser et al. |
| 2006/0154726 A1 | 7/2006 | Weston et al. |
| 2006/0178212 A1 | 8/2006 | Penzias |
| 2006/0205507 A1 | 9/2006 | Ho |
| 2006/0231794 A1 | 10/2006 | Sakaguchi et al. |
| 2006/0252477 A1 | 11/2006 | Zalewski et al. |
| 2006/0256081 A1 | 11/2006 | Zalewski et al. |
| 2006/0258452 A1 | 11/2006 | Hsu |
| 2006/0264258 A1 | 11/2006 | Zalewski et al. |
| 2006/0264260 A1 | 11/2006 | Zalewski et al. |
| 2006/0282873 A1 | 12/2006 | Zalewski et al. |
| 2006/0287086 A1 | 12/2006 | Zalewski et al. |
| 2006/0287087 A1 | 12/2006 | Zalewski et al. |
| 2007/0015588 A1 | 1/2007 | Matsumoto et al. |
| 2007/0021208 A1 | 1/2007 | Mao et al. |
| 2007/0049374 A1 | 3/2007 | Ikeda et al. |
| 2007/0050597 A1 | 3/2007 | Ikeda et al. |
| 2007/0052177 A1 | 3/2007 | Ikeda et al. |
| 2007/0060228 A1* | 3/2007 | Akasaka et al. ............... 463/1 |
| 2007/0060391 A1 | 3/2007 | Ikeda et al. |
| 2007/0066394 A1 | 3/2007 | Ikeda et al. |
| 2007/0066396 A1 | 3/2007 | Weston et al. |
| 2007/0072674 A1* | 3/2007 | Ohta et al. .................. 463/37 |
| 2007/0072680 A1 | 3/2007 | Ikeda et al. |
| 2007/0091084 A1 | 4/2007 | Ueshima et al. |
| 2007/0093291 A1 | 4/2007 | Hulvey |
| 2007/0159362 A1 | 7/2007 | Shen |
| 2007/0173705 A1 | 7/2007 | Teller et al. |
| 2007/0211027 A1 | 9/2007 | Ohta |
| 2007/0252815 A1 | 11/2007 | Kuo et al. |
| 2007/0265075 A1 | 11/2007 | Zalewski |
| 2007/0265076 A1 | 11/2007 | Lin et al. |
| 2007/0265088 A1 | 11/2007 | Nakada et al. |
| 2007/0270220 A1* | 11/2007 | Kaneshige et al. ............ 463/37 |
| 2008/0014835 A1 | 1/2008 | Weston et al. |
| 2008/0015017 A1 | 1/2008 | Ashida et al. |
| 2008/0039202 A1 | 2/2008 | Sawano et al. |
| 2008/0121782 A1 | 5/2008 | Hotelling et al. |
| 2008/0273011 A1 | 11/2008 | Lin |
| 2008/0278445 A1 | 11/2008 | Sweetser et al. |
| 2008/0280660 A1 | 11/2008 | Ueshima et al. |
| 2009/0005166 A1 | 1/2009 | Sato |
| 2009/0051653 A1 | 2/2009 | Barney et al. |
| 2009/0124165 A1 | 5/2009 | Weston |
| 2009/0156309 A1 | 6/2009 | Weston et al. |
| 2011/0132983 A1* | 6/2011 | Sammut et al. ............... 235/404 |

FOREIGN PATENT DOCUMENTS

| | | |
|---|---|---|
| DE | 3930581 | 3/1991 |
| DE | 19701344 | 7/1997 |
| DE | 19701374 | 7/1997 |
| DE | 19648487 | 6/1998 |
| DE | 19814254 | 10/1998 |
| DE | 19937307 | 2/2000 |
| DE | 10029173 | 1/2002 |
| DE | 10241392 | 5/2003 |
| DE | 10219198 | 11/2003 |
| EP | 1 524 334 | 3/1977 |
| EP | 0 728 503 | 8/1996 |
| EP | 0 835 676 | 4/1998 |
| EP | 0 848 226 | 6/1998 |
| EP | 0 852 961 | 7/1998 |
| EP | 1 062 994 | 12/2000 |
| EP | 1 239 260 | 9/2002 |
| EP | 1249260 | 10/2002 |
| EP | 1 279 425 | 1/2003 |
| EP | 1 293 237 | 3/2003 |
| EP | 0993845 | 12/2005 |
| GB | 1524334 | 9/1978 |
| GB | 2 244 546 | 5/1990 |
| GB | 2244546 | 5/1990 |
| GB | 2284478 | 6/1995 |
| GB | 2307133 | 5/1997 |
| GB | 2316482 | 2/1998 |
| GB | 2319374 | 5/1998 |
| JP | 60-077231 | 5/1985 |
| JP | 62-14527 | 1/1987 |
| JP | 03-08103 | 8/1991 |
| JP | 3-059619 | 11/1991 |
| JP | 04-287888 | 10/1992 |
| JP | 5-056191 | 7/1993 |
| JP | 6-50758 | 2/1994 |
| JP | 6-154422 | 6/1994 |
| JP | 03-000028 | 7/1994 |
| JP | 6-190144 | 7/1994 |
| JP | 6-198075 | 7/1994 |
| JP | 3-273531 | 11/1994 |
| JP | 6-308879 | 11/1994 |
| JP | 3-228845 | 1/1995 |
| JP | 7-28591 | 1/1995 |
| JP | 7-44315 | 2/1995 |
| JP | 7044315 | 2/1995 |
| JP | 7-107573 | 4/1995 |
| JP | 07-22312 | 5/1995 |
| JP | 7-115690 | 5/1995 |
| JP | 3-517482 | 6/1995 |
| JP | 7-146123 | 6/1995 |
| JP | 7-200142 | 8/1995 |
| JP | 07-262797 | 10/1995 |
| JP | 7-302148 | 11/1995 |
| JP | 07-318332 | 12/1995 |
| JP | 8-071252 | 3/1996 |
| JP | 8-095704 | 4/1996 |
| JP | 8-106352 | 4/1996 |
| JP | 08-111144 | 4/1996 |
| JP | 11-114223 | 4/1996 |
| JP | 8-114415 | 5/1996 |
| JP | 8-122070 | 5/1996 |
| JP | 8-152959 | 6/1996 |
| JP | 8-211993 | 8/1996 |
| JP | 8-305355 | 11/1996 |
| JP | 83-35136 | 12/1996 |
| JP | 9-230997 | 9/1997 |
| JP | 9-274534 | 10/1997 |
| JP | 09-319510 | 12/1997 |
| JP | 10-021000 | 1/1998 |
| JP | 10-033831 | 2/1998 |
| JP | 10-99542 | 4/1998 |
| JP | 10-154038 | 6/1998 |
| JP | 10-254614 | 9/1998 |
| JP | 11-099284 | 4/1999 |
| JP | 11-506857 | 6/1999 |
| JP | 11-305935 | 11/1999 |
| JP | 2000-270237 | 9/2000 |
| JP | 2000-308756 | 11/2000 |
| JP | 2001-038052 | 2/2001 |
| JP | 30-78268 | 4/2001 |
| JP | 2001-104643 | 4/2001 |
| JP | 03-080103 | 6/2001 |
| JP | 2001-175412 | 6/2001 |
| JP | 2001-251324 | 9/2001 |
| JP | 2001-306245 | 11/2001 |
| JP | 2002-062981 | 2/2002 |
| JP | 2002-082751 | 3/2002 |
| JP | 2002-091692 | 3/2002 |
| JP | 2002-153673 | 5/2002 |
| JP | 2002-202843 | 7/2002 |
| JP | 2002-224444 | 8/2002 |
| JP | 2002-232549 | 8/2002 |
| JP | 2002-233665 | 8/2002 |
| JP | 2003-053038 | 2/2003 |
| JP | 34-22383 | 4/2003 |
| JP | 2003-208263 | 7/2003 |
| JP | 2003-325974 | 11/2003 |
| JP | 2004-062774 | 2/2004 |
| JP | 2004-313429 | 11/2004 |
| JP | 2004-313492 | 11/2004 |
| JP | 2005-040493 | 2/2005 |
| JP | 2005-063230 | 3/2005 |
| JP | 2003-140823 | 4/2006 |
| JP | 2006-113019 | 4/2006 |

(56) References Cited

FOREIGN PATENT DOCUMENTS

| | | |
|---|---|---|
| JP | 2002-136694 | 6/2006 |
| JP | 2006-136694 | 6/2006 |
| JP | 2006-216569 | 4/2007 |
| JP | 2007-283134 | 11/2007 |
| NL | 9300171 | 8/1994 |
| RU | 2125853 | 2/1999 |
| RU | 2126161 | 2/1999 |
| RU | 2141738 | 11/1999 |
| WO | 94/02931 | 2/1994 |
| WO | 2004/039055 | 5/1994 |
| WO | 96/05766 | 2/1996 |
| WO | 97/09101 | 3/1997 |
| WO | 97/12337 | 4/1997 |
| WO | 97/17598 | 5/1997 |
| WO | 97/28864 | 8/1997 |
| WO | 97/32641 | 9/1997 |
| WO | 98/11528 | 3/1998 |
| WO | 99/58214 | 11/1999 |
| WO | 00/33168 | 6/2000 |
| WO | 00/35345 | 6/2000 |
| WO | 00/47108 | 8/2000 |
| WO | 00/63874 | 10/2000 |
| WO | 01/86920 | 11/2001 |
| WO | 01/87426 | 11/2001 |
| WO | 01/91042 | 11/2001 |
| WO | 02/17054 | 2/2002 |
| WO | 02/34345 | 5/2002 |
| WO | 03/015005 | 2/2003 |
| WO | 03/107260 | 6/2003 |
| WO | 03/088147 | 10/2003 |
| WO | 2004/012130 | 2/2004 |
| WO | 2004/051391 | 6/2004 |

OTHER PUBLICATIONS

English Abstract for Japanese Patent No. JP11053994, published Feb. 26, 1999.
English Abstract for Japanese Patent No. JP11099284, published Apr. 13, 1999.
English Abstract for Japanese Patent No. JP2001038052, published Feb. 13, 2001.
English Abstract for Japanese Patent No. JP2002224444, published Aug. 13, 2002.
English Abstract for Japanese Patent No. JP2006136694, published Jun. 1, 2006.
English Abstract for Japanese Patent No. WO9732641, published Sep. 12, 1997.
Acar, "Robust Micromachined Vibratory Gyroscopes" Dissertation (Dec. 2004).
Acar, et al., "Experimental evaluation and comparative analysis of commercial variable-capacitance MEMS accelerometers," *Journal of Micromechanics and Microengineering*, vol. 13 (1), pp. 634-645 (May 2003).
Achenbach, "Golf's New Measuring Stick," Golfweek, Jun. 11, 2005, 1 page.
Act Labs: Miacomet Background, 1 page, May 1999, http://www.act-labs.com/realfeel_background/htm.
AirPad Controller Manual (AirPad Corp. 2000).
Airpad Motion Reflext Controller for Sony Playstation—Physical Product (AirPad Corp.2000).
Albrecht, "An Adaptive Digital Filter to Predict Pilot Head Look Direction for Helmet-mounted Displays," MS Thesis University of Dayton (1989).
Algrain, "Estimation of 3-D Angular Motion Using Gyroscopes and Linear Accelerometers," IEEE Transactions on Aerospace and Electronic Systems, vol. 27, No. 6, pp. 910-920 (Nov. 1991).
Algrain, et al., "Accelerometer Based Line-of-Sight Stabilization Approach for Pointing and Tracking System," Second IEEE Conference on Control Applications, vol. 1 , Issue 13-16 pp. 159-163 (Sep. 1993).
Algrain, et al., "Interlaced Kalman Filtering of 3-D Angular Motion Based on Euler's Nonlinear Equations," IEEE Transactions on Aerospace and Electronic Systems, vol. 30, No. 1 (Jan. 1994).

Allen, et al., "A General Method for Comparing the Expected Performance of Tracking and Motion Capture Systems," {VRST} '05: Proceedings of the ACM symposium on Virtual reality software and technology, pp. 201-210 (Nov. 2005).
Allen, et al., "Tracking: Beyond 15 Minutes of Thought," SIGGRAPH 2001 Course 11 (Course Pack) from Computer Graphics (2001).
Alves, "Extended Kalman filtering applied to a full accelerometer strapdown inertial measurement unit," M.S. Thesis Massachusetts Institute of Technology. Dept. of Aeronautics and Astronautics, Santiago (1992).
Analog Devices Data Sheet, "MicroConverter®, Multichannel 12-Bit ADC with Embedded Flash MCU, ADuC812" (2003) (http://www.analog.com/static/imported-files/data_sheets/ADUC812.pdf) 60 pages.
Analog Devices "ADXL50 Single Axis Accelerometer" (Data Sheet), http://www.analog.com/en/obsolete/adx150/products/product.html (Mar. 1996).
Analog Devices "ADXL50 Monolithic Accelerometer with Signal Conditioning" Datasheet (1996).
Analog Devices "ADXRS150 ±150°/s Single Chip Yaw Rate Gyro with Signal Conditioning" (Data Sheet), Rev. B (2004).
Analog Devices "ADXRS401 ±75°/s Single Chip Yaw Rate Gyro with Signal Conditioning" (Data Sheet), Rev. O (2004).
Ang, et al., "Design and Implementation of Active Error Canceling in Hand-held Microsurgical Instrument," Proceedings of the 2001 IEEE/RSJ International Conference on Intelligent Robots and Systems, vol. 2, (Oct. 2001).
Ang, et al., "Design of All-Accelerometer Inertial Measurement Unit for Tremor Sensing in Hand-held Microsurgical Instrument," Proceedings of the 2003 IEEE International Conference on Robotics & Automation (Sep. 2003).
Apostolyuk, Vladislav, "Theory and design of micromechanical vibratory gyroscopes," MEMS/NEMS Handbook, Springer, 2006, vol. 1, pp. 173-195 (2006).
Arcanatech, "IMP User's Guide" (1994).
Arcanatech, IMP (Photos) (1994).
Ascension Technology, The Bird 6D Input Devices (specification) (1998).
"ASCII Grip One Handed Controller," One Switch-ASCII Grip One Handed Playstation Controller, http://www.oneswitch.org.uk/1/ascii/grip.htm , Jul. 11, 2008, pp. 1-2.
"ASCII Grip" One-Handed Controller The Ultimate One-Handed Controller Designed for the Playstation Game Console (ASCII Entertainment 1997).
"ASCII/Sammy Grip V2," One Switch-Accessible Gaming Shop—ASCII Grip V2, http://www.oneswitch.org.uk/1/AGS/AGS-onehand/ascii-grip-v2.html, Jul. 10, 2008, pp. 1-2.
ASCII, picture of one-handed controller, 2 pages (Feb. 6, 2006).
Ashida et al., entitled, "Game Controller," U.S. Appl. No. 11/790,780, filed Apr. 27, 2007, pending.
"At-home fishing" 1 page, Dec. 1996-1999.
Ator, "Image-Velocity with Parallel-Slit Reticles," Journal of the Optical Society of America (Dec. 1963).
Azarbayejani, et al, "Real-Time 3-D Tracking of the Human Body," Proceedings of Image'com 96 (1996).
Azarbayejani, et al., "Visually Controlled Graphics," IEEE Transactions on Pattern Analysis and Machine Intelligence, vol. 15, No. 6, pp. 602-605 (Jun. 1993).
Azuma et al., "Improving Static and Dynamic Registration in an Optical See-Through HMD," International Conference on Computer Graphics and Interactive Techniques Proceedings of the 21st annual conference on Computer graphics and interactive techniques, pp. 197-204 (1994).
Azuma et al., "Making Augmented Reality Work Outdoors Requires Hybrid Tracking," Proceedings of the International Workshop on Augmented Reality, San Francisco, CA, Nov. 1, 1998, Bellevue, Washington, pp. 219-224 (1999).
Azuma, "Predictive Tracking for Augmented Reality," Ph.D. Dissertation, University of North Carolina at Chapel Hill (1995).
Azuma, et al., "A Frequency-Domain Analysis of Head-Motion Prediction," Proceedings of SIGGRAPH '94, pp. 401-408 (1995).

(56) References Cited

OTHER PUBLICATIONS

Azuma, et al., "A motion-stabilized outdoor augmented reality system," Proceedings of IEEE Virtual Reality 99, Houston, TX (Mar. 1999).
Bachmann et al., "Inertial and Magnetic Posture Tracking for Inserting Humans into Networked Virtual Environments," Virtual Reality Software and Technology archive, Proceedings of the ACM Symposium on Virtual Reality Software and Technology, Baniff, Alberta, Canada, pp. 9-16 (2001).
Bachmann et al., "Orientation Tracking for Humans and Robots Using Inertial Sensors" (CIRA '99), Naval Postgraduate School, Monterey, CA (1999).
Bachmann, "Inertial and Magnetic Angle Tracking of Limb Segments for Inserting Humans into Synthetic Environments," Dissertation, Naval Postgraduate School, Monterey, CA (Dec. 2000).
Baker et al., "Active Multimodal Control of a Floppy Telescope Structure," Proc. SPIE, vol. 4825, 74 (Mar. 2003).
Balakrishnan, "The Rockin' Mouse: Integral 3D Manipulation on a Plane," (CHI '97), Univ. Toronto, (1997).
Ballagas, et al., Jan, "iStuff: A Physical User Interface Toolkit for Ubiquitous Computer Environments," Proceedings of the SIGCHI Conference on Human Factors in Computing Systems, vol. 5, No. 1, at 537-44 (ACM) (Apr. 5-10, 2003).
Baraff, "An Introduction to Physically Based Modeling," SIGGRAPH 97 Course Notes (1997).
Bass Fishing "Legends of the Lake", Radica 2 pages, 2002.
Baudisch, et al., "Soap: a pointing device that works in mid-air" Proc. UIST (2006).
BBN Report, "Virtual Environment Technology for Training (VETT)," The Virtual Environment and Teleoperator Research Consortium (VETREC) (Mar. 1992).
Behringer, "Improving Registration Precision Through Visual Horizon Silhouette Matching," Proceedings of the international workshop on Augmented reality : placing artificial objects in real scenes: placing artificial objects in real scenes, Bellevue, Washington, United States pp. 225-232 (1999).
Behringer, "Registration for Outdoor Augmented Reality Applications Using Computer Vision Techniques and Hybrid Sensors," Virtual Reality, 1999 Proceedings., IEEE Computer Society, pp. 244-261 (1999).
BEI Systron Donner Inertial Division, Gyrochip Theory of Operation (2001).
BEI, "BEI GyrochipTM Model QRS11 Data Sheet," BEI Systron Donner Inertial Division, BEI Technologies, Inc., (Sep. 1998).
Benbasat, "An Inertial Measurement Unit for User Interfaces," Massachusetts Institute of Technology Dissertation, (Sep. 2000).
Benbasat, et al., "An Inertial Measurement Framework for Gesture Recognition and Applications," Gesture and Sign Language in Human-Computer Interaction, International Gesture Workshop, GW 2001, London, UK, 2001 Proceedings, LNAI2298, at 9-20, I. Wachsmuth and T. Sowa (eds.), Springer-Verlag Berlin Heibelberg (2001, 2002).
Beuter, A., Publications, University of Quebec at Montreal, http://www.er.uqam.ca/nobel/r11040/publicat.htm (Aug. 2007).
BGM-109 Tomahawk, http://en.wikipedia.org/wiki/BGM-109_Tomahawk, Wikipedia, Jan. 2009.
Bhatnagar, "Position trackers for Head Mounted Display systems: A survey" (Technical Report), University of North Carolina at Chapel Hill (Mar. 1993).
Bianchi, "A Tailless Mouse, New cordless Computer Mouse Invented by ArcanaTech." Inc. Article (Jun. 1992).
Bishop, "The Self-Tracker: A Smart Optical Sensor on Silicon," Ph.D. Dissertation, Univ. of North Carolina at Chapel Hill (1984).
Bishop, et al., "Grids Progress Meeting" (Slides), University of North Carolina at Chapel Hill, NC (1998).
Bishop, et al., Self-Tracker: Tracking for Hybrid Environments without Infrastructure (1996).
Bloomberg: Nintendo Announces Wireless GBA Link, Sep. 2003, 2 pages.

Bona, et al., "Optimum Reset of Ship's Inertial Navigation System," IEEE Transactions on Aerospace and Electronic Systems (1965).
Borenstein, et al., "Where am I? Sensors and Methods for Mobile Robot Positioning" (1996).
Boser, "3-Axis Accelerometer with Differential Sense Electronics," http://www.eecs.berkeley.edu/~boser/pdf/3axis.pdf (1997).
Boser, "Accelerometer Design Example: Analog Devices XL-05/5," http://www.eecs.berkeley.edu/~boser/pdf/x105.pdf (1996).
Bowman et al., *3D User Interfaces: Theory and Practice*, Addison-Wesley, Inc., (2005).
Bowman et al., "An Introduction to 3-D User Interface Design," MIT Presence, vol. 10, No. 1, pp. 96-108 (2001).
Briefs (New & Improved) (Brief Article), PC Magazine, Oct. 26, 1993.
Britton et al., "Making Nested rotations Convenient for the User," ACM SIGGRAPH Computer Graphics, vol. 12, Issue 3, pp. 222-227 (Aug. 1978).
Britton, "A Methodology for the Ergonomic Design of Interactive Computer Graphic Systems, and its Application to Crystallography" (UNC Thesis) (1977).
Brownell, Richard: Review of Peripheral-GameCube-G3 Wireless Controller, GAF, Jul. 17, 2003, 2 pages.
Buchanan, Levi: "Happy Birthday, Rumble Pak," IGN.com, Apr. 3, 2008, 2 pages.
Business Wire, "Feature/Virtual reality glasses that interface to Sega channel," Time Warner, TCI: project announced concourrent with COMDEX (Nov. 1994).
Business Wire, "Free-space 'Tilt' Game Controller for Sony Playstation Uses Scenix Chip; SX Series IC Processes Spatial Data in Real Time for On-Screen" (Dec. 1999).
Business Wire, "InterSense Inc. Launches InertiaCube2—The World's Smallest Precision Orientation Sensor With Serial Interface" (Aug. 14, 2001).
Business Wire, "Logitech Magellan 3D Controller," Logitech (Apr. 1997).
Business Wire, "Mind Path Introduces Gyropoint RF Wireless Remote" (Jan. 2000).
Business Wire, "Pegasus' Wireless PenCell Writes on Thin Air with ART's Handwriting Recognition Solutions," Business Editors/High Tech Writers Telecom Israel 2000 Hall 29, Booth 19-20 (Nov. 2000).
Business Wire, "RPI ships low-cost pro HMD Plus 3D Mouse and VR PC graphics card system for CES" (Jan. 1995).
Buxton, Bill, "Human input/output devices," In M. Katz (ed.), Technology Forecast: 1995, Menlo Park, C.A.: Price Waterhouse World Firm Technology Center, 49-65 (1994).
Buxton, Bill, A Directory of Sources for Input Technologies, http://www.billbuxton.com/InputSources.html, Apr. 2001 (last update 2008).
Buxton et al., "A Study in Two-Handed Input," ACM CHI '86 Proceedings (1986).
Byte, "Imp Coexists With Your Mouse," What's New, ArcanaTec (Jan. 1994).
Canaday, R67-26 "The Lincoln Wand," IEEE Transactions on Electronic Computers, vol. EC-16, No. 2, p. 240 (Apr. 1967).
Caruso et al., "New Perspective on Magnetic Field Sensing," Sensors Magazine (Dec. 1998).
Caruso et al., "Vehicle Detection and Compass Applications using AMR Magnetic Sensors," Honeywell (May 1999).
Caruso, "Application of Magnetoresistive Sensors in Navigation Systems," Sensors and Actuators, SAE SP-1220, pp. 15-21 (Feb. 1997 ).
Caruso, "Applications of Magnetic Sensors for Low Cost Compass Systems," Honeywell, SSEC, http://www.ssec.honeywell.com/magnetic/datasheets/lowcost.pdf (May 1999 ).
Chatfield, "Fundamentals of High Accuracy Inertial Navigation," vol. 174 Progress in Astronautics and Aeronautics, American Institute of Aeronautics and Astronautics, Inc. (1997).
Cheng, "Direct interaction with large-scale display systems using infrared laser tracking devices," ACM International Conference Proceeding Series; vol. 142 (2003).
Cho, et al., "*Magic Wand*: A Hand-Drawn Gesture Input Device in 3-D Space with Inertial Sensors," Proceedings of the 9th Intl Workshop on Frontiers in Handwriting Recognition (IWFHR-9 2004), IEEE (2004).

(56) References Cited

OTHER PUBLICATIONS

CNET News.com, http://news.com.com/2300-1043_3-6070295-2. html?tag=ne.gall.pg, "Nintendo Wii Swings Into Action," May 25 2006, 1pg.

"Coleco Vision: Super Action™ Controller Set," www.vintagecomputing.com/wp-content/images/retroscan/coleco_sac_1_large.jpg. (Sep. 2006).

Computer Mouse (Wikipedia) (Jul. 5, 2005).

"Controllers—Atari Space Age Joystick," *AtariAge: Have You Played Atari Today?* www.atariage.com/controller_page.html?SystemID=2600&ControllerID=12. (Sep. 2006).

"Controllers—Booster Grip," *AtariAge: Have You Played Atari Today?* www.atariage.com/controller_page.html?SystemID=2600&ControllerID=18.(Sep. 2006).

Computergram, "RPI Entertainment Pods Improve Virtual Experience" (1995).

Cookbook, Numerical Recipes Electronic Edition, http://www.library.cornell.edu/nr/cbookcpdf.html (2000?).

Cooke, et al., "NPSNET: flight simulation dynamic modeling using quaternions," Presence, vol. 1, No. 4,pp. 404-420, MIT Press (1992/1994).

Crossan, A. et al.: A General Purpose Control-Based Trajectory Playback for Force-Feedback Systems, University of Glasgow, Dept. Computing Science, 4 pages (Feb. 2008).

CSIDC Winners—Tablet-PC Classroom System Wins Design Competition, IEEE Computer Society Press, vol. 36 , Issue 8, pp. 15-18 , IEEE Computer Society (Aug. 2003).

Cutrone, "Hot products: Gyration GyroPoint Desk, GyroPoint Pro gyroscope-controlled wired and wireless mice" (Computer Reseller News) (Dec. 1995).

Cutts, "A Hybrid Image/Inertial System for Wide-Area Tracking" (Internal to UNC-CH Computer Science) (Jun. 1999 ).

Cyberglove/Cyberforce, Immersion, Cyberforce CyberGlove Systems "Immersion Ships New Wireless CyberGlove(R) II Hand Motion-Capture Glove; Animators, Designers, and Researchers Gain Enhanced Efficiency and Realism for Animation, Digital Prototyping and Virtual Reality Projects," Business Wire, Dec. 7, 2005.

Deruyck, et al., "An Electromagnetic Position Sensor," Polhemus Navigation Sciences, Inc., Burlington, VT (Nov. 1973.).

Dichtburn, "Camera in Direct3D" Toymaker, Mar. 5, 2005, 5 pages, http://web.archive.org/web/20050206032104/http://toymaker.info/games/html/camera.html.

Donelson, et al., "Spatial Management of information" (1978 ).

Eiβele, "Orientation as an additional User Interface in Mixed-Reality Environments," 1. workshop Ervwiterte und Virtuelle Realität, pp. 79-90. GI-Fachgruppe AR/VR (2007).

Electro-Plankton Weblog, http://www.tranism.com/weblog/2005/09/, "This is the Revolution, Nintendo Style," Sep. 15, 2005, 2 pgs.

"Electronic Plastic: BANDAI—Power Fishing", "Power Fishing Company: BANDAI", 1984, 1 page, http:/www.handhelden.com/Bandai/PowerFishing.html.

Emura, et al., "Sensor Fusion Based Measurement of Human Head Motion," 3rd IEEE International Workshop on Robot and Human Communication (Jul. 1994).

Ewalt, David M., "Nintendo's Wii is a Revolution," Review, Forbes.com (Nov. 13, 2006).

Fielder, Lauren: "E3 2001: Nintendo unleashes GameCube software, a new Miyamoto game, and more," GameSpot, May 16, 2001, 2 pages, http://www.gamespot.com/downloads/2761390.

Ferrin, "Survey of Helmet Tracking Technologies," Proc. SPIE vol. 1456, p. 86-94 (Apr. 1991).

Fishing Games: The Evolution of Virtual Fishing Games and related Video Games/Computer Games , 15 pages, 2003.

Foley et al., "Computer Graphics: Principles and Practice," Second Edition, 1990.

Foremski, T. "Remote Control Mouse Aims at Interactive TV", Electronics Weekly, Mar. 9, 1994.

Foxlin et al., "An Inertial Head-Orientation Tracker with Automatic Drift Compensation for Use with HMD's," Proceedings of the conference on Virtual reality software and technology, Singapore, Singapore, pp. 159-173 (1994).

Foxlin et al., "Miniature 6-DOF Inertial System for Tracking HMDs," SPIE vol. 3362 (Apr. 1998).

Foxlin et al., "Miniaturization, Calibration & Accuracy Evaluation of a Hybrid Self-Tracker," The Second IEEE and ACM International Symposium on Mixed and Augmented Reality, pp. 151-160 (2003).

Foxlin et al., "WearTrack: A Self-Referenced Head and Hand Tracker for Wearable Computers and Portable VR," International Symposium on Wearable Computers (ISWC 2000), Oct. 16-18, 2000, Atlanta, GA (2000).

Foxlin, "FlightTracker: A Novel Optical/Inertial Tracker for Cockpit Enhanced Vision, Symposium on Mixed and Augmented Reality," Proceedings of the 3rd IEEE/ACM International Symposium on Mixed and Augmented Reality, pp. 212-221 (Nov. 2004).

Foxlin, "Generalized architecture for simultaneous localization, auto-calibration, and map-building," IEEE/RSJ Conf. on Intelligent Robots and Systems, Lausanne, Switzerland (Oct. 2002).

Foxlin, "Head-tracking Relative to a Moving Vehicle or Simulator Platform Using Differential Inertial Sensors," InterSense, Inc., Presented: Helmet and Head-Mounted Displays V, SPIE vol. 4021, AeroSense Symposium, Orlando, FL, Apr. 24-25, 2000.

Foxlin, "Inertial Head Tracker Sensor Fusion by a Complementary Separate-bias Kalman Filter," Proceedings of the IEEE 1996 Virtual Reality Annual International Symposium, pp. 185-194, 267 (1996).

Foxlin, "Inertial Head-Tracking," MS Thesis, Massachusetts Institute of Technology, Dept. of Electrical Engineering and Computer Science (Sep. 1993).

Foxlin, "Motion Tracking Requirements and Technologies," Chapter 7, from Handbook of Virtual Environment Technology, Stanney Kay, Ed. (2002).

Foxlin, "Pedestrian Tracking with Shoe-Mounted Inertial Sensors," IEEE Computer Graphics and Applications, vol. 25, No. 6, pp. 38-46 (Nov. 2005).

Foxlin, et al., "Constellation: A Wide-Range Wireless Motion-Tracking System for Augmented Reality and Virtual Set Applications," ACM SIGGRAPH, pp. 372-378 (1998).

Foxlin, et al., "VIS-Tracker: A Wearable Vision-Inertial Self-Tracker," IEEE Computer Society (2003).

Frankie, "E3 2002: Roll O Rama", IGN: Roll-o-Rama Preview, . 3 pages. E3 Demo of Kirby game ("Roll O Rama"), http://cube.ign.com/objects/482/482164.html, (May 23, 2002).

Freiburg Center for Data Analysis and Modeling—Publications, http://www.fdm.uni-freiburg.de/cms/puplications/publications/ (Aug. 2007).

Friedmann, et al., "Device Synchronization Using an Optimal Linear Filter," SI3D '92: Proceedings of the 1992 symposium on Interactive 3D graphics, pp. 57-62 (1992).

Friedmann, et al., "Synchronization in virtual realities," MIT Presence, vol. 1, No. 1, pp. 139-144 (1992).

Fröhlich, "The Yo Yo: An interaction device combining elastic and isotonic control," at http://www.uni-weimar.de/cms/medien/vr/research/hci/3d-handheld-interaction/the-yoyo-a-handheld-device-combining-elastic-and-isotonic-input.html(2003).

FrontSide Field Test, "Get This!", Golf Magazine, Jun. 2005, p. 36.

Fuchs, "Intertial Head-Tracking," Massachusetts Institute of Technology, Sep. 1993.

Furniss, Maureen, "Motion Capture," MoCap MIT (Dec. 1999) 12 pages.

"Game Controller" Wikipedia, Aug. 2010, 8 pages, http://en.wikipedia.org/w/index.php?title=Game_controller&oldid=21390758.

"Game Controller" Wikipedia, Jan. 5, 2005.

Gamecubicle, Jim-New Contributor, Nintendo WaveBird Control, http://www.gamecubicle.com/news-nintendo_gamecube_wavebird_controller.htm, May 14, 2002.

Geen et al.: "MEMS Angular Rate-Sensing Gyroscope" pp. 1-3 (2003).

Gelmis, J.: "Ready to Play, The Future Way", Jul. 23, 1996, Buffalo News.

(56) References Cited

OTHER PUBLICATIONS

"Get Bass", Videogame by Sega, The International Arcade Museum and the KLOV, 1998, 4 pages.
"Glove-based input interfaces", Cyberglove/Cyberforce, Jun. 1991, 12 pages, http://www.angelfire.com/ca7/mellott124/glove1.htm.
Goschy, "Midway Velocity Controller" (youtube video http://www.youtube.com/watch?v=wjLhSrSxFNw) (Sep. 8, 2007).
Grewal et al., "Global Positioning Systems, Inertial Navigation and Integration," 2001.
Grimm et al., "Real-Time Hybrid Pose Estimation from Vision and Inertial Data," Proceedings, First Canadian Conference on Computer and Robot Vision, pp. 480-486 (2004).
Gyration, Inc., GyroRemote and Mobile RF Keyboard User Manual, Saratoga, CA 24 pages, www.theater.stevejenkins.com/docs/Gyration_Keyboard_Manual (Mar. 9, 2011).
Gyration, Inc., GyroRemote GP240-01 Professional Series, copyrighted 2003, www.gyration.com.
Gyration Ultra Cordless Optical Mouse, Setting Up Ultra Mouse, Gyration Quick Start Card part No. DL00071-0001 Rev, A. Gyration, Inc. (Jun. 2003).
Gyration Ultra Cordless Optical Mouse, User Manual, 1-15, Gyration, Inc., Saratoga, CA (2003).
Gyration, "Gyration GP110 Ultra Cordless Optical Mouse Data Sheet," http://www.gyration.com/descriptions/document/GP110-SPEC-EN.pdf (2002).
Gyration, "Gyration GP110 Ultra Cordless Optical Mouse User Manual," http://www.gyration.com/descriptions/document/GP110-MANUAL-EN.pdf (2002).
Gyration, "Gyration MicroGyro 100 Developer Kit Data Sheet," http://web.archive.org/web/19980708122611/www.gyration.com/html/devkit.html (Jul. 1998).
Gyration, "Gyration Ultra Cordless Optical Mouse," photos (2002).
Hamilton Institute, http://www.dcs.gla.ac.uk/.about.rod/, R. Murray-Smith (Aug. 2007).
Harada, et al., "Portable Absolute Orientation Estimation Device with Wireless Network under Accelerated Situation" Proceedings, 2004 IEEE International Conference on Robotics and Automation, vol. 2, Issue , Apr. 6-May 1, 2004 pp. 1412-1417 vol. 2 (Apr. 2004).
Harada, et al., "Portable orientation estimation device based on accelerometers, magnetometers and gyroscope sensors for sensor network," Proceedings of IEEE International Conference on Multisensor Fusion and Integration for Intelligent Systems, MFI2003, pp. 191-196 (Jul. 2003).
Hartley, Matt, "Why is the Nintendo Wii So Successful?", SMARTHOUSE—The Lifestyle Technology Guide Website (Sep. 12, 2007).
Haykin, et al., "Adaptive Tracking of Linear Time-Variant Systems by Extended RLS Algorithms, IEEE Transactions on Signal Processing," vol. 45, No. 5 (May 1997).
Heath, "Virtual Reality Resource Guide AI Expert," v9 n5 p. 32(14) (May 1994).
Hinckley, Ken, "Haptic Issues for Virtual Manipulation," Thesis (Dec. 1996).
Hinckley, "Synchronous Gestures for Multiple Persons and Computers", CHI Letters vol. 5 No. 2 (ACM 2003) & Proceedings of the 16th Annual ACM UIST 2003 Symposium on User Interface Software & Technology, at 149-58 (UIST '03 Vancouver BC Canada) (ACM) (Nov. 2003).
Hinckley, et al., "Sensing Techniques for Mobile Interaction," Proceedings of the 13th Annual ACM Symposium on User Interface Software and Technology (San Diego, Cal.), ACM UIST 2000 & Technology, CHI Letters 2 (2), at 91-100 (ACM) (2000).
Hinckley, Ken, et al., "The VideoMouse: A Camera-Based Multi-Degree-of-Freedom Input Device," CHI Letters vol. 1, 1, UIST '99, Asheville, NC, pp. 103-112 (1999).
Hinckley. et al. , "A Survey of Design Issues in Spatial Input," Proceedings of the ACM Symposium on User Interface Software and Technology (1994).
Hinkley et al. Stitching: pen gestures that span multiple displays, 2004.
Hinkley et al.: Synchronomous gestures for multiple persons and computers, 2003.
Hogue, "Marvin: A Mobile Automatic Realtime Visual and INertial tracking system," Master's Thesis, York University (2003).
Hogue, et al., "An optical-inertial tracking system for fully-enclosed VR displays," Proceedings of the 1st Canadian Conference on Computer and Robot Vision, pp. 22-29 (May 2004 ).
Holden, Maureen K., et al.: Use of Virtual Environments in Motor Learning and Rehabilitation Department of Brain and Cognitive Sciences, Handbook of Virtual Environments: Design, Implementation, and Applications, Chap. 49, pp. 999-1026, Stanney (ed), Lawrence Erlbaum Associates 2002.
Hollands, Robin, "Sourceless Trackers," VR News (Apr. 1995).
Holloway, Richard Lee, "Registration Errors in Augmented Reality Systems," Ph.D. Dissertation, University of North Carolina at Chapel Hill (1995).
House, Matthew, Product Description: Hot Wheels Stunt Track Driver, Hot Wheels (Jan. 2000).
Hudson Soft, "Brochure of Toukon Road Brave Warrior, Brave Spirits" (1998).
Hudson Soft—Screen Shot of Brave Spirits (1998 ).
Immersion CyberGlove product, Immersion Corporation, 1990, http://www.cyberglovesystem.com.
Inman, "Cheap sensors could capture your every move," http://technology.newscientist.com/article/dn12963-cheap-sensors-could-capture-your-every-move.html (Nov. 2007 ).
Intersense, "InterSense InertiaCube2 Devices," (Specification) (image) (2001).
Intersense, "InterSense InertiaCube2 Manual for Serial Port Model" (2001).
Intersense, InterSense IS 900 Technical Overview—Motion Tracking System, 1999.
Intersense, "InterSense IS-1200 FlightTracker Prototype Demonstration" (Video) (Nov. 2004).
Intersense, "InterSense IS-1200 InertiaHawk Datasheet" (2009).
Intersense, "InterSense IS-1200 VisTracker Datasheet" (2007).
Intersense, "InterSense IS-1200 VisTracker Devices," (image) (2007).
Intersense, "InterSense IS-900 MicroTraxTM Datasheet" (2007).
Intersense, "InterSense IS-900 Systems Datasheet" (2007).
Intersense, "InterSense MicroTrax Demo Reel," http://www.youtube.com/watch?v=O2F4fu_CISo (2007).
Intersense, "IS-900 Precision Motion Trackers" www.isense.com May 16, 2003.
Intersense, "InterSense Motion Trackers" www.isense.com Mar. 12, 1998.
Intersense, "InterSence Inc., The New Standard in Motion Tracking" www.isense.com Mar. 27, 2004.
Intersense, "IS-900 Precision Motion Trackers" www.isense.com Sep. 10, 2002.
Intersense, "InterSense Mobile Mixed Reality Demonstration" (Video), http://www.youtube.com/watch?v=daVdzGK0nUE&feature=channel_page (Oct. 2006).
Intersense, "InterSense Motion Gaming Tech Demo," http://www.youtube.com/watch?v=7-3y5tdju4E, InterSense (Mar. 2008) (Video).
Intersense, "IS-1200 VisTracker Augmented Maintenance Demonstration" (Video), http://www.intersense.com/IS-1200_Systems.aspx, http://www.youtube.com/watch?v=IMI78s91WQo&feature=channel_page (Jan. 2009).
Intersense, "IS-1200 VisTracker Industrial Cart Demonstration" (Video), InterSense http://www.intersense.com/IS-1200_Systems.aspx http://www.youtube.com/watch?v=7xKLCvDGMgY&feature=channel_page (Jan. 2008).
Intersense, "IS-900 Product Technology Brief," http://www.intersense.com/uploadedFiles/Products/White_Papers/IS900_Tech_Overview_Enhanced.pdf (1999).
Intersense, Inc., "Comparison of InterSense IS-900 System and Optical Systems," http://www.intersense.com/uploadedFiles/Products/White_Papers/Comparison%20of%20InterSense%20IS-900%20System%20and%20Optical%20Systems.pdf (Jul. 12, 2004).

(56) References Cited

OTHER PUBLICATIONS

Interview with Pat Goschy (youtube video http://www.youtube.com/watch?v=oKtZysYGDLE) (Jan. 14, 2008).
Izumori et al, High School Algebra: Geometry (1986), 高等学校の代数・幾何 改訂版.
Jacob, "Human-Computer Interaction—Input Devices" http://www.cs.tufts.edu/~Jacob/papers/surveys.html, "Human-Computer Interaction: Input Devices," ACM Computing Surveys, vol. 28, No. 1, pp. 177-179 (Mar. 1996).
Jakubowsk, et al., "Increasing Effectiveness of Human Hand Tremor Separation Process by Using Higher-Order Statistics," Measurement Science Review, vol. 1 (2001).
Jakubowski, et al., "Higher Order Statistics and Neural Network for Tremor Recognition," IEEE Transactions on Biomedical Engineering, vol. 49, No. 2 (Feb. 2002).
Ji, H.: "Study on the Infrared Remote-Control Lamp-Gesture Device", Yingyong Jiguang/Applied Laser Technology, v. 17, n. 5, p. 225-227, Oct. 1997 Language: Chinese—Abstract only.
Jian, et al., "Adaptive Noise Cancellation," Rice University, http://www.ece.rice.edu/.about.klwang/elec434/elec434.htm, (Aug. 2007).
Jiang, "Capacitive position-sensing interface for micromachined inertial sensors," Dissertation at Univ. of Cal. Berkley (2003).
Ju, et al., "The Challenges of Designing a User Interface for Consumer Interactive Television Consumer Electronics Digest of Technical Papers.," IEEE 1994 International Conference on Volume , Issue , Jun. 21-23, 1994 pp. 114-115 (Jun. 1994).
Kalawsky, "The Science of Virtual Reality and Virtual Environments," 1993.
Keir, et al., "Gesture-recognition with Non-referenced Tracking," IEEE Symposium on 3D User Interfaces, pp. 151-158 (Mar. 25-26, 2006).
Kennedy, P.J., "Hand-Held Data Input Device," IBM Technical Disclosure Bulletin, vol. 26, No. 11, pp. 5826-5827 (Apr. 1984).
Kessler, et al., "The Simple Virtual Environment Library" (MIT Presence) (2000).
Kindratenko, "A Comparison of the Accuracy of an Electromagnetic and a Hybrid Ultrasound-Inertia Position Tracking System," MIT Presence, vol. 10, No. 6, Dec. 2001, 657-663 (2001).
Klein et al.,"Tightly Integrated Sensor Fusion for Robust Visual Tracking," British Machine Vision Computing, vol. 22, No. 10, pp. 769-776 (2004).
Kohler, "Triumph of the Wii: How Fun Won Out in the Console Wars," www.wired.com/print/gaming/hardware/news/2007/06/wii. (Jun. 2007).
Kohlhase, "NASA Report, The Voyager Neptune travel guide," Jet Propulsion Laboratory Publication 89-24, excerpt (Jun. 1989).
Krumm, et al.,"How a Smart Environment Can Use Perception," Ubicomp 2001 (Sep. 2001).
Kuipers, Jack B., "SPASYN—An Electromagnetic Relative Position and Orientation Tracking System," IEEE Transactions on Instrumentation and Measurement, vol. 29, No. 4, pp. 462-466 (Dec. 1980).
Kunz, Andreas M. et al., "Design and Construction of a New Haptic Interface," Proceedings of DETC '00, ASME 2000 Design Engineering Technical Conferences and Computers and Information in Engineering Conference, Baltimore, Maryland (Sep. 10-13, 2000).
La Scala, et al., "Design of an Extended Kalman Filter Frequency Tracker," IEEE Transactions on Signal Processing, vol. 44, No. 3 (Mar. 1996).
Larimer et al., "VEWL: A Framework for building a Windowing Interface in a Virtual Environment," in Proc. of IFIP TC13 Int. Conf. on Human-Computer Interaction Interact'2003 (Zürich, http://people.cs.vt.edu/~bowman/papers/VEWL_final.pdf (2003).
Laughlin, et al., "Inertial Angular Rate Sensors: Theory and Applications," Sensors Magazine (Oct. 1992).
Lee et al., "Tilta-Pointer: the Free-Space Pointing Device," Princeton COS 436 Project, http://www.milyehuang.com/cos436/project/specs.html (2004).
Lee, et al., "Innovative Estimation Method with Measurement Likelihood for all-Accelerometer Type Inertial Navigation System," IEEE Transactions on Aerospace and Electronic Systems, vol. 38, No. 1 (Jan. 2002).
Lee, et al., "Two-Dimensional Position Detection System with MEMS Accelerometer for Mouse Applications" Design Automation Conference, 2001. Proceedings, 2001 pp. 852-857 (Jun. 2001).
Leganchuk et al., "Manual and Cognitive Benefits of Two-Handed Input: An Experimental Study," ACM Transactions on Computer-Human Interaction, vol. 5, No. 4, pp. 326-359 (Dec. 1998).
Leonard, "Computer Pointer Controls 3D Images in Free Space," Electronic Design, pp. 160, 162, 165 , (Nov. 1991).
Liang, et al., "On Temporal-Spatial Realism in the Virtual Reality Environment," ACM 1991 Symposium on User Interface Software and Technology (Nov. 1991).
Link, "Field-Qualified Silicon Accelerometers From 1 Milli g to 200,000 g," Sensors (Mar. 1993).
Liu, et al., "Enhanced Fisher Linear Discriminant Models for Face Recognition," Proc. 14.sup.th International Conference on Pattern Recognition, Queensland, Australia (Aug. 1998).
Lobo et al., "Vision and Inertial Sensor Cooperation Using Gravity as a Vertical Reference," IEEE Trans. on Pattern Analysis and Machine Intelligence, vol. 25, No. 12, pp. 1597-1608 (Dec. 2003).
Logitech, Logitech 2D/6D Mouse Devices Specification (1991).
Logitech, "Logitech 2D/6D Mouse Technical Reference Manual" (1991).
Logitech, Inc., "3D Mouse & Head Tracker Technical Reference Manual" (1992).
Logitech WingMan Cordless Rumblepad, Logitech, Press Release Sep. 2, 2001, 2 pages.
Louderback, Jim, "Nintendo Wii," Reviews by PC Magazine, (Nov. 13, 2006).
"LPC2104/2105/2106, Single-chip 32-bit microcontrollers; 128 kB ISP/IAP Flash with 64 kB/32 kB/16 kB RAM", Phillips, Dec. 22, 2004; 32 pages.
Luinge, Inertial sensing of human movement, Thesis, University of Twente (2002).
Luinge, et al., "Estimation of orientation with gyroscopes and accelerometers," Proceedings of the First Joint BMES/EMBS Conference, 1999., vol. 2, p. 844 (Oct. 1999).
Luthi, P. et al., "Low Cost Inertial Navigation System," and translation (2000).
MacKenzie et al., "A two-ball mouse affords three degrees of freedom," Extended Abstracts of the CHI '97 Conference on Human Factors in Computing Systems, pp. 303-304. New York: ACM (1997).
MacKinlay, "Rapid Controlled Movement Through a Virtual 3D Workspace," ACM SIGGRAPH Computer Graphics archive, vol. 24 , No. 4, pp. 171-176 (Aug. 1990).
Maclean, "Designing with Haptic Feedback", Proceedings of IEEE Robotics and Automation (ICRA '2000), at 783-88 (Apr. 22-28, 2000).
Maclean, Karen, Publications and patents, bibliography (Nov. 2006).
Maggioni, C., "A novel gestural input device for virtual reality", IEEE Virtual Reality Annual International Symposium (Cat. No. 93CH3336-5), 118-24, 1993.
Markey et al., "The Mechanics of Inertial Position and Heading Indication," Massachusetts Institute of Technology, 1961.
Marti et al., "Biopsy navigator: a smart haptic interface for interventional radiological gestures", International Congress Series, vol. 1256, Jun. 2003, 6 pages.
Marrin, "Possibilities for the Digital Baton as a General-Purpose Gestural Interface", Late-Breaking/Short Talks, CHI 97, Mar. 22-27, 1997 (pp. 311-312).
Marrin, Teresa et al.: "The Digital Baton: a Versatile Performance Instrument" (1997).
Marrin, Teresa: "Toward an Understanding of Musical Gesture: Mapping Expressive Intention with the Digital Baton" (1996).
Masliah, "Measuring the Allocation of Control in 6 Degree of Freedom Human-Computer Interaction Tasks," Proceedings of the SIGCHI conference on Human factors in computing systems, pp. 25-32 (2001 ).

(56) References Cited

OTHER PUBLICATIONS

Maybeck, "Stochastic Models, Estimation and Control," vol. 1, Mathematics in Science and Engineering, vol. 141 (1979).
"MEMS enable smart golf clubs" Small Times—MEMS enable smart golf clubs, Jan. 6, 2005, 2 pages.
Merians, Alma S. et al.: "Virtual Reality-Augmented Rehabilitation for Patients Following Stroke," Physical Therapy, vol. 82, No. 9 (Sep. 2002).
Merrill, "FlexiGesture: A sensor-rich real-time adaptive gesture and affordance learning platform for electronic music control," Thesis, Massachusetts Institute of Technology (Jun. 2004).
Meyer et al., "A Survey of Position Tracker," vol. 1, Issue 2, pp. 173-200, MIT Presence, (1992).
Miles, "New pads lack control," The Times, Dec. 6, 1999.
Mizell, "Using Gravity to Estimate Accelerometer Orientation," IEEE Computer Society (2003).
Morgan, C.; "Still chained to the overhead projector instead of the podium? (TV Interactive Corp's LaserMouse Remote Pro infrared mouse) (Clipboard)(Brief Article) (Product Announcement)", Government Computer News, Jun. 13, 1994.
Morris, "Accelerometry—a technique for the measurement of human body movements," J Biomechanics 6: 729-736 (1973).
Moser, "Low Budget Inertial Navigation Platform (2000)," www.tmoser.ch/typo3/11.0.html, Oct. 2008.
Mulder, "How to Build an Instrumental Glove Based on the Powerglove Flex Sensors," PCVR 16, pp. 10-14 (1994).
Mulder, "Human movement tracking technology," School of Kinesiology, Simon Fraser University (Jul. 1994).
Myers, et al., "Interacting at a Distance: Measuring the Performance of Laser Pointers and Other Devices," CHI 2002, (Apr. 2002).
N.I.C.E., "The N.I.C.E. Project" (video), (1997) http://www.niceproject.com/.
Naimark, et al., "Circular Data Matrix Fiducial System and Robust Image Processing for a Wearable Vision-Inertial Self-Tracker," Proceedings. International Symposium on Mixed and Augmented Reality, ISMAR (2002).
Naimark, et al., "Encoded LED System for Optical Trackers," Fourth IEEE and ACM International Symposium on Mixed and Augmented Reality, pp. 150-153 (2005).
Navarrete, et al., "Eigenspace-based Recognition of Faces: Comparisons and a new Approach," Image Analysis and Processing (2001).
Newswire PR, "Five New Retailers to Carry Gyration's Gyropoint Point and Gyropoint Pro" (1996).
Newswire PR, "Three-Axis MEMS-based Accelerometer From STMicroelectronics Targets Handheld Terminals," STMicro (Feb. 2003).
Nichols, "Geospatial Registration of Information for Dismounted Soldiers (GRIDS)," Contractor's Progress, Status, and Management Report (Milestone 3 Report to DARPA ETO) (Oct. 1998).
Nintendo, G3 Wireless Controller (Pelican) (2001).
Nintendo, Game Boy Advance SP System (2003).
Nintendo, GameBoy Color (1998).
Nintendo Game Boy, Consumer Information and Precautions Booklet, Nintendo, Jul. 31, 1969.
Nintendo, GameCube Controller (2001).
Nintendo, GameCube System and Controller (2001).
Nintendo, NES Controller (1984).
Nintendo, NES Duck Hunt Game (1984).
Nintendo, NES System and Controllers (1984).
Nintendo, NES Zapper Guns (1984).
Nintendo, Nintendo 64 Controller (1996).
Nintendo, Nintendo 64 System (N64) (1996).
Nintendo, Nintendo 64 System and Controllers (1996).
Nintendo, Nintendo Entertainment System (NES) (1984).
Nintendo, Nintendo Game Boy Advance (2001).
Nintendo, Nintendo Game Boy Advance System (2001).
Nintendo, Nintendo Game Boy Advance Wireless Adapter (Sep. 26, 2003).
Nintendo, Nintendo Game Boy Color Game Cartridge with Built-In Rumble (Jun. 28, 2009).
Nintendo, Nintendo GameBoy Color System (1998).
Nintendo, Nintendo GameBoy System (1989).
Nintendo, Nintendo GameCube System (2001).
Nintendo, Nintendo N64 Controller with Rumble Pack (1996-1997).
Nintendo, Nintendo N64 Rumble Packs (1996-1997).
Nintendo, Nintendo Super NES (SNES) (1991).
Nintendo, Nintendo: Kirby Tilt & Tumble game, packaging and user manual (Aug. 2000-2001).
Nintendo, Nintendo: WarioWare: Twisted game, packaging and user manual (2004-2005).
Nintendo, Pokemon Pinball (1998).
Nintendo, SNES Superscope (1991).
Nintendo, SNES System & Controllers (1991).
Nintendo, Wavebird Wireless Controllers (May 2002).
Nintendo Wavebird Controller, Nintendo, Jun. 2010 Wikipedia Article, http://en.wikipedia.org/wiki/WaveBird.
Nintendo, Nintendo Entertainment System Consumer Information and Precautions Booklet, Ninendo of America, Inc. 1992.
Nintendo, Nintendo Entertainment System Instruction Nintendo of America, Inc. 1992.
Nintendo, Nintendo Entertainment System Booth 2002.
Nintendo, Nintendo Entertainment System Layout, May 9, 2002.
Nintendo, Nintendo Feature: History of Pokeman Part 2, Official Nintendo Magazine May 17, 2009, http:///www.officialnintendomagazine.co.uk/article.php?id=8576.
Nishiyama, "A Nonlinear Filter for Estimating a Sinusoidal Signal and its Parameters in White Noise: On the Case of a Single Sinusoid," IEEE Transactions on Signal Processing, vol. 45, No. 4 (Apr. 1997).
Nishiyama, "Robust Estimation of a Single Complex Sinusoid in White Noise-H.infin. Filtering Approach," IEEE Transactions on Signal Processing, vol. 47, No. 10 (Oct. 1999).
Odell, "An Optical Pointer for Infrared Remote Controllers," Proceedings of International Conference on Consumer Electronics (1995).
Odell, Transcript of Testimony, Investigation No. 337-TA-658, Before the United States International Trade Commission, vol. IV, redacted (May 14, 2009).
Ogawa et al., "Wii are the Elite," GameSpot web site (Feb. 5, 2008).
Ojeda, et al., "No GPS? No Problem!" University of Michigan Develops Award-Winning Personal Dead-Reackoning (PDR) System for Walking Users, http://www.engin.umich.edu/research/mrl/urpr/In_Press/P135.pdf (post 2004).
OLPC, "One Laptop Per Child," wiki.laptop.org/go/One_Laptop_per_Child (May 2009).
Omelyan, "On the numerical integration of motion for rigid polyatomics: The modified quaternion approach" Computers in Physics, vol. 12 No. 1, pp. 97-103 (1998).
Ovaska, "Angular Acceleration Measurement: A Review," Instrumentation and Measurement Technology Conference, Conference Proceedings. IEEE, vol. 2 (Oct. 1998).
PAD-Controller and Memory I/F in Playstation (Apr. 17, 1995; Jan. 12, 2002).
Pai, et al., "The Tango: A Tangible Tangoreceptive Whole-Hand Interface," Proceedings of World Haptics and IEEE Eurohaptics Conference, Symposium on Haptic Interfaces for Virtual Environment and Teleoperator Systems (2005).
Paley, W. Bradford, "Interaction in 3D Graphics," SIGGRAPH Computer Graphics Newsletter, Cricket input device (Nov. 1998).
Paradiso, et al., "Interactive Therapy with Instrumented Footwear," CHI 2004, Apr. 24-29, 2004, Vienna, Austria (2004).
Paradiso, Joseph A., "The Brain Opera Technology: New Instruments and Gestural Sensors for Musical Interaction and Performance" (Nov. 1998) ("Brain Opera Article").
Park, Adaptive control strategies for MEMS gyroscopes (Dissertation), Univ. Cal. Berkley (2000).
PC World, "The 20 Most Innovative Products of the Year" (Dec. 27, 2006).
Perry Simon: "Nintendo to Launch Wireless Game Boy Adaptor," Digital Lifestyles, Sep. 26, 2003 http://digital-lifestyles.info/2003/09/26/nintendo-to-launch-wireless-game-boy-adaptor/.
Pham, Hubert "Pointing in Intelligent Environments with WorldCursor," Proceedings of Internet 2003, Andrew Wilson (2003).

(56) References Cited

OTHER PUBLICATIONS

Phillips, "Forward/Up Directional Incompatibilities During Cursor Placement Within Graphical User Interfaces," Ergonomics, informaworld.com (May 2005).
Phillips, "On the Right Track: A unique optical tracking system gives users greater freedom to explore virtual worlds" (Apr. 2000).
Photographs of prior art ASCII Grip V2 Controller, (previous IDS as: ASCII/Sammy Grip V2 One Switch-Accessible Gaming Shop-ASCII Grip V2, http://www.oneswitch.org.uk/I/AGS/AGS-onehand/ascii-grip-v2.html, Jul. 10, 2008, pp. 1-2.).
Pierce et al., "Image Plane Interaction Techniques in 3D Immersive Environments," Proceedings of the 1997 symposium on Interactive 3D graphics, portal.acm.org (1997).
Pilcher, "AirMouse Remote Controls," IEEE Conference on Consumer Electronics (1992).
Pique, "Semantics of Interactive Rotations," Interactive 3D Graphics, Proceedings of the 1986 workshop on Interactive 3D graphics, pp. 259-269 (Oct. 1986).
Piyabongkarn, "Development of a MEMS Gyroscope for Absolute Angle Measurement," IEEE Transactions on Control Systems Technology, vol. 13, Issue 2, pp. 185-195 (Mar. 2005).
Piyabongkarn, "Development of a MEMS Gyroscope for Absolute Angle Measurement," Dissertation, Univ. Minnesota (Nov. 2004).
Pokeman Pinball Game, 1999, Wikipedia Article, http://en.wikipedia.org/wiki/Pok?C3?A9mon_Pinball.
Polhemus, "Polhemus 3SPACE FASTRAK devices" (image) (2000).
Polhemus: "FASTRAK, The Fast and Easy Digital Tracker" copyrighted 2001, Coldiester, Vermont 2 pages.
PowerGlove product Program Guide, Mattel, 1989.
PowerGlove product, Mattel, 1989 Wikipedia Article.
PowerGlove product, Instructions, Mattel, 1989.
Pryor et al., "A Reusable Software Architecture for Manual Controller Integration," IEEE Conf. on Robotics and Automation, Univ of Texas (Apr. 1997).
Raab, et al., "Magnetic Position and Orientation Tracking System," IEEE Transactions on Aerospace and Electronic Systems, vol. AES-15, No. 5, pp. 709-718 (Sep. 1979).
Raethjen, et al., "Tremor Analysis in Two Normal Cohorts," Clinical Neurophysiology 115 (2004).
Rebo, "Helmet-mounted virtual environment display system," Thesis, Air Force Institute of Technology, Defense Technical Information Center (Dec. 1988).
Rebo, et al., "Helmet-Mounted Virtual Environment Display System," Proc. SPIE vol. 1116, pp. 80-84 (Sep. 1989).
Regan, "Smart Golf Clubs", The Baltimore Sun, Jun. 17, 2005, 1 page.
Rekimoto, "Tilting Operations for Small Screen Interfaces," Proceedings of the 9th Annual ACM Symposium on User Interface Software and Technology, pp. 167-168 (1996).
Reunert, "Fiber-Optic Gyroscopes: Principles and Applications," Sensors, (Aug. 1993).
Ribo, et al., "Hybrid Tracking for Outdoor Augmented Reality Applications," IEEE Computer Graphics and Applications, vol. 22, No. 6, pp. 54-63 (Nov./Dec. 2002).
Riviere, Cameron, Testimony, Trial Day 5, In the Matter of Certain Video Game Machines and Related Three-Dimensional Pointing; Devices, ITC Investigation No. 337-TA-658 (May 15, 2009).
Riviere, C., Robotics Institute, http://www.ri.cmu.edu/people/riviere.sub.—cameron.html http://www.ri.cmu.edu/person.html?type=publications&person_id=248 (Aug. 2007).
Riviere, et al., "Adaptive Canceling of Physiological Tremor for Improved Precision in Microsurgery," IEEE Transactions on Biomedical Engineering, vol. 45, No. 7 (Jul. 1998).
Riviere, et al., "Toward Active Tremor Canceling in Handheld Microsurgical Instruments," IEEE Transactions on Robotics and Automation, vol. 19, No. 5 (Oct. 2003).
Roberts, "The Lincoln Wand," AFIPS Conference Proceedings, MIT Lincoln Laboratory (1966).
Robinett et al., "Implementation of Flying, Scaling, and Grabbing in Virtual Worlds," ACM Symposium (1992).
Robinett et al., "The Visual Display Transformation for Virtual Reality," University of North Carolina at Chapel Hill (1994).
Robotics Research Group, "Robot Design: Robot Manual Controller Design," The University of Texas of Austin, May 2009.
Roetenberg, "Inertial and magnetic sensing of human motion," Thesis (2006).
Roetenberg, et al., "Inertial and Magnetic Sensing of Human Movement Near Ferromagnetic Materials," Proceedings. The Second IEEE and ACM International Symposium on Mixed and Augmented Reality (Mar. 2003).
Rolland, et al., "A Survey of Tracking Technology for Virtual Environments," University of Central Florida, Center for Research and Education in Optics Lasers (CREOL) (2001).
Sakai, et al., "Optical Spatial Filter Sensor for Ground Speed," Optical Review, vol. 2, No. 1 pp. 65-67 (1994).
Satterfield, Shane, E3 2002: Nintendo announces new GameCube games, GameSpot, May 21, 2002, http://wwwgamespot.com/gamecube/action/rollarama/new.html?sid=2866974&com_&_clk=nesfeatures&tag=newsfeatures%Btitle%3B.
Savage, Paul G., "Advances in Strapdown Inertial Systems," Lecture Series Advisory Group for Aerospace Research and Development Neuilly-Sur-Seine (France) (1984).
Sawada et al., "A Wearable Attitude-Measurement System Using a Fiberoptic Gyroscope" Massachusetts Institute of Technology, vol. 11, No., Apr. 2002, pp. 109-118.
Saxena et al., "In Use Parameter Estimation of Inertial Sensors by Detecting Multilevel Quasi-Static States," Lecture Notes in Computer Science, 2005—Berlin: Springer-Verlag, (Apr. 2004).
Sayed, "A Framework for State-Space Estimation with Uncertain Models," IEEE Transactions on Automatic Control, vol. 46, No. 7 (Jul. 2001).
Sayed, UCLA Adaptive Systems Laboratory-Home Page, UCLA, http://asl.ee.ucla.edu/index.php?option=com.sub.—frontpage&Itemid=1 (Aug. 2007).
Schmorrow et al., "The PSI Handbook of Virtual Environments for Training and Education," vol. 1, 2009.
Schofield, Jack et al., Coming up for airpad, The Guardian (Feb. 2000).
Sega/Sports Sciences, Inc., "Batter Up, It's a Hit," Instruction Manual, Optional Equipment Manual (1994).
Sega/Sports Sciences, Inc., "Batter Up, It's a Hit," Photos of baseball ball (1994).
Selectech, "Airmouse Remote Control System Model AM-1 User's Guide," Colchester, VT (Sep. 24, 1991).
Selectech, "AirMouse Remote Controls, AirMouse Remote Control Warranty" (1991).
Selectech, "Changing Driver Versions on CDTV/AMIGA" (Oct. 17, 1991).
Selectech, "Selectech AirMouse Remote Controls, Model # AM-R1," photographs (1991).
Selectech, Facsimile Transmission from Rossner to Monastiero, Airmouse Remote Controls, Colchester, VT (Mar. 25, 1992).
Selectech, Selectech AirMouse Devices (image) (1991).
Selectech, Software, "AirMouse for DOS and Windows IBM & Compatibles," "AirMouse Remote Control B0100EN-C, Amiga Driver, CDTV Driver, Version: 1.00," "AirMouse Remote Control B0100EM-C.1, Apple Macintosh Serial Driver Version: 1.00 (1.01B)," "AirMouse Remote Control B0100EL-B/3.05 DOS Driver Version: 3.0, Windows Driver Version 1.00," AirMouse Remote Control MS-DOS Driver Version: 3.00/3.05, Windows 3.0 Driver Version: 1.00 (1991).
"Self-Contained, Free Standing "Fishing Rod" Fishing Games," Miacomet and Interact Announce Agreement to Launch Line of Reel Feel™ Sport Controllers, Press Release, May 13, 1999, 4 pages.
Seoul National Univ., "EMMU System"—Seoul National Univ Power Point Presentation, www.computer.org/portal/cms_docs_ieeecs/ieeecs/education/csidc/CSIDC03Presentations/SNU.ppt (2003).
Serial Communication (Wikipedia) (Jul. 2, 2005).
Shoemake, Ken, Quaternions, UPenn, Online (Oct. 2006).
Simon, et al. "The YoYo: A Handheld Combining Elastic and Isotonic Input," http://www.uni-weimar.de/cms/fileadmin/medien/vr/documents/publications/TheYoYo-Interact2003-Talk.pdf (2003).

(56) References Cited

OTHER PUBLICATIONS

Simon, et al., "The YoYo: A Handheld Device Combining Elastic and Isotonic Input," Human-Computer Interaction—Interact'03, pp. 303-310 (2003).
Smartswing internal drawing, 1 page (2004).
Smartswing, Training Aid, Apr. 2005, Austin, Texas.
Smartswing: "Register to be notified when Smartswing products are available for purchase," 3 pages, May 2004, retrieved May 19, 2009, http://web.archive.org/web/20040426182437/www.smartswinggolf.com/.
Smartswing: "SmartSwing: Intellegent Golf Clubs that Build a Better Swing," 2 pages, 2004 retrieved May 19, 2009, http://web.archive.org/web/20040728221951/http://www.smartswinggolf . . . .
Smartswing: "The SmartSwing Learning System Overview," 3 pages, 2004, retrieved May 19, 2009, http://web.archive.org/web/20040810142134/http://www.smartswinggolf.com/t . . . .
Smartswing: "The SmartSwing Product, 3 pages, 2004, retrieved May 19, 2009, http://web.archive.org/web/200400403204628/http://www.smartswinggolf.com/ . . . . "
Smartswing: The SmartSwing Product Technical Product: Technical Information, 1 page, 2004, retrieved May 19, 2009, http://web.archive.org/web/200400403205906/http://www.smartswinggolf.com/ . . . .
Smartswing, Letter from the CEO—pp. 1-3, May 2009.
Smartswing: The SmartSwing Learning System: How it Works, 3 pages, 2004, retrieved May 19, 2009, http://web.archive.org/web/20040403213108/http://www.smartswinggolf.com/ . . . .
Smith, "Gyrevolution: Orienting the Digital Era," http://www.gyration.com/images/pdfs/Gyration_White_Paper.pdf (2007).
Sorenson, et al., "The Minnesota Scanner: A Prototype Sensor for Three-Dimensional Tracking of Moving Body Segments," IEEE Transactions on Robotics and Animation (Aug. 1989).
Sourceforge.com, "ARToolkit API Documentation" (SourceForge web pages) (2004-2006).
Stovall, "Basic Inertial Navigation," NAWCWPNS TM 8128, Navigation and Data Link Section, Systems Integration Branch (Sep. 1997).
Sulic, "Logitech Wingman Cordless Rumblepad Review", Review at IGN, 4 pages, Jan. 14, 2002.
"Superfamicom Grip controller by ASCII," http://superfami.com/sfc_grip.html, Jul. 10, 2008, p. 1-2.
Sutherland, "A Head-Mounted Three Dimensional Display," AFIPS '68 (Fall, part I): Proceedings of the Dec. 9-11, 1968, fall joint computer conference, part I, pp. 757-764 (Dec. 1968).
Sutherland, Ivan E., "Sketchpad: A Man-Machine Graphical Communication System," AFIPS '63 (Spring): Proceedings of the May 21-23, 1963, Spring Joint Computer Conference, pp. 329-346 (May 1963).
Sweetster, "A Quaternion Algebra Tool Set," http://world.std.com/%7Esweetser/quaternions/intro/tools/tools.html (Jun. 2005).
Swisher "How Science Can Improve Your Golf Game, Your Club is Watching" The Wall Street Journal, Apr. 18, 2005, 1 page.
Templeman, James N., "Virtual Locomotion: Walking in Place through Virtual Environments," Presence, vol. 8 No. 6, pp. 598-617, Dec. 1999.
Thinkoptics, Thinkoptics Wavit devices (image) (2007).
Timmer, "Data Analysis and Modeling Dynamic Processes in the Life Sciences," Freiburg Center for Data Analysis and Modeling, http://webber.physik.uni-freiburg.de/.about.jeti/ (Aug. 2007).
Timmer, "Modeling Noisy Time Series: Physiological Tremor," International Journal of Bifurcation and Chaos, vol. 8, No. 7 (1998).
Timmer, et al, "Pathological Tremors: Deterministic Chaos or Nonlinear Stochastic Oscillators?" Chaos, vol. 10, No. 1 (Mar. 2000).
Timmer, et al., "Characteristics of Hand Tremor Time Series," Biological Cybernetics, vol. 70 (1993).
Timmer, et al., Cross-Spectral Analysis of Physiological Tremor and Muscle Activity: I Theory and Application to unsynchronized electromyogram, vol. 78 (1998).
Timmer, et al., Cross-Spectral Analysis of Physiological Tremor and Muscle Activity: II Application to Synchronized Electromyogram, Biological Cybernetics, vol. 78 (1998).
Timmer, et al., "Cross-Spectral Analysis of Tremor Time Series," International Journal of Bifurcation and Chaos, vol. 10, No. 11 (2000).
Titterton et al., "Strapdown Inertial Navigation Technology," pp. 1-56 and pp. 292-321 (May 1997).
TRAQ 3D (Trazer) Product, http://www.exergamefitness.com/traq_3d.htm, http://www.trazer.com/, http://www.traq3d.com/ (1997).
Traq 3D, "Healthcare" 1 pages, //www.traq3d.com/Healthcare/Healthcare.aspx, 1997.
Translation of the brief of BigBen of Oct. 27, 2010 and original German text (Nov. 3, 2010).
Translation of the brief of System Com 99 of Oct. 27, 2010 and original German text.
Translation of Exhibit B-B01: Cancellation Request of BigBen of Oct. 15, 2010 against German utility model 20 2006 020 818 (UM1) (Oct. 15, 2010) and original German text.
Translation of Exhibit B-C01: Cancellation Request of BigBen of Oct. 15, 2010 against German utility model 20 2006 020 819 (UM2) (Oct. 15, 2010) and original German text.
Translation of Exhibit B-D01: Cancellation Request of BigBen of Oct. 15, 2010 against German utility model 20 2006 020 820 (UM3) (Oct. 15, 2010) and original German text.
Translation of Opposition Brief of BigBen of Sep. 2, 2010 Against European Patent No. EP 1854518.
Transmission Mode (Apr. 22, 1999).
Ulanoff, Lance, "Nintendo's Wii is the Best Product Ever," PC Magazine (Jun. 21, 2007).
UNC Computer Science Department, "News & Notes from Sitterson Hall," UNC Computer Science, Department Newsletter, Issue 24, Spring 1999 (Apr. 1999).
Univ. Illinois at Chicago, "Cave—A Virtual Reality Theater," http://www.youtube.com/watch?v=—Sf6bJjwSCE 1993.
Univ. Wash., "ARToolkit" (U. Wash. web pages) (1999).
Urban, "BAA 96-37 Proposer Information," DARPA/ETO (1996).
US Dynamics Corp, "Spinning Mass Mechanical Gyroscopes" (Aug. 2006).
US Dynamics Corp, "The Concept of 'Rate' (more particularly, angular rate pertaining to rate gyroscopes) (rate gyro explaination)," (Aug. 2006).
US Dynamics Corp, "US Dynamics Model 475 Series Rate Gyroscope Technical Brief—brief discussion on rate gyroscope basics, operation, and uses, and a dissection of the model by major component" (Dec. 2005).
US Dynamics Corp, "US Dynamics Rate Gyroscope Interface Brief (rate gyro IO)" (Aug. 2006).
VTI, Mindflux-VTi CyberTouch, 1996, http://www.mindflux.com.au/products/vti/cybertouch.html.
Van Den Bogaard, "Using linear filters for real-time smoothing of rotational data in virtual reality application," http://www.science.uva.nl/research/ias/alumni/m.sc.theses/theses/RobvandenBogaard.pdf (Aug. 2004).
Van Laerhoven, et al., "Using an Autonomous Cube for Basic Navigation and Input," Proceedings of the 5th International Conference on Multimodal interfaces, Vancouver, British Columbia, Canada, pp. 203-210 (2003).
Van Rheeden, et al., "Noise Effects on Centroid Tracker Aim Point Estimation," IEEE Trans. on Aerospace and Electronic Systems, vol. 24, No. 2, pp. 177-185 (Mar. 1988).
Vaz, et al., "An Adaptive Estimation of Periodic Signals Using a Fourier Linear Combiner," IEEE Transactions on Signal Processing, vol. 42, Issue 1, pp. 1-10 (Jan. 1994).
Verplaetse, "Inertial Proprioceptive Devices: Self-Motion Sensing Toys and Tools," IBM Systems Journal (Sep. 1996).
Verplaetse, "Inertial-Optical Motion-Estimating Camera for Electronic Cinematography," Masters of Science Thesis, MIT, (1997).
Villoria, Gerald, Hands on Roll-O-Rama Game Cube, Game Spot, May 29, 2002, http://www.gamespot.com/gamecube/action/rollorama/news.html?sid=2868421&com_act=convert&om_clk=newsfeatures&tag=newsfeatures;title;1&m.

(56) References Cited

OTHER PUBLICATIONS

Virtual Fishing, Operational Manual, 2 pages, Tiger Electronics, Inc., 1998.
Virtual Technologies, Inc., Cyberglove brochure, Palo Alto, CA, www.virtex.com. (1999).
Vorozcovs, et al.,"The Hedgehog: A Novel Optical Tracking Method for Spatially Immersive Displays," MIT Presence, vol. 15, No. 1, pp. 108-121 (2006).
VR Solutions, "IS-1200", www.vrs.com.au/motion-tracking/intersense/is-1200.html 2 pages (May 2009).
Wang, et al., "Tracking a Head-Mounted Display in a Room-Sized Environment with Head-Mounted Cameras," SPIE 1990 Technical Symposium on Optical Engineering and Photonics in Aerospace Sensing, vol. 1290, pp. 47-57 (1990).
Ward, et al., "A Demonstrated Optical Tracker With Scalable Work Area for Head-Mounted Display Systems," Symposium on Interactive 3D Graphics, Proceedings of the 1992 Symposium on Interactive 3D Graphics, pp. 43-52, ACM Press, Cambridge, MA (1992).
Watt, *3D Computer Graphics*, "Three-Dimensional Geometry in Computer Graphics,", pp. 1-22 Addison-Wesley (1999).
Welch et al., HiBall Devices (image) (2002-2006).
Welch et al., Motion Tracking: No Silver Bullet, but a Respectable Arsenal IEEE Computer Graphics and Applications, vol. 22, No. 6, pp. 24-38 (Nov. 2002).
Welch, "Hybrid Self-Tracker: An Inertial/Optical Hybrid Three-Dimensional Tracking System," Tech. Report TR95-048, Dissertation Proposal, Univ. of North Carolina at Chapel Hill, Dept. Computer Science, Chapel Hill, N.C. (1995).
Welch, "A Self-Contained Wide-Area Tracker Using Sensor Fusion" (2001).
Welch, "Hawkeye Zooms in on Mac Screens with Wireless Infrared Penlight Pointer," Mac Week (May 1993).
Welch, et al., "Complementary Tracking and Two-Handed Interaction for Remote 3D Medical Consultation with a PDA," Proceedings of Trends and Issues in Tracking for Virtual Environments, Workshop at the IEEE Virtual Reality 2007 Conference (Mar. 2007).
Welch, et al., "High-Performance Wide-Area Optical Tracking: The HiBall Tracking System," MIT Presence: Teleoperators & Virtual Environments (2001).
Welch, et al., "SCAAT: Incremental Tracking with Incomplete Information" Computer Graphics, SIGGRAPH 97 Conference Proceedings, pp. 333-344 (Aug. 1997).
Welch, et al., "Source Code for HiBall+Inerital device," UNC-CH Computer Science (Jun. 1998).
Welch, et al., "The HiBall Tracker: High-Performance Wide-Area Tracking for Virtual and Augmented Environments," ACM SIGGRAPH, Addison-Wesley (1999).
Welch, et al., "The High-Performance Wide-Area Optical Tracking : The HiBall Tracking System," MIT Presence, Presence, vol. 10 , No. 1 (Feb. 2001).
Welch, et al., "Tracking for Training in Virtual Environments: Estimating the Pose of People and Devices for Simulation and Assessment," [J. Cohn, D. Nicholson, and D. Schmorrow, editors, The PSI Handbook of Virtual Environments for Training and Education: Developments for the Military and Beyond, Chap. 1, pp. 23-47] (2008).
Widrow, et al., "Fundamental Relations Between the LMS Algorithm and the DFT," IEEE Transactions on Circuits and Systems, vol. 34, No. CAS-7, (Jul. 1987).
Wiley, M.: "Nintendo Wavebird Review," US, Jun. 11, 2002, 21 pages.
Williams, et al., "Physical Presence: Palettes in Virtual Spaces," Society of Photo-Optical Instrumentation Engineers (SPIE) Conference Series, vol. 3639, No. 374-384 (May 1999).
Williams, Robert L. et al., "Implementation and Evaluation of a Haptic Playback System," vol. 3 No. 3, Haptics-e (2004).
Williams, Robert L. et al., "The Virtual Haptic Back Project," Presented at the IMAGE 2003 Conference, Scottsdale, Arizong (Jul. 14-18, 2003).

Wilson, "Wireless User Interface Devices for Connected Intelligent Environments," Ubicomp 2003 Workshop (2003).
Wilson, "WorldCursor: Pointing in Intelligent Environments with the World Cursor," UIST '03 Companion (Nov. 2003).
Wilson, Research page, biography available at http://research.microsoft.com/en-us/um/people/awilson/?0sr=a, Microsoft Corp. (2009).
Wilson, Transcript of Testimony, Investigation No. 337-TA-658, Before the United States International Trade Commission, vol. V (May 15, 2009).
Wilson, XWand video, http://research.microsoft.com/~awilson/wand/wand%20video%20768k.WMV (Mar. 2002).
Wired Glove, Wikipedia Article, 4 pages, http://en.wikipedia.org/wiki/Wired_glove, (Nov. 18, 2010).
Wireless (Wikipedia) (Aug. 12, 2005).
Wormell, "Unified Camera, Content and Talent Tracking in Digital Television and Movie Production," InterSense, Inc. & Mark Read, Hypercube Media Concepts, Inc. Presented: NAB 2000, Las Vegas, NV, Apr. 8-13, 2000.
Wormell, et al., "Advancements in 3D Interactive Devices for Virtual Environments," ACM International Conference Proceeding Series; vol. 39 (2003).
Worringham, et al., "Directional Stimulus-Response Compatibility: A Test of Three Alternative Principles," Ergonomics, vol. 41, Issue 6, pp. 864-880 (Jun. 1998).
www.3rdtech.com (2000-2006).
Yang, et al., "Implementation and Evaluation of 'Just Follow Me': An Immersive, VR-Based, Motion-Training System," MIT Presence: Teleoperators and Virtual Environments, vol. 11 No. 3, at 304-23 (MIT Press) (Jun. 2002).
You, et al., "Hybrid Inertial and Vision Tracking for Augmented Reality Registration," http://graphics.usc.edu/cgit/pdf/papers/Vr1999.PDF (1999).
You, et al., "Orientation Tracking for Outdoor Augmented Reality Registration," IEEE Computer Graphics and Applications, IEEE, vol. 19, No. 6, pp. 36-42 (Nov. 1999).
Youngblut, et al., "Review of Virtual Environment Interface Technology," Institute for Defense Analyses (Jul. 1996).
Yun, et al., "Recent Developments in Silicon Microaccelerometers," SENSORS, University of California at Berkeley (Oct. 1992).
Zhai, "Human Performance in Six Degree of Freedom Input Control," Thesis, University of Toronto (1995).
Zhai, "User Performance in Relation to 3D Input Device Design", Computer Graphics 32(4), Nov. 1998, 15 pages.
Zhou, et al., "A survey—Human Movement Tracking and Stroke Rehabilitation," Technical Report: CSM-420, ISSN 1744-8050, Dept. of Computer Sciences, University of Essex, UK (Dec. 8, 2004).
Zhu, et al., "A Real-Time Articulated Human Motion Tracking Using Tri-Axis Inertial/Magnetic Sensors Package," IEEE Transactions on Neural Systems and Rehabilitation Engineering, vol. 12, No. 2 (Jun. 2004).
European Search Report for Application No. EP 07 11 2880, Oct. 18, 2007.
Office Action issued in related Chinese patent application 200610111559.7 (Sep. 18, 2009).
Office Action issued in related Japanese patent application 2006-216569 (Oct. 20, 2009).
Office Action issued in corresponding Japanese patent application 2007-203785 (Oct. 27, 2008).
Office Action issued in corresponding Japanese patent application 2008-256858 (Sep. 9, 2010).
Notice of Allowance issued on Feb. 22, 2011 in U.S. Appl. No. 11/446,188.
Office Action issued Oct. 21, 2009 in U.S. Appl. No. 11/446,188.
Office Action issued Feb. 27, 2009 in U.S. Appl. No. 11/446,188.
Office Action issued Apr. 30, 2008 in U.S. Appl. No. 11/446,188.
Notice of Allowance issued on Apr. 15, 2010 in U.S. Appl. No. 11/532,328.
Office Action issued Oct. 6, 2009 in U.S. Appl. No. 11/532,328.
Office Action issued Nov. 25, 2008 in U.S. Appl. No. 11/532,328.
Office Action issued Oct. 19, 2010 in U.S. Appl. No. 11/446,187.
Office Action (Examiner-Initiated Interview Summary) issued Oct. 26, 2009 in U.S. Appl. No. 11/446,187.

(56) References Cited

OTHER PUBLICATIONS

Office Action issued Aug. 19, 2009 in U.S. Appl. No. 11/446,187.
Office Action issued Apr. 29, 2009 in U.S. Appl. No. 11/446,187.
Office Action issued Feb. 26, 2009 in U.S. Appl. No. 11/446,187.
Office Action issued Jul. 1, 2008 in U.S. Appl. No. 11/404,871.
Office Action issued Jun. 14, 2010 in U.S. Appl. No. 11/404,871.
Office Action issued Sep. 30, 2009 in U.S. Appl. No. 11/404,871.
Office Action issued Mar. 18, 2009 in U.S. Appl. No. 11/404,871.
Office Action issued Sep. 4, 2008 in U.S. Appl. No. 11/404,871.
Examiner's Answer issued Feb. 22, 2011 in U.S. Appl. No. 11/404,871.
Office Action issued Sep. 1, 2010 in U.S. Appl. No. 11/790,780.
Office Action issued Mar. 12, 2010 in U.S. Appl. No. 11/790,780.
Notice of Allowance issued May 21, 2010 in U.S. Appl. No. 12/222,787.
Office Action issued Feb. 5, 2010 in U.S. Appl. No. 12/222,787.
Office Action issued Aug. 23, 2010 in U.S. Appl. No. 11/488,135.
Office Action issued Apr. 21, 2010 in U.S. Appl. No. 11/488,135.
Notice of Allowance issued Sep. 14, 2010 in U.S. Appl. No. 11/764,409.
Office Action issued Jan. 6, 2010 in U.S. Appl. No. 11/764,409.
Office Action issued Feb. 20, 2009 in U.S. Appl. No. 11/764,409.
Office Action issued Oct. 6, 2010 in U.S. Appl. No. 11/404,844.
Office Action issued Sep. 18, 2009 in U.S. Appl. No. 11/404,844.
Office Action issued Jan. 29, 2009 in U.S. Appl. No. 11/404,844.
Office Action issued Sep. 4, 2008 in U.S. Appl. No. 11/404,844.
Office Action issued May 3, 2010 in U.S. Appl. No. 11,598,787.
Office Action issued Jan. 27, 2011 in U.S. Appl. No. 11/504,086.
ADXL202 Specification Sheet: Low Cost ±2 g Dual Axis i MEMs® Accelerometer with Digital Output; Analog Devices, Inc., 1998.
ADXL330 Specification Sheet: Small, Low Power, 3-Axis ±3 g i MEMs® Accelerometer; Analog Devices, Inc., 2007.
Althoff et al., "A Generic Approach for Interfacing VRML Browsers to Various Input Devices and Creating Customizable 3D Applications", Proc. of Intl. Conference on 3D Web Technology, Feb. 24-28, 2002, pp. 67-74.
Bowman, D. A. et al., "An Evaluation of Techniques for Grabbing and Manipulating Remote Objects in Immersive Virtual Environments", Computer Graphics USA, vol. 24, No. 2, Mar. 1990, pp. 175-183.
Lin et al., "An Assisted User Interface for 3D Examine Mode", Proceedings of 2002 15$^{th}$ IPRR Conference on Computer Vision, Graphics, and Image Processing, Taiwan 2002, 7 pages, XP-002531989.
Selectech Air Mouse, Description; retrieved on May 5, 2009 from http://cgi.ebay.com.my/ws/eBayISAPI.dll?ViewItem&item=350096666675&indexURL.
Pictures of Microsoft Xwand retrieved on May 13, 2009 from http://www.kf12.com/blogs/uploads/xwand.jpg and http://www.cs.cmu.edu/%7Edwilson/images/xwand.jpg.
Ware, C. et al., "Exploration and Virtual Camera Control in Virtual Three Dimensional Environments," Computer Graphics USA, vol. 24, No. 2, Mar. 1990, pp. 175-183.
Wilson, Andrew D., et al.; "Demonstration of the XWand Interface for Intelligent Spaces"; Microsoft Research; UIST '02 Companion; pp. 37-38.
Wilson, Daniel, et al.; "Gesture Recognition Using the XWand"; Robotics Institute; Carnegie Mellon University; tech report CMU-RI-TR-04-57; Apr. 2004.
Wilson, Andy, "XWand: UI for Intelligent Environments"; Apr. 26, 2004; retrieved May 12, 2009 from http://research.microsoft.com/en-us/um/people/awilson/wand/default.htm.
Wilson, Andrew, et al.; "XWand: UI for Intelligent Spaces"; Microsoft Research; CHI 2003, Apr. 5-10, 2003; Ft. Lauderdale, FL.
You S. et al., "Fusion of Vision and Gyro Tracking for Robust Augmented Reality Registration", Proceedings IEEE Virtual Reality 2001 IEEE Comput. Soc. Los Alamitos, CA, USA, 2001, pp. 71-78.

* cited by examiner

Fig. 15

| | STATE OF THE CONTROLLER | TAKEN IMAGE |
|---|---|---|
| STATE A | 8a, 8b, 2, 7 | 8a', Pm, 8b', I5 |
| STATE B | 8a, 8b, 2, 7 | 8a', Pm, 8b', I6 |

| | STATE OF THE CONTROLLER | TAKEN IMAGE | POSTURE OF THE OBJECT |
|---|---|---|---|
| STATE A |  |  |  |
| STATE B |  |  |  |
| STATE C |  |  |  |

INFORMATION PROCESSING PROGRAM

CROSS REFERENCE OF RELATED APPLICATION

This application is a continuation of U.S. patent application Ser. No. 11/445,280, filed Jun. 2, 2006, now allowed, the contents of which are hereby incorporated by reference. The disclosure of Japanese Patent Application No. 2005-264207 is incorporated herein by reference. This application also claims the benefit of Provisional Application No. 60/732,648, filed Nov. 3, 2005, the entire contents of which are hereby incorporated by in this application.

TECHNICAL FIELD

The technology herein relates to an information processing program, and more particularly to an information processing program usable for an information processing system operated by a user using an input device including an imaging device.

BACKGROUND AND SUMMARY

Conventionally, technologies for designating a specific position on a display screen using an optical pointing system have been proposed. For example, an optical pointing system described in Japanese Laid-Open Patent Publication No. 6-308879 is used for conferences or the like held for a plurality of viewers. According to this system, a light emitting element is provided in the vicinity of the display screen, and an imaging device using an optic/electric conversion element is built in an indicator. The user can designate an arbitrary position on the display screen using the indicator as follows. The indicator takes an image of the light emitting element by the imaging device and the position designated by the user is calculated based on the obtained image. A mark is displayed at the calculated position, and thus the designated position is indicated with the mark.

A game controller which uses an optical pointing system substantially the same as the above has been proposed (see, for example, Japanese Laid-Open Patent Publication No. 8-71252). The controller has a shape of a gun and is used for a shooting game. The shooting game is for shooting a target displayed on the screen with a gun. The gun is used for designating an arbitrary position (to which the bullet is to hit) on the screen. The gun-shaped controller has a built-in CCD camera, and light emitting elements located at four positions around the screen are imaged by the CCD camera. The controller calculates the rotation angle or the inclining angle of the gun using the obtained images. The controller uses the calculation result to detect whether or not the gun is correctly directed toward the target displayed on the screen, and thus determines whether or not the bullet has hit the target. With such a structure, a game system by which the player performs a game operation by moving the controller (gun) held in his/her hand can be realized.

With the above-described technologies, the input device held in the user's hand (the indicator or the gun-shaped controller) is only used for designating a position on the display screen. Namely, the above-described indicator or gun-shaped controller allows the player to perform only one operation of designating a position on the display screen but not any other operation. For example, when used for a game apparatus, such an input device allows the player to perform only one simple game operation of designating a position on the display screen. Since the game operation is so simple, the game itself is simple and is not entertaining.

Therefore, a feature of non-limiting illustrative embodiments may provide an information processing system allowing the user to perform a new type of operation using an input device held in his/her hand and a program used for such an information processing system.

The non-limiting illustrative embodiments may have the following additional features. The reference numerals, additional explanations and the like in parentheses in this section of the specification indicate the correspondence with the non-limiting illustrative embodiments described later for easier understanding and are limiting in any way.

A first aspect of the non-limiting illustrative embodiments is directed to a computer readable storage medium having stored thereon an information processing program executable by a computer (CPU 10, etc.) of an information processing apparatus (game apparatus 3). The information processing apparatus receives operation data from an operation device (controller 7) including imaging means (imaging element 40) for taking an image of an imaging target (markers 8*a* and 8*b*), and displays, on a display device (monitor 2), a virtual space obtained by performing calculation processing on a predetermined operation target (player object 71, key 76, virtual camera 81, or door knobs 85*a* or 86*a*) using the operation data. The information processing program causes the computer to execute an obtaining step (S1), a vector calculation step (S16), a first rotation step (S3) and a display step (S4). The obtaining step obtains a taken image taken by the imaging means of the operation device as the operation data. The vector calculation step calculates a two-dimensional vector (vector represented by direction data 57) using a position of the imaging target in the taken image. The first rotation step rotates the operation target in accordance with a calculated value of the two-dimensional vector. The display step displays the virtual space, changed in accordance with the rotation of the operation target in the first rotation step, on a display area of the display device.

According to a second aspect of the non-limiting illustrative embodiments, the vector calculation step may include a first calculation step and a second calculation step. The first calculation step calculates coordinate sets of two predetermined points in the image of the imaging target in a coordinate system corresponding to the taken image. The second calculation step calculates the two-dimensional vector connecting the coordinate sets of the two predetermined points.

A third aspect of the non-limiting illustrative embodiments is directed to a computer readable storage medium having stored thereon an information processing program executable by a computer (CPU 10, etc.) of an information processing apparatus (game apparatus 3). The information processing apparatus receives operation data from an operation device (controller 7) and displays, on a display device (monitor 2), a virtual space obtained by performing calculation processing on a predetermined operation target (player object 71, key 76, virtual camera 81, or door knobs 85*a* and 86*a*) using the operation data. The operation device includes imaging means (imaging element 40) for taking an image of an imaging target and first calculation means (image processing circuit 41) for calculating coordinate sets of two predetermined points in the image of the imaging target included in a taken image taken by the imaging means. The information processing program causes the computer to execute an obtaining step (S1), a vector calculation step (S16), a first rotation step (S3) and a display step (S4). The obtaining step obtains the coordinate sets of the two predetermined points as the operation data. The vector calculation step calculates a two-dimensional vector connecting the coordinate sets of the two predetermined points. The first rotation step rotates the operation target in accordance with a calculated value of the two-dimensional vector. The display step displays the virtual space, changed in accordance with the rotation of the operation target in the first rotation step, on a display area of the display device.

A fourth aspect of the non-limiting illustrative embodiments is directed to a computer readable storage medium having stored thereon an information processing program executable by a computer (CPU 10, etc.) of an information processing apparatus (game apparatus 3). The information processing apparatus receives operation data from an operation device (controller 7) and displays, on a display device (monitor 2), a virtual space obtained by performing calculation processing on a predetermined operation target (player object 71, key 76, virtual camera 81, or door knobs 85*a* and 86*b*) using the operation data. The operation device includes imaging means (imaging element 40) for taking an image of an imaging target and vector calculation means (image processing circuit 41) for calculating a two-dimensional vector using a position of the imaging target in a taken image taken by the imaging means. The information processing program causes the computer to execute an obtaining step (S1), a first rotation step (S3) and a display step (S4). The obtaining step obtains the two-dimensional vector as the operation data. The first rotation step rotates the operation target in accordance with an obtained value of the two-dimensional vector. The display step displays the virtual space, changed in accordance with the rotation of the operation target in the first rotation step, on a display area of the display device.

According to a fifth aspect of the non-limiting illustrative embodiments, the information processing program may further cause the computer to execute an indicated coordinate set calculation step (S22, S52, S62). The indicated coordinate set calculation step calculates a predetermined indicated coordinate set (indicated coordinate set data 62) which corresponds to a position on the display area, in correspondence with a position of the image of the imaging target in the taken image obtained in the obtaining step. In this case, the first rotation step rotates the operation target by a calculation using the two-dimensional vector and the indicated coordinate set.

According to a sixth aspect of the non-limiting illustrative embodiments, the information processing program may further cause the computer to execute an indicated coordinate set calculation step (S22, S52, S62). The indicated coordinate set calculation step calculates a predetermined indicated coordinate set which corresponds to a position on the display area, in correspondence with a coordinate set of an intermediate point between the two predetermined points. In this case, the first rotation step rotates the operation target by a calculation using the two-dimensional vector and the indicated coordinate set.

According to a seventh aspect of the non-limiting illustrative embodiments, the operation data may further include a coordinate set of one point corresponding to a position of the image of the imaging target. In this case, the information processing program further causes the computer to execute an indicated coordinate set calculation step (S22, S52, S62). The indicated coordinate set calculation step calculates a predetermined indicated coordinate set which corresponds to a position on the display area, in correspondence with the coordinate set of the one point. The first rotation step rotates the operation target by a calculation using the two-dimensional vector and the indicated coordinate set.

According to an eighth aspect of the non-limiting illustrative embodiments, the indicated coordinate set calculation step may calculate the indicated coordinate set which corresponds to the position on the display area, in correspondence with a position of the image of the imaging target in the case where the image taken by the imaging means is rotated around the center of the image as an axis and the two-dimensional vector is directed in one certain direction by the rotation.

According to a ninth aspect of the non-limiting illustrative embodiments, the information processing program may further cause the computer to execute an indicated coordinate set calculation step (S22, S52, S62). The indicated coordinate set calculation step sets a predetermined indicated coordinate set which corresponds to a position on the display area as an indicated coordinate set. The first rotation step rotates the operation target by a calculation using the two-dimensional vector and the indicated coordinate set.

According to a tenth aspect of the non-limiting illustrative embodiments, the virtual space may be a virtual three-dimensional space. In this case, the information processing program further causes the computer to execute a three-dimensional indicated coordinate set setting step (S53). The three-dimensional indicated coordinate set setting step calculates a three-dimensional coordinate set in the virtual space which corresponds to the indicated coordinate set calculated in the indicated coordinate set calculation step and sets the three-dimensional coordinate set as a three-dimensional indicated coordinate set. In this case, the first rotation step rotates the operation target in the three-dimensional space by a calculation using the two-dimensional vector and the three-dimensional indicated coordinate set.

According to an eleventh aspect of the non-limiting illustrative embodiments, the information processing program may further cause the computer to execute an object location step (S31, S41, S60). The object location step locates at least one object in the virtual space. The first rotation step rotates any one of the at least one object located in the virtual space as the operation target.

According to a twelfth aspect of the non-limiting illustrative embodiments, the information processing program may further cause the computer to execute an object location step (S31, S41, S60). The object location step locates at least one object in the virtual space. In this case, the first rotation step may include a determination step (S64) of determining whether or not any one of the at least one object is displayed at the position on the display area which corresponds to the indicated coordinate set; an operation target setting step (S65) of, when it is determined that one of the at least one object is displayed at the position which corresponds to the indicated coordinate set, setting the one object as the operation target; and a step (S21) of rotating the one object which is set in the operation target setting step.

According to a thirteenth aspect of the non-limiting illustrative embodiments, the information processing program may further cause the computer to execute an object location step (S31, S41, S60). The object location step locates an object as the operation target in the virtual space. In this case, the first rotation step includes an object moving step (S21) of moving the object so as to be displayed at a position of the indicted coordinate set calculated in the indicated coordinate set calculation step; and a step (S22) of rotating the object.

According to a fourteenth aspect of the non-limiting illustrative embodiments, the information processing program may further cause the computer to execute an object location step (S31, S41, S60). The object location step locates an object as the operation target in the virtual space. In this case, the first rotation step includes an object moving step (S21) of moving the object to the three-dimensional coordinate set (corresponding coordinate set) calculated in the three-dimensional indicated coordinate set setting step; and a step (S22) of rotating the object.

According to a fifteenth aspect of the non-limiting illustrative embodiments, the information processing program may further cause the computer to execute an object location step (S31, S41, S60). The object location step locates an object as the operation target in the virtual space. In this case, the first rotation step includes a central coordinate set setting step (S53) of setting the indicated coordinate set calculated in the indicated coordinate set calculation step as a central coordinate set of rotation; and a step (S22) of rotating the object around the central coordinate set as the center of rotation.

According to a sixteenth aspect of the non-limiting illustrative embodiments, the information processing program may further cause the computer to execute an object location step (S31, S41, S60). The object location step locates an object as the operation target in the virtual space. In this case, the first rotation step includes a central coordinate set setting step (S53) of setting the three-dimensional coordinate set calculated in the three-dimensional indicated coordinate set setting step as a central coordinate set of rotation; and a step (S22) of rotating the object in the three-dimensional space around the central coordinate set as the center of rotation.

According to a seventeenth aspect of the non-limiting illustrative embodiments, the virtual space may be a virtual three-dimensional space. In this case, the information processing program further causes the computer to execute a virtual camera setting step (S50). The virtual camera setting step sets a virtual camera directed in a predetermined direction at a predetermined position in the virtual space. The first rotation step rotates the virtual camera as the operation target. The display step displays an image of the virtual space seen from the virtual camera on the display area.

According to an eighteenth aspect of the non-limiting illustrative embodiments, the virtual space may be a virtual three-dimensional space. In this case, the information processing program further causes the computer to execute a virtual camera setting step (S50). The virtual camera setting step sets a virtual camera directed in a predetermined direction at a predetermined position in the virtual space. The first rotation step rotates the virtual camera as the operation target around the three-dimensional coordinate set calculated in the three-dimensional indicated coordinate set setting step as the center of rotation.

According to a nineteenth aspect of the non-limiting illustrative embodiments, the first rotation step may rotate the virtual camera around a position of a point of attention of the virtual camera as the center of rotation.

According to a twentieth aspect of the non-limiting illustrative embodiments, the first rotation step may rotate the virtual camera such that a viewing direction of the virtual camera changes.

According to a twenty-first aspect of the non-limiting illustrative embodiments, the first rotation step may change a posture of the operation target by the rotation.

According to a twenty-second aspect of the non-limiting illustrative embodiments, the first rotation step may move a position of the operation target by rotating the operation target around a predetermined position as the center of rotation.

According to a twenty-third aspect of the non-limiting illustrative embodiments, the first rotation step may determine the posture or the position of the operation target in accordance with a calculated direction of the two-dimensional vector.

According to a twenty-fourth aspect of the non-limiting illustrative embodiments, the first rotation step may includes a determination step of determining whether or not a direction of the two-dimensional vector has exceeded a predetermined range; and a step of, when it is determined in the determination step that the direction of the two-dimensional vector has exceeded the predetermined range, rotating the operation target.

According to a twenty-fifth aspect of the non-limiting illustrative embodiments, the information processing program may further cause the computer to execute an inclination calculation step (S54). The inclination calculation step obtains a difference between a direction of the two-dimensional vector and a predetermined reference direction as an angle or a vector. In this case, the first rotation step rotates the operation target in accordance with the difference calculated in the inclination calculation step.

According to a twenty-sixth aspect of the non-limiting illustrative embodiments, the first rotation step may include a rotation amount setting step (S55) of setting a rotation amount in accordance with a magnitude of the difference calculated in the inclination calculation step; and a step (S56) of rotating the operation target by the rotation amount.

According to a twenty-seventh aspect of the non-limiting illustrative embodiments, the first rotation step may include a determination step of determining whether or not the difference calculated in the inclination calculation step has exceeded a predetermined value; and a step of, when it is determined in the determination step that the difference has exceeded the predetermined value, rotating the operation target.

According to a twenty-eighth aspect of the non-limiting illustrative embodiments, the information processing program may further cause the computer to execute a size calculation step (S19). The size calculation step calculates data representing a size of the image of the imaging target in the taken image obtained in the obtaining step from the operation data. In this case, the first rotation step rotates the operation target by a calculation using the two-dimensional vector and the data calculated in the size calculation step.

According to a twenty-ninth aspect of the non-limiting illustrative embodiments, the information processing program may further cause the computer to execute a length calculation step (S19). The length calculation step calculates data representing a length of a distance between the coordinate sets of the two predetermined points. In this case, the first rotation step rotates the operation target by a calculation using the two-dimensional vector and the data calculated in the length calculation step.

According to a thirtieth aspect of the non-limiting illustrative embodiments, the operation data may further include data representing a length of a distance between the coordinate sets of the two predetermined points in the image of the imaging target included in the taken image taken by the imaging means. In this case, the first rotation step rotates the operation target by a calculation using the two-dimensional vector and the data representing the length of the distance between the coordinate sets of the two predetermined points.

According to a thirty-first aspect of the non-limiting illustrative embodiments, the first rotation step may include a step (S48) of calculating distance data representing a distance between the imaging means and the imaging target from the data calculated in the size calculation step; and a step of rotating the operation target by a calculation using the two-dimensional vector and the distance data.

According to a thirty-second aspect of the non-limiting illustrative embodiments, first rotation step may include a step (S48) of calculating distance data representing a distance between the imaging means and the imaging target from the data calculated in the length calculation step; and a step of rotating the operation target by a calculation using the two-dimensional vector and the distance data.

According to a thirty-third aspect of the non-limiting illustrative embodiments, the first rotation step may include a step (S48) of calculating distance data representing a distance between the imaging means and the imaging target from the data representing the length of the distance between the coordinate sets of the two predetermined points; and a step of rotating the operation target by a calculation using the two-dimensional vector and the distance data.

According to a thirty-fourth aspect of the non-limiting illustrative embodiments, the operation data may further include distance data representing a distance between the imaging means and the imaging target. In this case, the first rotation step rotates the operation target by a calculation using the two-dimensional vector and the distance data.

According to a thirty-fifth aspect of the non-limiting illustrative embodiments, the information processing program may further cause the computer to execute a distance calculation step (S48). The distance calculation step calculates data corresponding to a distance between the imaging means and the imaging target. In this case, the first rotation step rotates the operation target by a calculation using the two-dimensional vector and the data calculated in the distance calculation step.

According to a thirty-sixth aspect of the non-limiting illustrative embodiments, the virtual space may be a virtual three-dimensional space. In this case, the information processing program further causes the computer to execute an object location step. The object location step locates at least one object in the virtual space. In this case, the first rotation step includes a depth setting step of determining a coordinate in a depth direction of the virtual space in correspondence with the distance data; a determination step of determining whether or not there is any one of the at least one object at a position of the coordinate in the depth direction calculated in the depth setting step; an operation target setting step of, when it is determined in the determination step that there is one of the at least one object, setting the one object as the operation target.

According to a thirty-seventh aspect of the non-limiting illustrative embodiments, the virtual space may be a virtual three-dimensional space. In this case, the first rotation step includes a depth setting step (S49) of determining a coordinate in a depth direction of the virtual space in correspondence with the distance data; a moving step of moving a position of the operation target in the depth direction to the coordinate in the depth direction calculated in the depth setting step; and a step of rotating the operation target in accordance with the two-dimensional vector.

According a thirty-eighth aspect of the non-limiting illustrative embodiments, the operation device may comprise inclination determining means (including acceleration sensor 37) for determining an inclination of the operation device. In this case, the information processing program further causes the computer to execute a determination step and a second rotation step. The determination step determines whether or not a two-dimensional vector can be calculated from the taken image in the vector calculation step. The second rotation step, when it is determined in the determination step that the two-dimensional vector cannot be calculated, rotates the operation target in accordance with the inclination determined by the inclination determining means.

According to the first aspect, a two-dimensional vector is calculated in the vector calculation step from the image of the imaging target (taken image). The value of the two-dimensional vector changes in accordance with the rotation state of the operation device including the imaging device. Accordingly, by displaying the operation target so as to rotate in accordance with the direction of the two-dimensional vector, the operation target can be rotated in accordance with the operation of rotating the operation device. Namely, according to the first aspect, a novel operation method by which the user can rotate the operation target by rotating the operation device itself held in his/her hand is provided. Also according to the first aspect, the taken image is obtained from the operation device, and therefore the operation device only needs to have a function of taking an image. Thus, the structure of the operation device can be simplified.

According to the second aspect, the positions of the two predetermined points in the image of the imaging target are calculated. Therefore, a two-dimensional vector can be easily calculated using the positions of the two points.

According to the third aspect, a novel operation method by which the user can rotate the operation target by rotating the operation device itself held in his/her hand is provided. Also according to the third aspect, the positions of the two predetermined points in the image of the imaging target are calculated by the operation device. Therefore, the information processing apparatus can easily calculate a two-dimensional vector using the positions of the two points. Thus, the processing load of the computer of the information processing apparatus can be alleviated.

According to the fourth aspect, a novel operation method by which the user can rotate the operation target by rotating the operation device itself held in his/her hand is provided. Also according to the fourth aspect, a two-dimensional vector is calculated by the operation device. Therefore, the information processing apparatus does not need to execute processing of calculating the two-dimensional vector. Thus, the processing load of the computer of the information processing apparatus can be alleviated.

According to the fifth aspect, a position on the display area is calculated in the indicated coordinate set calculation step from the position of the image of the imaging target in the taken image. Therefore, the user can designate a position on the display area with the operation device usable while being held in his/her hand. In addition, the operation target is rotated using the position designated by the user and the two-dimensional vector. Therefore, a more complicated rotation operation is made possible with the operation device usable while being held in the user's hand, and the user can control the rotation of the operation target more precisely. For example, the user can designate the central position of the rotation, or can rotate the operation target while moving the operation target to a designated position.

According to the sixth aspect, a position on the display area is calculated in the indicated coordinate set calculation step from the position of the image of the imaging target in the taken image. Therefore, the user can designate a position on the display area with the operation device usable while being held in his/her hand. In addition, the operation target is rotated using the position designated by the user and the two-dimensional vector. Therefore, a more complicated rotation operation is made possible with the operation device usable while being held in the user's hand, and the user can control the rotation of the operation target more precisely.

According to the seventh aspect, a position on the display area is calculated in the indicated coordinate set calculation step from the position of the image of the imaging target in the taken image. Therefore, the user can designate a position on the display area with the operation device usable while being held in his/her hand. In addition, the operation target is rotated using the position designated by the user and the two-dimensional vector. Therefore, a more complicated rotation operation is made possible with the operation device usable while being held in the user's hand, and the user can control the rotation of the operation target more precisely.

The position of the image of the imaging target in the taken image is different in accordance with the rotation state of the operation device (see FIG. 15). Namely, even if the operation device indicates one position, the position of the image of the imaging target may be different depending on the rotation state of the operation device. In this case, the position indicated by the operation device (i.e., the position of the indicated coordinate set to be calculated in the indicated coordinate set calculation step) cannot be accurately calculated from the position of the image of the imaging target. By contrast, according to the eighth aspect, the position of the image of the imaging target obtained when the taken image is rotated so as to be directed in one certain direction, is calculated. Therefore, the influence of the rotation state of the operation device can be eliminated, and the position on the display screen or in the virtual space can be accurately calculated from the position of the image of the imaging target in the indicated coordinate set calculation step.

According to the ninth aspect, a position on the display area is calculated in the indicated coordinate set calculation step from the position of the image of the imaging target in the taken image. Therefore, the user can designate a position on the display area with the operation device usable while being held in his/her hand. In addition, the operation target is rotated using the position designated by the user and the two-dimensional vector. Therefore, a more complicated rotation operation is made possible with the operation device usable while being held in the user's hand, and the user can control the rotation of the operation target more precisely.

According to the tenth aspect, the user can move the operation target which is present in the virtual three-dimensional space by a novel operation of rotating the operation device itself. Also according to the tenth aspect, a more complicated rotation operation is made possible with the operation device usable while being held in the user's hand, and the user can control the rotation of the operation target which is present in the virtual three-dimensional space more precisely.

According to the eleventh aspect, the user can move the object which is present in the virtual three-dimensional space by a novel operation of rotating the operation device itself.

According to the twelfth aspect, the object displayed at the position on the display area corresponding to the indicated coordinate set calculated in the indicated coordinate set calculation step is set as the operation target. Therefore, the user can perform an operation of designating the object displayed on the display screen using the operation device. In addition, the user can rotate the designated object using the operation device. Thus, the user can issue two types of instructions, i.e., an instruction regarding the selection of the object as the operation target and an instruction to rotate the selected object, with one type of operation, i.e., an operation on a posture of one operation device while holding the operation device in his/her hand.

According to the thirteenth aspect, the object is moved to the position on the display area corresponding to the indicated coordinate set calculated in the indicated coordinate set calculation step. Therefore, the user can perform an operation of moving the object displayed on the display screen using the operation device. In addition, the user can rotate the designated object using the operation device. Thus, the user can issue two types of instructions, i.e., an instruction to move the object as the operation target and an instruction to rotate the object, with one type of operation, i.e., an operation on a posture of one operation device while holding the operation device in his/her hand.

According to the fourteenth aspect, the object is moved to the position of the three-dimensional coordinate set corresponding to the indicated coordinate set calculated in the three-dimensional indicated coordinate set calculation step. Therefore, the user can perform an operation of moving the object in the virtual three-dimensional space using the operation device. In addition, the user can rotate the designated object using the operation device. Thus, the user can issue two types of instructions, i.e., an instruction to move the object as the operation target and an instruction to rotate the object, with one type of operation, i.e., an operation on a posture of one operation device while holding the operation device in his/her hand.

According to the fifteenth aspect, the user can designate a position on the display screen using the operation device usable while being held in his/her hand. The user can designate the central position of the rotation of the object using the operation device. Since the number of types of rotation is increased, the user can cause the object to perform a wider variety of rotation motions.

According to the sixteenth aspect, the user can designate a position in the virtual three-dimensional space using the operation device usable while being held in his/her hand. The user can designate the central position of the rotation of the object using the operation device. Since the number of types of rotation is increased, the user can cause the object to perform a wider variety of rotation motions.

According to the seventeenth aspect, by rotating the virtual camera in the first rotation step, the position of the viewing point or the viewing direction with respect to the image in the virtual space displayed on the display screen can be changed. The user can change the position of the viewing point or the viewing direction with respect to the image in the virtual space displayed on the display screen using a novel operation of rotating the operation device itself.

According to the eighteenth aspect, the user can designate a position on the display screen using the operation device usable while being held in his/her hand. The user can designate the central position of the rotation of the virtual camera using the operation device. Since the number of types of rotation is increased, the user can cause the virtual camera to perform a wider variety of rotation motions.

According to the nineteenth aspect, the viewing direction with respect to the object which is present at the position of the point of attention can be freely changed by a novel operation of rotating the operation device itself.

According to the twentieth aspect, the viewing direction of the virtual camera can be freely changed by a novel operation of rotating the operation device itself.

According to the twenty-first aspect, the posture of the operation target can be freely changed by a novel operation of rotating the operation device itself.

According to the twenty-second aspect, the operation target can be freely rotated or moved on an arc by a novel operation of rotating the operation device itself.

According to the twenty-third aspect, the operation target can be rotated so as to correspond to the rotation angle of the operation device.

According to the twenty-fourth aspect, when the calculated direction of the two-dimensional vector is within the predetermined range, the operation target is not rotated. If the operation target is rotated as a result of responding too sensitively to the rotation angle of the operation device, the user is required to operate the operation device precisely, which deteriorates the operability of the operation device. By contrast, according to the twenty-fourth aspect, the operation target is not rotated while being in the predetermined range of angles. A so-called "play" margin can be set in the rotation operation on the operation device. Thus, the operability can be improved.

According to the twenty-fifth aspect, the operation target is rotated based on the difference between the direction of the two-dimensional vector and the predetermined reference direction. By setting the direction with which the user feel comfortable as the reference direction, the operability of the operation device can be improved.

According to the twenty-sixth aspect, the rotation amount of the operation target is increased in accordance with the difference between the direction of the two-dimensional vector and the predetermined reference direction. Therefore, the user can control the rotation amount of the operation target by the rotation amount of the operation device. Thus, the user can intuitively and easily control the rotation amount of the operation target.

According to the twenty-seventh aspect, the operation target is not rotated unless the difference between the direction of the two-dimensional vector and the predetermined reference direction exceeds the predetermined range. By setting the range in which the angular difference does not exceed the predetermined range as the so-called "play" range, the operability of the operation device can be improved like in the twenty-fourth aspect.

According to the twenty-eighth aspect, the distance from the imaging means (operation device) to the imaging target can be detected by data representing the size of the image of the imaging target. Therefore, the user can perform an operation of rotating the operation target by moving the operation device itself so as to change the distance. Thus, a more complicated rotation operation is made possible with the operation device usable while being held in the user's hand, and the user can control the rotation of the operation target more precisely.

According to the twenty-ninth aspect, the distance from the imaging means (operation device) to the imaging target can be detected by data representing the length of the distance between the coordinate sets of two points corresponding to the two positions in the imaging target. Therefore, the user can perform an operation of rotating the operation target by moving the operation device itself so as to change the distance. Thus, a more complicated rotation operation is made possible with the operation device usable while being held in the user's hand, and the user can control the rotation of the operation target more precisely.

According to the thirtieth aspect, like in the twenty-eighth and twenty-ninth aspects, a more complicated rotation operation is made possible with the operation device usable while being held in the user's hand, and the user can control the rotation of the operation target more precisely.

According to the thirty-first aspect, the distance from the imaging means to the imaging target can be more accurately reflected on the rotation operation on the operation target.

According to the thirty-second aspect, the distance from the imaging means to the imaging target can be more accurately reflected on the rotation operation on the operation target.

According to the thirty-third aspect, the distance from the imaging means to the imaging target can be more accurately reflected on the rotation operation on the operation target.

According to the thirty-fourth aspect, the distance from the imaging means to the imaging target can be more accurately reflected on the rotation operation on the operation target.

According to the thirty-fifth aspect, data corresponding to the distance from the imaging means (operation device) to the imaging target (length data 59 or distance data 63) is calculated. Therefore, the user can perform an operation of rotating the operation target by moving the operation device itself so as to change the distance. Thus, a more complicated rotation operation is made possible with the operation device usable while being held in the user's hand, and the user can control the rotation of the operation target more precisely.

According to the thirty-sixth aspect, the object which is present at the position corresponding to the coordinate in the depth direction determined in the depth setting step is set as the operation target. Therefore, the user can perform an operation of designating the object in the virtual space using the operation device. In addition, the user can rotate the designated object using the operation device. Thus, the user can issue two types of instructions, i.e., an instruction regarding the selection of the object as the operation target and an instruction to rotate the selected object, with one type of operation, i.e., an operation of moving the operation device itself while holding the operation device in his/her hand.

According to the thirty-seventh aspect, the operation target is moved to the position corresponding to the coordinate in the depth direction determined in the depth setting step. Therefore, the user can perform an operation of moving the operation target in the virtual space using the operation device. In addition, the user can rotate the operation target using the operation device. Thus, the user can issue two types of instructions, i.e., an instruction to move the operation target and an instruction to rotate the operation target, with one type of operation, i.e., an operation of moving the operation device itself while holding the operation device in his/her hand.

According to the thirty-eighth aspect, when the operation device is held by the user in the state of exceeding a range in which the imaging means can take an image of the imaging target (operable range described later), the operation target is rotated in accordance with the inclination determined by the inclination determining means. Therefore, even if the operable range is exceeded while the user is performing an operation of moving the operation device, the rotation of the operation target can be continued.

The above features and aspects may be combined to form yet further embodiments. These and other features, aspects, and advantages of the non-limiting illustrative embodiments will become more apparent from the following detailed description of the non-limiting illustrative embodiments when taken in conjunction with the accompanying drawings.

BRIEF DESCRIPTION OF THE DRAWINGS

FIG. 15 shows the correspondence between the state of the controller 7 and the taken image when the controller 7 is in the respective state;

DESCRIPTION OF THE EMBODIMENTS

Figure 1:
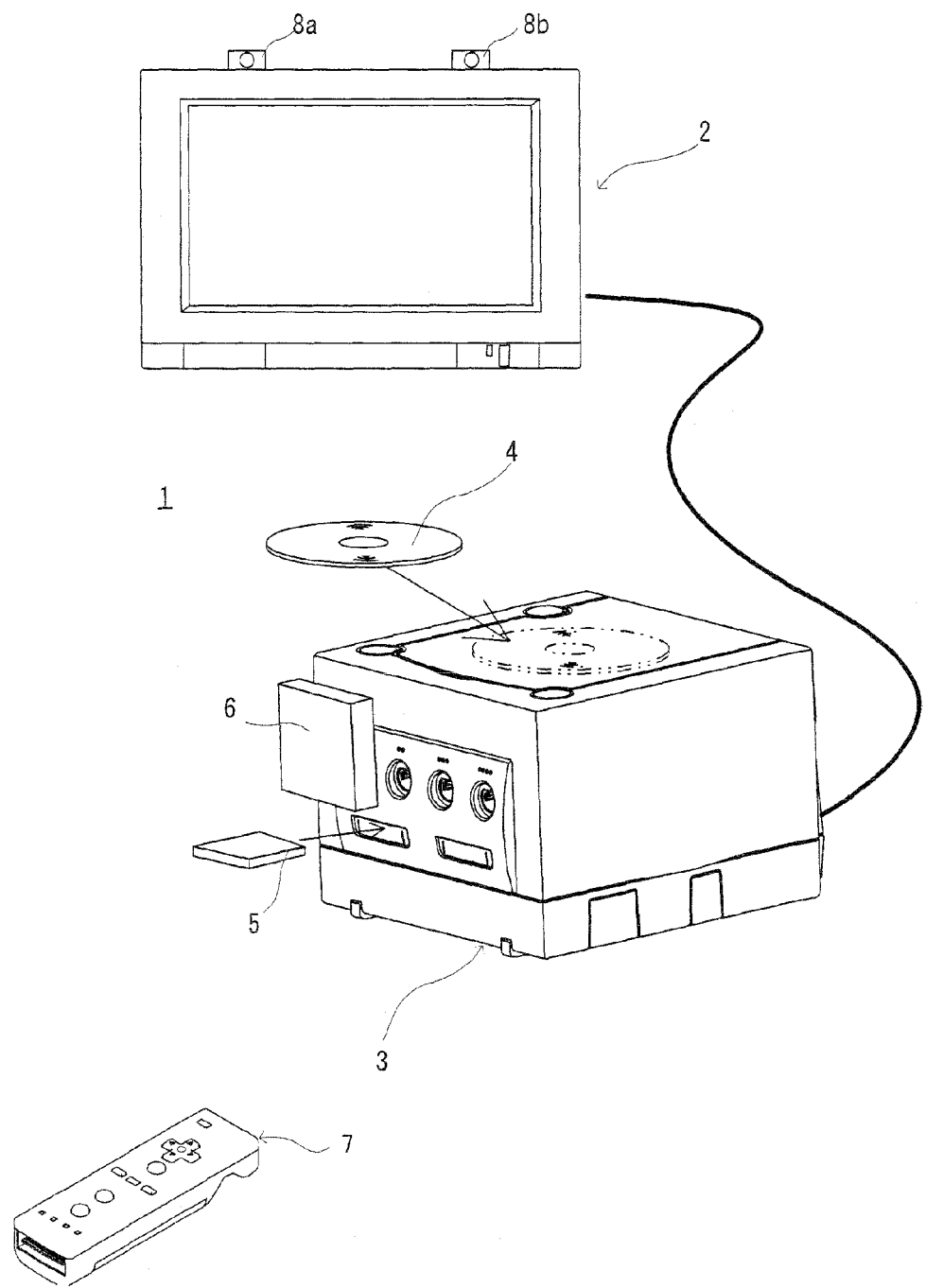
FIG. 1 is an external view of a game system 1 as an exemplary information processing system according to a non-limiting illustrative embodiment.

With reference to FIG. 1, a game system 1 as an example of an information processing system according to a non-limiting illustrative embodiment will be described. FIG. 1 is an external view illustrating the game system 1. In the following exemplary description, the game system 1 is of an installation type.

As shown in FIG. 1, the game system 1 includes an installation type game apparatus (hereinafter, referred to simply as a "game apparatus") 3, which is connected to a display (hereinafter, referred to as a "monitor") 2 such as a home-use TV receiver including a speaker 22 via a connection cord, and a controller 7 for giving operation data to the game apparatus 3. Two markers 8a and 8b are provided in the vicinity of the monitor 2 (above the screen of the monitor 2 in FIG. 1). The markers 8a and 8b are specifically infrared LEDs, and each outputs infrared light forward from the monitor 2. The game apparatus 3 is connected to a receiving unit 6 via a connection terminal. The receiving unit 6 receives operation data which is wirelessly transmitted from the controller 7. The controller 7 and the game apparatus 3 are connected to each other by wireless communication. On the game apparatus 3, an optical disc 4 as an example of an exchangeable information storage medium is detachably mounted. The game apparatus 3 has, on a top main surface thereof, a power ON/OFF switch, a game processing reset switch, and an OPEN switch for opening a top lid of the game apparatus 3. When a player presses the OPEN switch, the lid is opened, so that the optical disc 4 is mounted or dismounted.

On the game apparatus 3, an external memory card 5 is detachably mounted when necessary. The external memory card 5 has a backup memory or the like mounted thereon for fixedly storing saved data or the like. The game apparatus 3 executes a game program or the like stored on the optical disc 4 and displays the result on the monitor 2 as a game image. The game apparatus 3 can also reproduce a state of a game played in the past using saved data stored on the memory card 5 and display the game image on the monitor 2. The player playing with the game apparatus 3 can enjoy the game by operating the controller 7 while watching the game image displayed on the display screen of the monitor 2.

The controller 7 wirelessly transmits operation data from a communication section 36 included therein (described later) to the game apparatus 3 connected to the receiving unit 6, using the technology of, for example, Bluetooth (registered trademark). The controller 7 is operation means for operating an operation target (an object displayed on the display screen of the monitor 2 or a virtual camera). The controller 7 includes an operation section having a plurality of operation buttons. As described later in detail, the controller 7 also includes an imaging information calculation section 35 for detecting the position and the posture of the controller 7. The imaging information calculation section 35 takes an image of each of the markers 8a and 8b located in the vicinity of the monitor 2. The game apparatus 3 uses these images to obtain an operation signal corresponding to the position and the posture of the controller 7.

Figure 2:
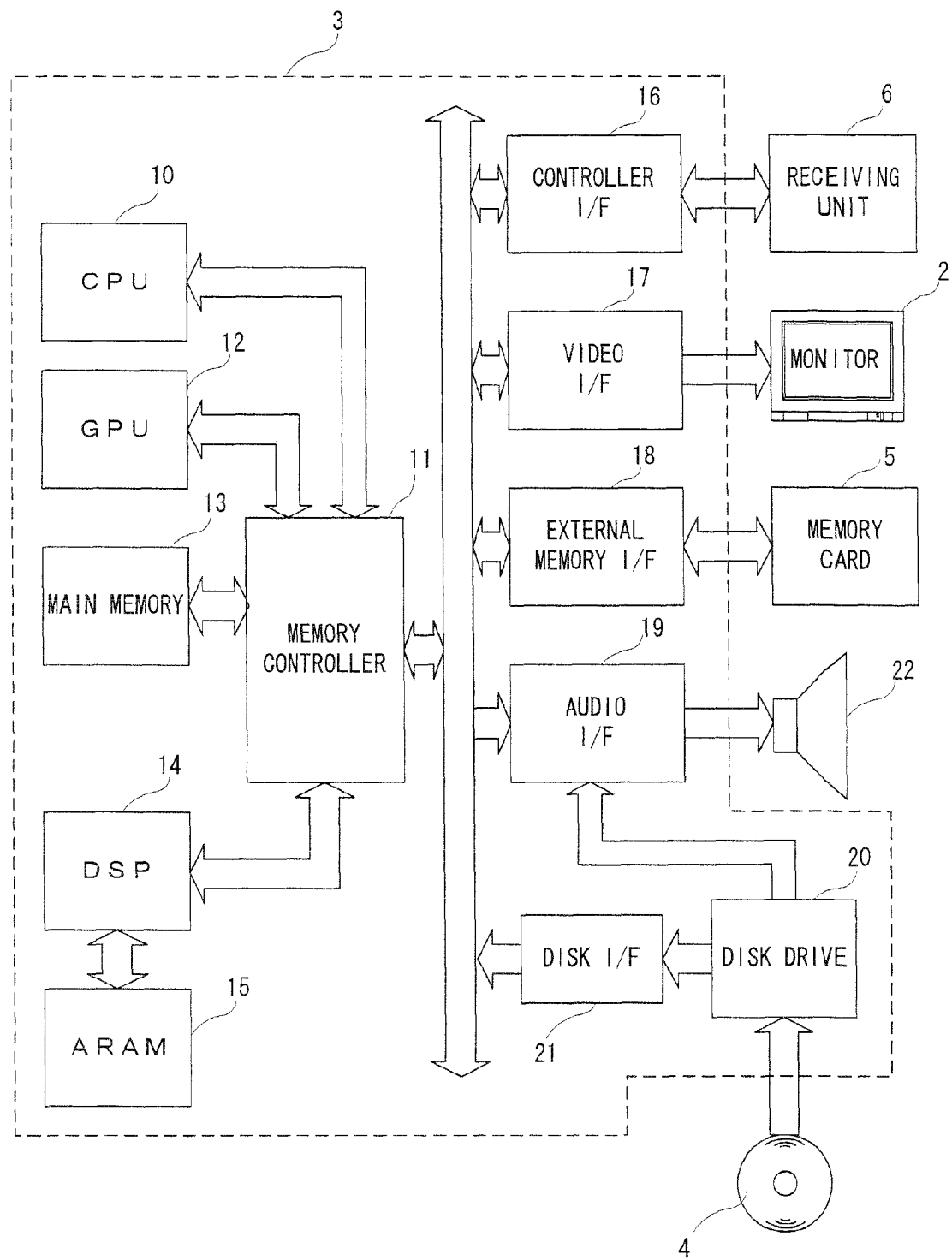
FIG. 2 is a functional block diagram of a game apparatus 3.

With reference to FIG. 2, a structure of the game apparatus 3 will be described. FIG. 2 is a functional block diagram of the game apparatus 3.

As shown in FIG. 2, the game apparatus 3 includes, for example, a RISC CPU (central processing unit) 10 for executing various types of programs. The CPU 10 executes a start program stored in a boot ROM (not shown) to, for example, initialize memories including a main memory 13, and then executes a game program stored on the optical disc 4 to perform game processing or the like in accordance with the game program. The CPU 10 is connected to a GPU (Graphics Processing Unit) 12, the main memory 13, a DSP (Digital Signal Processor) 14, and an ARAM (Audio RAM) 15 via a memory controller 11. The memory controller 11 is connected to a controller I/F (interface) 16, a video I/F 17, an external memory I/F 18, an audio I/F 19, and a disc I/F 21 via a predetermined bus. The controller I/F 16, the video I/F 17, the external memory I/F 18, the audio I/F 19 and the disc I/F 21 are respectively connected to the receiving unit 6, the monitor 2, the external memory card 5, the speaker 22 and a disc drive 20.

The GPU 12 performs image processing based on an instruction from the CPU 10. The GPU 12 includes, for example, a semiconductor chip for performing calculation processing necessary for displaying 3D graphics. The GPU 12 performs the image processing using a memory dedicated for image processing (not shown) and a part of the storage area of the main memory 13. The GPU 12 generates game image data and a movie to be displayed on the display screen of the monitor 2 using such memories, and outputs the generated data or movie to the monitor 2 via the memory controller 11 and the video I/F 17 as necessary.

The main memory 13 is a storage area used by the CPU 10, and stores a game program or the like necessary for processing performed by the CPU 10 as necessary. For example, the main memory 13 stores a game program read from the optical disc 4 by the CPU 10, various types of data or the like. The game program, the various types of data or the like stored in the main memory 13 are executed by the CPU 10.

The DSP 14 processes sound data or the like generated by the CPU 10 during the execution of the game program. The DSP 14 is connected to the ARAM 15 for storing the sound data or the like. The ARAM 15 is used when the DSP 14 performs predetermined processing (for example, storage of the game program or sound data already read). The DSP 14 reads the sound data stored in the ARAM 15 and outputs the sound data to the speaker 22 included in the monitor 2 via the memory controller 11 and the audio I/F 19.

The memory controller 11 comprehensively controls data transfer, and is connected to the various I/Fs described above. The controller I/F 16 includes, for example, four controller I/Fs, and communicably connects the game apparatus 3 to an external device which is engageable via connectors of the controller I/Fs. For example, the receiving unit 6 is engaged with such a connector and is connected to the game apparatus 3 via the controller I/F 16. As described above, the receiving unit 6 receives the operation data from the controller 7 and outputs the operation data to the CPU 10 via the controller I/F 16. In other embodiments, the game apparatus 3 may include a receiving module for receiving the operation data transmitted from the controller 7, instead of the receiving unit 6. In this case, the operation data received by the receiving module is output to the CPU 10 via a predetermined bus. The video I/F 17 is connected to the monitor 2. The external memory I/F 18 is connected to the external memory card 5 and is accessible to a backup memory or the like provided in the external card 5. The audio I/F 19 is connected to the speaker 22 built in the monitor 2, and is connected such that the sound data read by the DSP 14 from the ARAM 15 or sound data directly output from the disc drive 20 is output from the speaker 22. The disc I/F 21 is connected to the disc drive 20. The disc drive 20 reads data stored at a predetermined reading position of the optical disc 4 and outputs the data to a bus of the game apparatus 3 or the audio I/F 19.

Figure 3A:
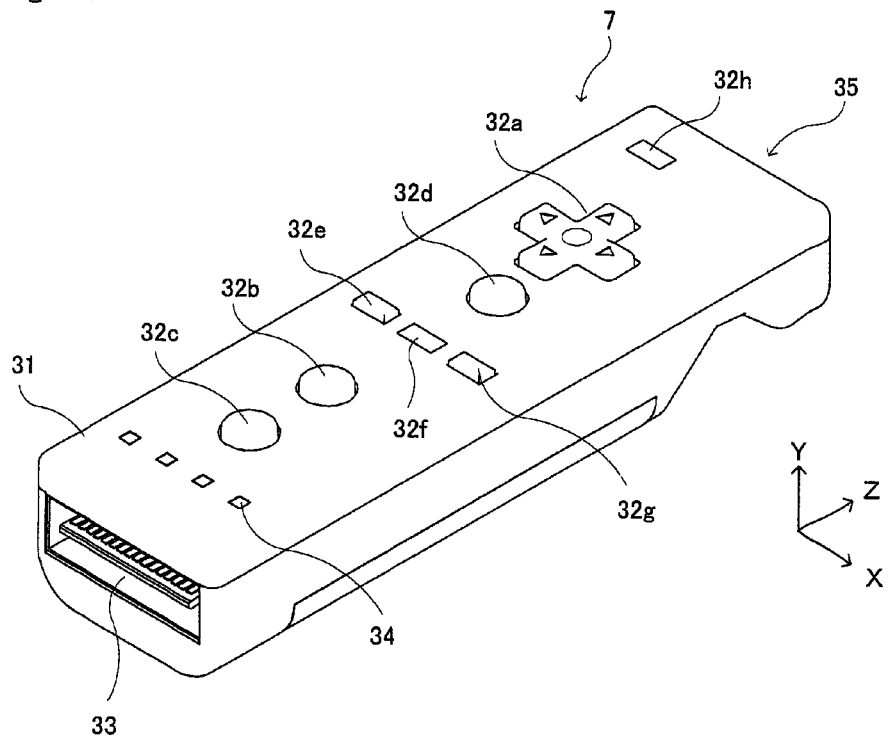
FIG. 3A is an isometric view of a controller 7 seen from the top rear side thereof.
Figure 3B:
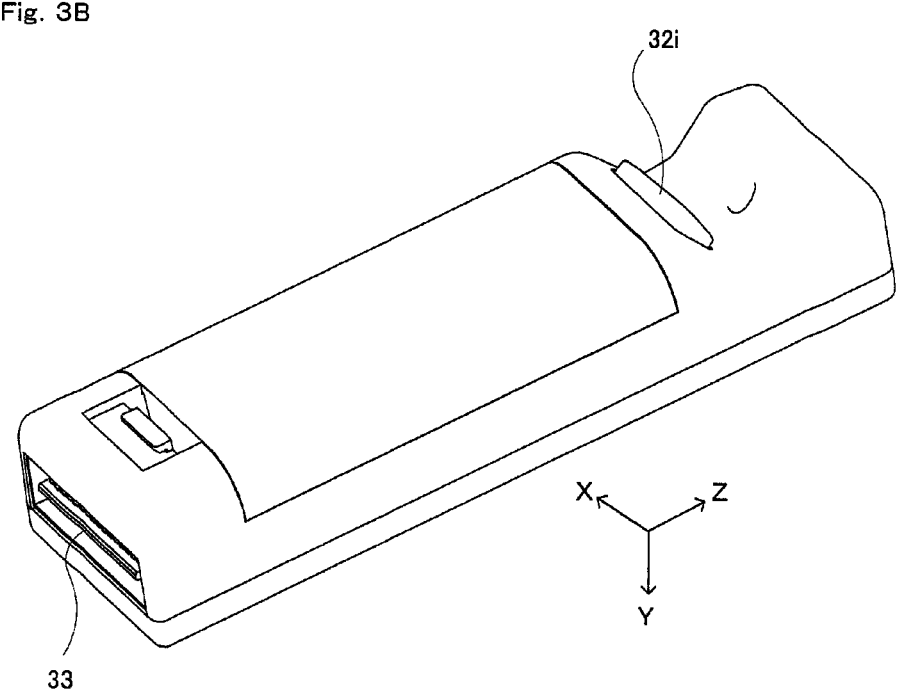
FIG. 3B is an isometric view of the controller 7 seen from the bottom rear side thereof.
Figure 4:
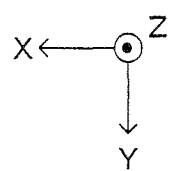
FIG. 4 is a front view of the controller 7.
Figure 4:
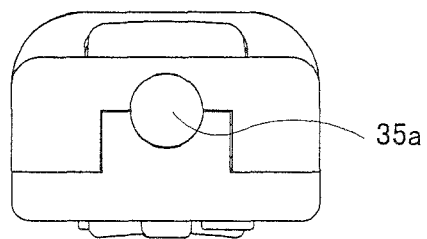

With reference to FIG. 3A through FIG. 7, the controller 7 will be described. FIG. 3A through FIG. 5B are external isometric views of the controller 7. FIG. 3A is an isometric view of the controller 7 seen from the top rear side thereof. FIG. 3B is an isometric view of the controller 7 seen from the bottom rear side thereof. FIG. 4 is a front view of the controller 7.

As shown in FIG. 3A, FIG. 3B and FIG. 4, the controller 7 includes a housing 31 formed by plastic molding or the like. The housing 31 has a generally parallelepiped shape extending in a longitudinal or front-rear direction (the Z-axis direction shown in FIG. 3A). The overall size of the housing 31 is small enough to be held by one hand of an adult or even a child. The player can use the controller 7 to perform a game operation of pressing buttons provided thereon and also to perform a game operation of changing the position or direction of the controller 7 itself. For example, the player can rotate the controller 7 with the longitudinal direction thereof as an axis to move an operation target. The player can change the position indicated by the controller 7 on the display screen to, for example, move the operation target toward the post-change position. The "position indicated by the controller 7 on the display screen" refers to a position at which a phantom straight line extending from a front end of the controller 7 in the longitudinal direction crosses the display screen of the monitor 2. Hereinafter, such a position will be sometimes referred to as an "indicated position" or an "indicated position by the controller 7". The longitudinal direction of the controller 7 (housing 31) will be sometimes referred to as an "indicated direction".

The housing 31 has a plurality of operation buttons. Provided on a top surface of the housing 31 are a cross key 32a, an X button 32b, a Y button 32c, a B button 32d, a select switch 32e, a menu switch 32f, and a start switch 32g. On a bottom surface of the housing 31, a recessed portion is formed. On a rear slope surface of the recessed portion, an A button 32i is provided. These buttons and switches are assigned various functions in accordance with the game program executed by the game apparatus 3, but this will not be described in detail. On the top surface of the housing 31, a power switch 32h is provided for remotely turning on or off the game apparatus 3.

Figure 5A:
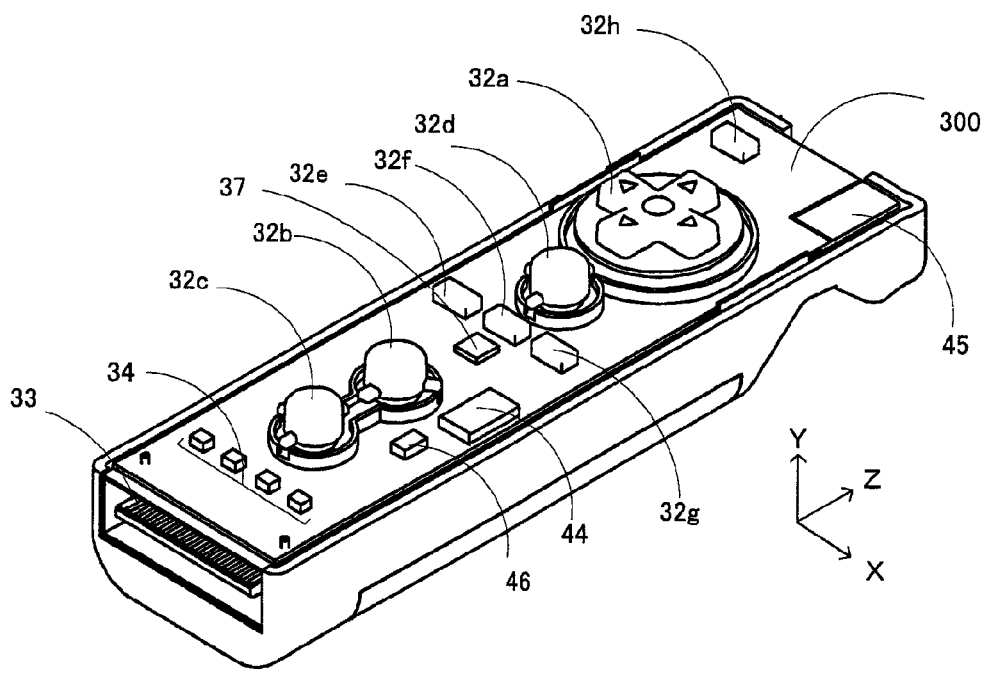
FIG. 5A is an isometric view illustrating a state where an upper casing of the controller 7 is removed.
Figure 5B:
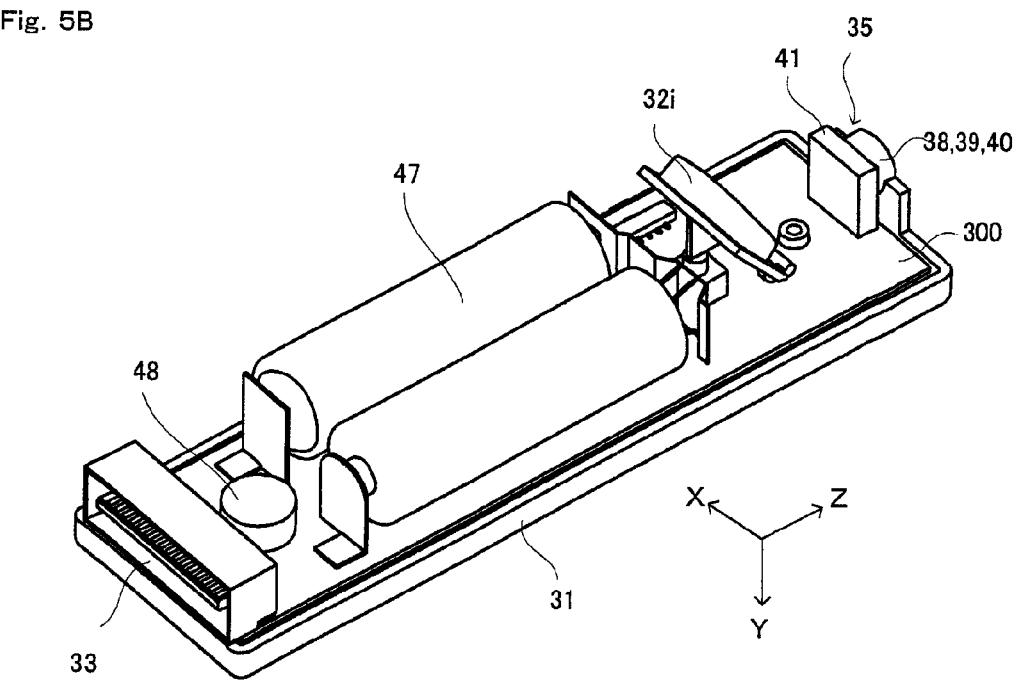
FIG. 5B is an isometric view illustrating a state where a lower casing of the controller 7 is removed.

The controller 7 has the imaging information calculation section 35 (FIG. 5B). As shown in FIG. 4, a light incident opening 35a of the imaging information calculation section 35 is provided on a front surface of the housing 31. On a rear surface of the housing 31, a connector 33 is provided. The connector 33 is, for example, a 32-pin edge connector, and is used for connecting the controller 7 to another device. In a rear part of the top surface of the housing 31, a plurality of LEDs 34 are provided. The controller 7 is assigned a controller type (number) so as to be distinguishable from the other controllers 7. The LEDs 34 are used for informing the player of the controller type which is currently set to controller 7 that he/she is using. Specifically, when the controller 7 transmits the operation data to the game apparatus 3, one of the plurality of LEDs 34 corresponding to the controller type is lit up.

Figure 6:
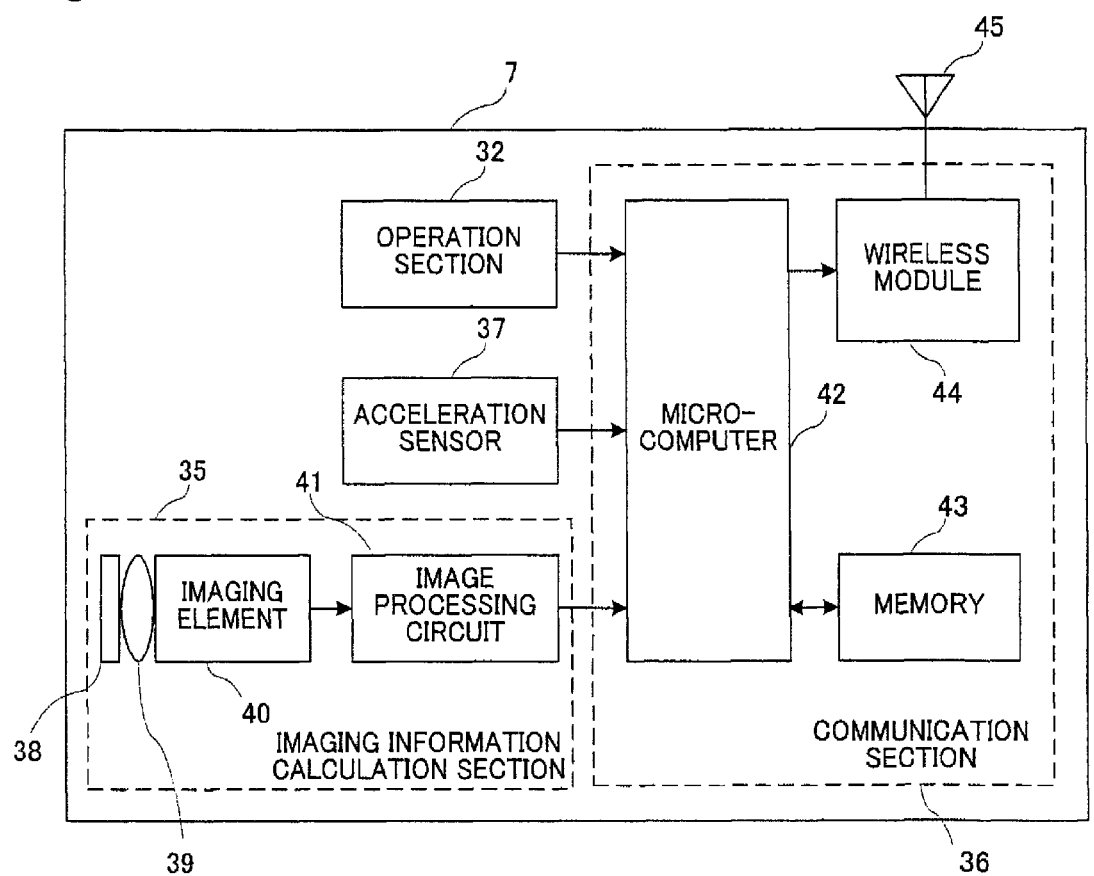
FIG. 6 is a block diagram illustrating a structure of the controller 7.

With reference to FIG. 5A, FIG. 5B and FIG. 6, an internal structure of the controller 7 will be described. FIG. 5A and FIG. 5B illustrate an internal structure of the controller 7. FIG. 5A is an isometric view illustrating a state where an upper casing (a part of the housing 31) of the controller 7 is removed. FIG. 5B is an isometric view illustrating a state where a lower casing (a part of the housing 31) of the controller 7 is removed. FIG. 5B shows a reverse side of a substrate 300 shown in FIG. 5A.

As shown in FIG. 5A, the substrate 300 is fixed inside the housing 31. On a top main surface of the substrate 300, the operation buttons 32a through 32h, an acceleration sensor 37, the LEDs 34, a quartz oscillator 46, a wireless module 44, an antenna 45 and the like are provided. These elements are connected to a microcomputer 42 (see FIG. 6) via lines (not shown) formed on the substrate 300 and the like. The wireless module 44 and the antenna 45 allow the controller 7 to act as a wireless controller. The quartz oscillator 46 generates a reference clock of the microcomputer 42 described later.

As shown in FIG. 5B, at a front edge of a bottom main surface of the substrate 300, the imaging information calculation section 35 is provided. The imaging information calculation section 35 includes an infrared filter 38, a lens 39, an imaging element 40 and an image processing circuit 41 located in this order from the front surface of the controller 7. These elements are attached to the bottom main surface of the substrate 300. At a rear edge of the bottom main surface of the substrate 300, the connector 33 is attached. The operation button 32*i* is attached on the bottom main surface of the substrate 300 rearward to the imaging information calculation section 35, and cells 47 are accommodated rearward to the operation button 32*i*. On the bottom main surface of the substrate 300 between the cells 47 and the connector 33, a vibrator 48 is attached. The vibrator 48 may be, for example, a vibration motor or a solenoid. The controller 7 is vibrated by an actuation of the vibrator 48, and the vibration is conveyed to the player holding the controller 7. Thus, a so-called vibration-responsive game is realized.

FIG. 6 is a block diagram showing the structure of the controller 7. The controller 7 includes the communication section 36 and the acceleration sensor 37 in addition to the above-described operation section 32 (operation buttons) and the imaging information calculation section 35.

The imaging information calculation section 35 is a system for analyzing image data taken by imaging means and detecting the position of the center of gravity, the size and the like of an area having a high brightness in the image data. The imaging information calculation section 35 has, for example, a maximum sampling period of about 200 frames per second, and therefore can trace and analyze even a relatively fast motion of the controller 7.

Specifically, the imaging information calculation section 35 includes the infrared filter 38, the lens 39, the imaging element 40 and the image processing circuit 41. The infrared filter 38 allows only infrared light to pass therethrough, among light incident on the front surface of the controller 7. The markers 8*a* and 8*b* located in the vicinity of the display screen of the monitor 2 are infrared LEDs for outputting infrared light forward from the monitor 2. Therefore, the provision of the infrared filter 38 allows the image of each of the markers 8*a* and 8*b* to be taken more accurately. The lens 39 collects the infrared light which has passed through the infrared filter 38 and outputs the infrared light to the imaging element 40. The imaging element 40 is a solid-state imaging device such as, for example, a CMOS sensor or a CCD. The imaging element 40 takes an image of the infrared light collected by the lens 39. Accordingly, the imaging element 40 takes an image of only the infrared light which has passed through the infrared filter 38 and generates image data. Hereinafter, an image taken by the imaging element 40 will be referred to as a "taken image". The image data generated by the imaging element 40 is processed by the image processing circuit 41. The image processing circuit 41 calculates the positions of the imaging targets (the markers 8*a* and 8*b*) in the taken image, and outputs coordinate sets indicating the respective positions of the markers 8*a* and 8*b* in the taken image to the communication section 36. The processing executed by the image processing circuit 41 will be described later in detail.

The acceleration sensor 37 detects an acceleration in three axial directions of the controller 7, i.e., the up-down direction (Y-axis direction in FIG. 3A), the left-right direction (X-axis direction in FIG. 3A), and the front-rear direction (the Z-axis direction in FIG. 3A). The acceleration sensor 37 allows the inclinations of the controller 7 in the X-axis, Y-axis and Z-axis directions to be determined. The game apparatus 3 can also determine the rotation angle of the controller 7 around the Z axis by the acceleration sensor 37, in addition to based on the taken image mentioned above. Data representing the accelerations detected by the acceleration sensor 37 is output to the communication section 36.

As explained above, the controller 7 preferably includes a three-axis, linear acceleration sensor 37 that detects linear acceleration in each of the three axial directions described above. Alternatively, a two axis linear accelerometer that only detects linear acceleration along each of the X-axis and Y-axis (or other pair of axes) may be used in another embodiment depending on the type of control signals desired. As a non-limiting example, the three-axis or two-axis linear accelerometer 37 may be of the type available from Analog Devices, Inc. or STMicroelectronics N.V. Preferably, the acceleration sensor 37 is an electrostatic capacitance or capacitance-coupling type that is based on silicon micro-machined MEMS (microelectromechanical systems) technology. However, any other suitable accelerometer technology (e.g., piezoelectric type or piezoresistance type) now existing or later developed may be used to provide the three-axis or two-axis acceleration sensor 37.

As one skilled in the art understands, linear accelerometers, as used in acceleration sensor 37, are only capable of detecting acceleration along a straight line corresponding to each axis of the acceleration sensor. In other words, the direct output of the acceleration sensor 37 is limited to signals indicative of linear acceleration (static or dynamic) along each of the two or three axes thereof. As a result, the acceleration sensor 37 cannot directly detect movement along a non-linear (e.g. arcuate) path, rotation, rotational movement, angular displacement, tilt, position, attitude or any other physical characteristic.

However, through additional processing of the linear acceleration signals output from the acceleration sensor 37, additional information relating to the controller 7 can be inferred or calculated, as one skilled in the art will readily understand from the description herein. For example, by detecting static, linear acceleration (i.e., gravity), the linear acceleration output of the acceleration sensor 37 can be used to infer or calculate tilt or inclination of the object relative to the gravity vector by correlating tilt angles with detected linear acceleration. In this way, the acceleration sensor 37 can be used in combination with the micro-computer 42 (or another processor) to determine tilt, attitude or position of the controller 7. Similarly, various movements and/or positions of the controller 7 can be calculated or inferred through processing of the linear acceleration signals generated by the acceleration sensor 37 when the controller 7 containing the acceleration sensor 37 is subjected to dynamic accelerations by, for example, the hand of a user. In another embodiment, the acceleration sensor 37 may include an embedded signal processor or other type of dedicated processor for performing any desired processing of the acceleration signals output from the accelerometers therein prior to outputting signals to micro-computer 42. For example, the embedded or dedicated processor could convert the detected acceleration signal to a corresponding tilt angle when the acceleration sensor is intended to detect static acceleration (i.e., gravity).

In another exemplary embodiment, the acceleration sensor 37 may be replaced with a gyro-sensor of any suitable technology incorporating, for example, a rotating or vibrating element. Exemplary MEMS gyro-sensors that may be used in this embodiment are available from Analog Devices, Inc. Unlike the linear acceleration sensor 37, a gyro-sensor is capable of directly detecting rotation (or angular rate) around an axis defined by the gyroscopic element (or elements) therein. Thus, due to the fundamental differences between a gyro-sensor and a linear acceleration sensor (e.g., angle-based vs. vector-based output), corresponding changes need to be made to the processing operations that are performed on the output signals from these devices depending on which device is selected for a particular application. More specifically, when tilt or inclination is calculated using a gyro-sensor instead of the acceleration sensor, significant changes are necessary. Specifically, when using a gyro-sensor, the value of inclination is initialized at the start of detection. Then, data on the angular velocity which is output from the gyroscope is integrated. Furthermore, a change amount in inclination from the value of inclination previously initialized is calculated. In this case, the calculated inclination corresponds to an angle. In contrast, when an acceleration sensor is used, the inclination is calculated by comparing the value of the acceleration of gravity of each axial component with a predetermined reference. Therefore, the calculated inclination can be represented as a vector. Thus, without initialization, an absolute direction can be determined with an accelerometer. The type of the value calculated as an inclination is also very different between a gyroscope and an accelerometer; i.e., the value is an angle when a gyroscope is used and is a vector when an acceleration sensor is used. Therefore, when a gyroscope is used instead of an acceleration sensor or vice versa, data on inclination also needs to be processed by a predetermined conversion that takes into account the fundamental differences between these two devices. Due to the fact that the nature of gyroscopes is known to one skilled in the art, as well as the fundamental differences between linear accelerometers and gyroscopes, further details are not provided herein so as not to obscure the remainder of the disclosure. While gyro-sensors provide certain advantages due to their ability to directly detect rotation, linear acceleration sensors are generally more cost effective when used in connection with the controller applications described herein.

The communication section 36 includes the microcomputer 42, a memory 43, the wireless module 44 and the antenna 45. The microcomputer 42 controls the wireless module 44 for wirelessly transmitting the data obtained by the microcomputer 42 while using the memory 43 as a storage area during processing.

Data which is output from the operation section 32, the acceleration sensor 37 and the imaging information calculation section 35 to the microcomputer 42 is temporarily stored in the memory 43. The wireless transmission from the communication section 36 to the receiving unit 6 is performed at a predetermined time interval. Since game processing is generally performed at a cycle of ⅟60 sec., the wireless transmission needs to be performed at a cycle of a shorter time period. At the transmission timing to the receiving unit 6, the microcomputer 42 outputs the data stored in the memory 43 to the wireless module 44 as operation data. The wireless module 44 uses, for example, the Bluetooth (registered trademark) technology to modulate a carrier wave of a predetermined frequency with the operation data and radiate the resultant very weak electric signal from the antenna 45. Namely, the operation data is modulated into a very weak electric signal by the wireless module 44 and transmitted from the controller 7. The very weak electric signal is received by the receiving unit 6 on the side of the game apparatus 3. The received very weak electric signal is demodulated or decoded, so that the game apparatus 3 can obtain the operation data. The CPU 10 of the game apparatus 3 executes the game processing based on the obtained operation data and the game program.

The shape of the controller 7, and the shape, number, position or the like of the operation buttons and switches shown in FIG. 3A through FIG. 5B are merely exemplary non-limiting embodiments, and thus may be altered to form yet further embodiments. The position of the imaging information calculation section 35 in the controller 7 (the light incident opening 35a of the imaging information calculation section 35) does not need to be on the front surface of the housing 31, and may be on another surface as long as light can enter from the outside of the housing 31. In this case, the "indicated direction" is a direction vertical to the light incident opening.

By using the controller 7, the player can perform a game operation, which was not possible conventionally, of changing the position of the controller 7 itself or rotating the controller 7, in addition to the pressing of the operation buttons or switches. Hereinafter, the game operations using the controller 7 will be described.

Figure 7:
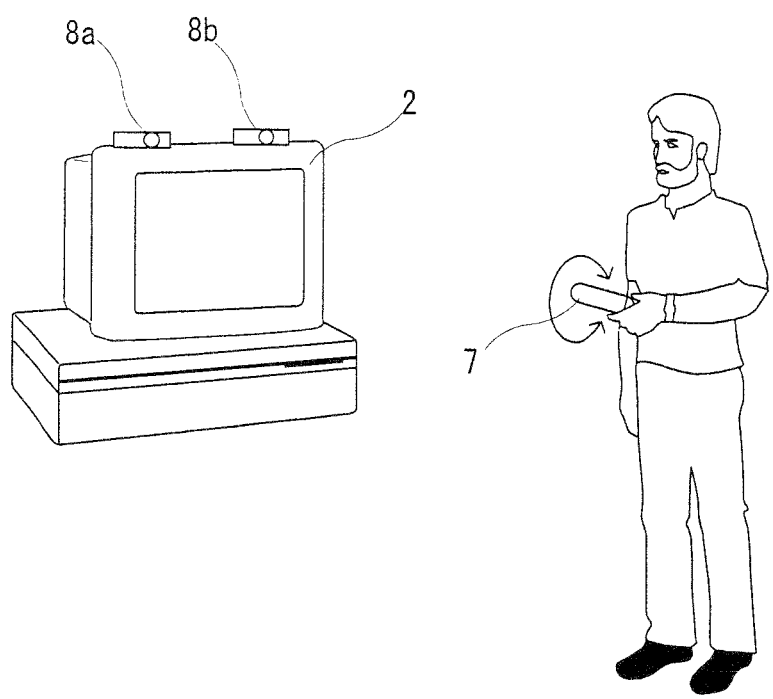
FIG. 7 shows a general view of a game operation using the controller 7.

FIG. 7 is a general view of a game operation using the controller 7. As shown in FIG. 7, when playing the game using the controller 7 with the game system 1, the player holds the controller 7 with one hand (for example, left hand). The markers 8a and 8b are located parallel to the transverse or width direction of the monitor 2. The player holds the controller 7 such that the front surface of the controller 7 (having the light incident opening 35a by which the imaging information calculation section 35 takes the image of each of the markers 8a and 8b) faces the markers 8a and 8b. In this state, the player rotates the controller 7 (as indicated by the arrows in FIG. 7) or changes the position indicated by the controller 7 on the display screen to perform the game operations.

Figure 8:
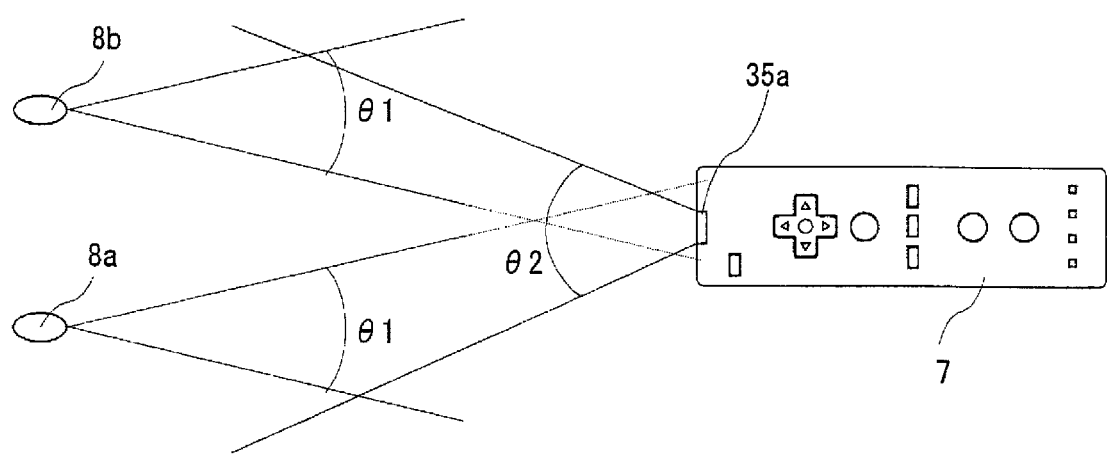
FIG. 8 illustrates the viewing angles of markers 8a and 8b and the controller 7.
Figure 9:
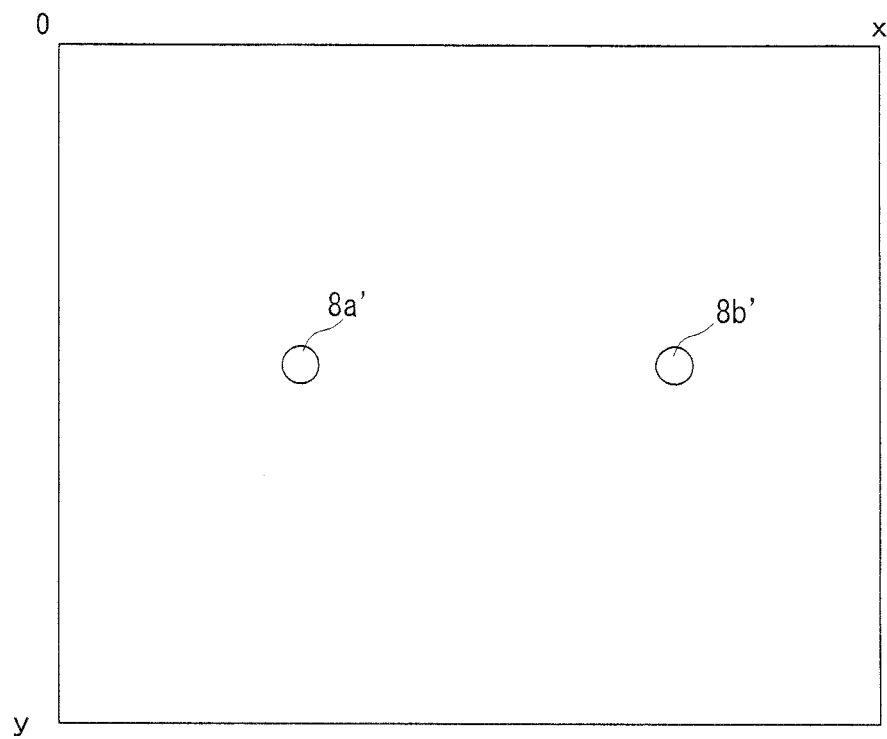
FIG. 9 shows an example of a taken image including a target image.

FIG. 8 illustrates the viewing angles of the markers 8a and 8b and the controller 7. As shown in FIG. 8, the markers 8a and 8b each radiate infrared light at a viewing angle θ1. The imaging information calculation section 35 can receive light incident thereon at a viewing angle θ2. For example, the viewing angle θ1 of each of the markers 8a and 8b is 34° (half value angle), and the viewing angle θ2 of the imaging information calculation section 35 is 41°. The player holds the controller 7 at the position and the direction with which the imaging information calculation section 35 can receive the infrared light from both the markers 8a and 8b. Specifically, the player holds the controller 7 in a range in which both the markers 8a and 8b exist in the viewing angle θ2 of the imaging information calculation section 35 and the controller 7 exists in the viewing angle θ1 of the marker 8a and also in the viewing angle θ1 of the marker 8b. The player can perform a game operation by changing the position or the direction of the controller 7 in this range. When the position or the direction of the controller 7 is outside the above-described range, the game operation based on the position and the direction of the controller 7 cannot be performed. Hereinafter, the above-described range will be referred to as an "operable range".

Where the controller 7 is held in the operable range, the imaging information calculation section 35 takes an image of each of the markers 8a and 8b. The taken image obtained by the imaging element 40 includes an image (target image) of each of the markers 8a and 8b which are imaging targets. FIG. 9 shows an example of the taken image including the target images. Using image data of the taken image including the target images, the image processing circuit 41 calculates a coordinate set representing the position of each of the markers 8a and 8b in the taken image.

The target images appear as high brightness areas in the image data of the taken image. Therefore, the image processing circuit 41 first detects the high brightness areas as candidates of the target images. Next, based on the size of each detected high brightness area, the image processing circuit 41 determines whether or not the high brightness area is a target image. The taken image may include images other than the target images (images 8a' and 8b' of the markers 8a and 8b)

due to sunlight coming through a window or light of a fluorescent lamp. The determination is performed in order to distinguish the target images 8a' and 8b' from the other images so that the target images are accurately detected. Specifically, it is determined whether or not each detected high brightness area has a size within a predetermined size range. When the high brightness area has a size within the predetermined size range, the high brightness area is determined to be a target image; whereas when the high brightness area has a size outside the predetermined size range, the high brightness area is determined not to be a target image.

The image processing circuit 41 calculates the position of a high brightness area which is determined to be a target image as a result of the determination. Specifically, the image processing circuit 41 calculates the position of the center of gravity of the high brightness area. If the target images are accurately detected, two high brightness areas are determined to be target images by the determination. Therefore, two positions are calculated. The position in the taken image is represented with a coordinate system (x-y coordinate system) in which the upper left corner of the taken image is the origin, the downward direction from the origin is a positive y-axis direction, and the rightward direction from the origin is a positive x-axis direction. Accordingly, the image processing circuit 41 outputs data on the two coordinate set values indicating the two positions obtained by the calculation. The output data on the coordinate set values is transmitted to the game apparatus 3 as operation data by the microcomputer 42 as described above.

Figure 10:
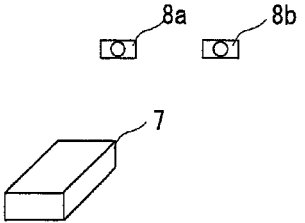
FIG. 10 shows a change of the taken image when the position and/or the direction of the controller 7 is changed.

Using the data on the coordinate set values included in the received operation data, the game apparatus 3 can calculate the indicated position (the position indicated by the controller 7 on the display screen), the rotation angle (posture) of the controller 7 around the indicated direction, and the distance from the controller 7 to each of the markers 8a and 8b. FIG. 10 shows a change of the taken image when the position and/or the direction of the controller 7 is changed. FIG. 10 shows the correspondence between the state of the controller 7 and the taken image obtained when the controller 7 is in the respective state. In FIG. 10, a taken image I1 is obtained when the controller 7 is in state A. In the taken image I1, the target images 8a' and 8b' of the markers 8a and 8b are located in the vicinity of the center of the taken image I1. The target images 8a' and 8b' are located generally parallel to the X-axis direction.

State B shown in FIG. 10 is obtained by rotating the controller 7 at 90° clockwise around the indicated direction as an axis (around the Z axis) from state A. In this specification, the terms "clockwise" and "counterclockwise" used regarding the controller 7 refer to the rotation directions when seen from behind the controller 7 (from the negative end of the Z-axis direction in FIG. 3A; i.e., from the rear surface of the housing 31). In state B, a taken image I2 is obtained by the imaging information calculation section 35. In the taken image I2, the target images 8a' and 8b' have been moved on an arc at 90° counterclockwise from the taken image I1. Accordingly, the posture of the controller 7 with respect to the indicated direction as an axis of rotation is found by detecting the direction of the target images in the taken image (the direction of the image 8b' with respect to the image 8a', or the direction of the image 8a' with respect to the image 8b').

State C shown in FIG. 10 is obtained by translating the controller 7 rightward (in the positive x-axis direction) from state A. In state C, a taken image I3 is obtained by the imaging information calculation section 35. In the taken image I3, the target images 8a' and 8b' have been moved leftward (in the negative x-axis direction) from the taken image I1. In state C, the indicated direction of controller 7 is directed rightward with respect to state A. The indicated direction of controller 7 can be directed rightward by rotating the controller 7 around the Y axis as well as translating the controller 7 rightward. When the controller 7 is rotated around the Y axis, substantially the same taken image as the taken image I3 is obtained. Therefore, when the controller 7 is moved (rotated) so as to direct the indicated direction of the controller 7 rightward, substantially the same taken image as the taken image I3 is obtained. Namely, an image in which the target images 8a' and 8b' have been translated is obtained. Accordingly, the indicated direction of the controller 7 can be found by detecting the positions of the target images in the taken image (in the example described below, the position of an intermediate point between the images 8a' and 8b'). In this specification, the term "intermediate" means substantially exactly halfway between the two points, coordinate sets or images.

State D shown in FIG. 10 is obtained by moving the controller 7 to be farther from the markers 8a and 8b (i.e., translating the controller 7 rearward) from state A. In state D, a taken image I4 is obtained by the imaging information calculation section 35. In the taken image I4, the distance between the target images 8a' and 8b' is shorter than in the taken image I1. Accordingly, the moving state of the controller 7 in the indicated direction (the distance from the controller 7 to the markers 8a and 8b) can be found by detecting the distance between the two target images in the taken image (the distance between the images 8a' and 8b'; when the two target images are considered as one integral target image, the size of the target image).

Figure 11:
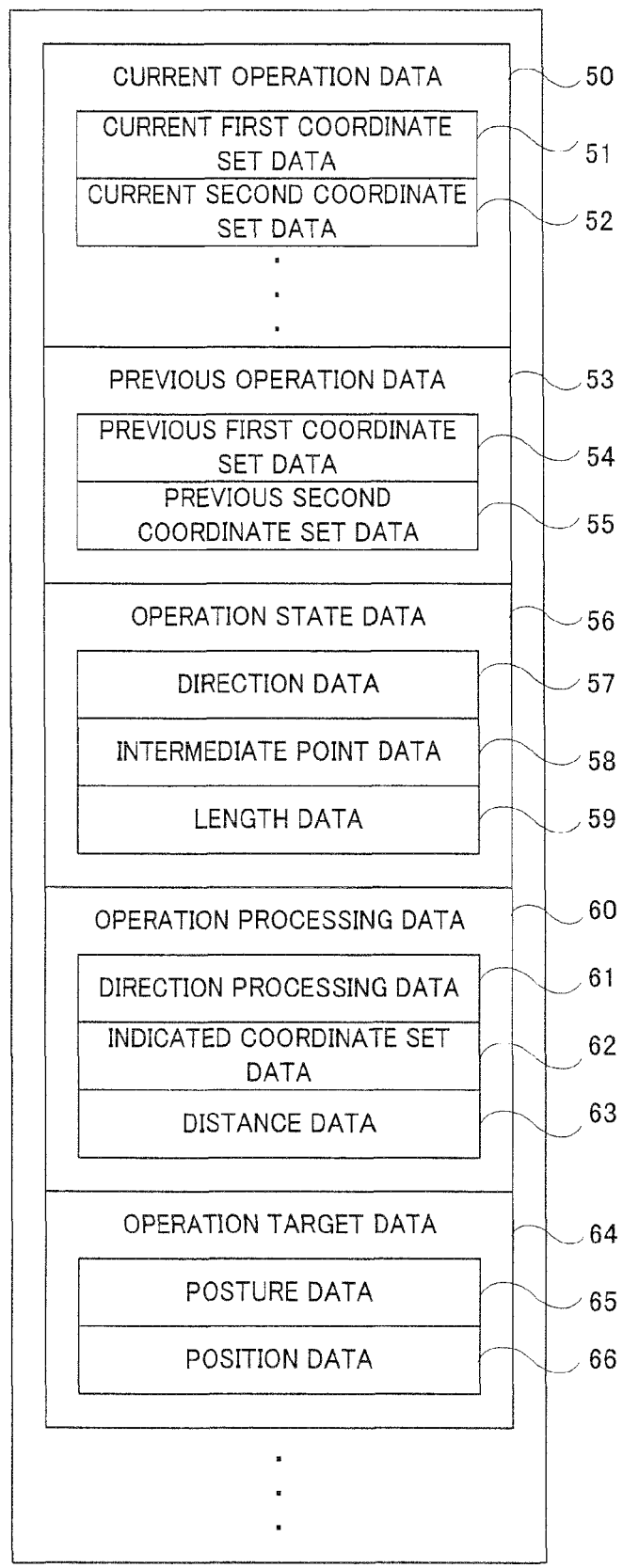
FIG. 11 shows main data stored on a main memory 13 of the game apparatus 3.

Next, the game processing executed by the game apparatus 3 will be described in detail. First, main data used for the game processing will be described with reference to FIG. 11. FIG. 11 shows main data stored on the main memory 13 of the game apparatus 3. As shown in FIG. 11, the main memory 13 has stored thereon current operation data 50, previous operation data 53, operation state data 56, operation processing data 60, operation target data 64 and the like. In addition to the data shown in FIG. 11, the main memory 13 has stored thereon other data required for the game processing including data regarding a player character appearing in the game (image data, position data, etc. of the player character) and data regarding the game space (topography data, etc.).

The current operation data 50 is a latest data transmitted from the controller 7. The current operation data 50 includes current first coordinate set data 51 and current second coordinate set data 52. The current first coordinate set data 51 represents a position of the image of one of the two marks (the position in the taken image). The current second coordinate set data 52 represents a position of the image of the other mark (the position in the taken image). The position of the image of each mark is represented with the x-y coordinate system (see FIG. 9). Hereinafter, the coordinate set represented by the current first coordinate set data 51 will be referred to as a "first coordinate set", and the coordinate set represented by the current second coordinate set data 52 will be referred to as a "second coordinate set". The first coordinate set and the second coordinate set will be distinguished from each other in order to accurately calculate direction data 57 described later. Either one of the first coordinate set and the second coordinate set may represent the position of the image of the marker 8a or the marker 8b. However, in the case where the first coordinate set represents the image of one of the markers in one frame, the first coordinate set needs to represent the image of the same marker in the next frame (see steps S13 through S15 described later).

The current operation data 50 includes data obtained from the operation section 32 and the acceleration sensor 37 in addition to the coordinate set data obtained from the taken image (the current first coordinate set data 51 and the current second coordinate set data 52). The game apparatus 3 obtains the operation data from the controller 7 at a predetermined time interval (for example, at an interval of 1 frame). The latest data among the operation data obtained is stored on the main memory 13 as the current operation data 50.

The previous operation data 53 includes previous first coordinate set data 54 and previous second coordinate set data 55. In this specification, the term "previous" means "immediately previous". The previous first coordinate set data 54 is the first coordinate set data obtained immediately before the current first coordinate set data 51. Namely, when new operation data is obtained, the data which has been the current first coordinate set data 51 so far is stored as the previous first coordinate set data 54. One of the two pieces of coordinate set data included in the new operation data is stored on the main memory 13 as the current first coordinate set data 51. Similarly, the previous second coordinate set data 55 is the second coordinate set data obtained immediately before the current second coordinate set data 52. Namely, when new operation data is obtained, the data which has been the current second coordinate set data 52 so far is stored as the previous second coordinate set data 55. The other of the two pieces of coordinate set data included in the new operation data (the data which is not the data representing the first coordinate set) is stored on the main memory 13 as the current second coordinate set data 52.

The operation state data 56 represents an operation state of the controller 7 which is determined based on the taken image. The operation state data 56 represents a position, direction, and size of the target image included in the taken image. The operation state data 56 includes direction data 57, intermediate point data 58, and length data 59. The direction data 57 represents a direction from the first coordinate set to the second coordinate set. In this embodiment, the direction data 57 is data on a two-dimensional vector having a position of the first coordinate set as a start point and a position of the second coordinate set as an end point. The direction data 57 represents a direction of the target image (markers 8a and 8b) in the taken image. The intermediate point data 58 represents a coordinate set of a point intermediate between the first coordinate set and the second coordinate set. In the case where the image of the marker 8a and the image of the marker 8b are considered as one integral target image, the intermediate point data 58 represents a position of the target image. The length data 59 represents a length of a distance between the first coordinate set and the second coordinate set. In the case where the image of the marker 8a and the image of the marker 8b are considered as one integral target image, the length data 59 represents a size of the target image.

The operation processing data 60 is calculated during the process of calculating the operation target data 64 from the operation state data 56. The operation processing data 60 includes direction processing data 61, indicated coordinate set data 62, and distance data 63. The direction processing data 61 is calculated during the process of calculating posture data 65 of the operation target data 64 from the direction data 57. The direction processing data 61 represents, for example, a difference between a predetermined reference direction and a direction represented by the direction data 57 (angular difference). The indicated coordinate set data 62 is calculated from the intermediate point data 58, and represents a coordinate set of an indicated position on the display screen of the monitor 2. The indicated coordinate set data 62 is calculated during the process of calculating position data 66 of the operation target data 64. The distance data 63 represents a distance from the imaging means of the controller 7 (the imaging information calculation section 35) to the imaging target (markers 8a and 8b). The distance data 63 is calculated during the process of calculating the position data 66 from the length data 59. The data 61 through 63 included in the operation processing data 60 are used for calculating the operation target data 64 when necessary, but not necessarily.

The operation target data 64 represents a position and a posture of the operation target on the display screen or in the game space. The "operation target" may be an object displayed on the display screen, an object appearing in the virtual game space, or in the case where a virtual three-dimensional game space is constructed, a virtual camera for displaying the three-dimensional game space on the display screen. The operation target data 64 includes the posture data 65 and the position data 66. The posture data 65 represents a posture of the operation target. The position data 66 represents a position of the operation target in the game space or on the display screen.

Figure 12:
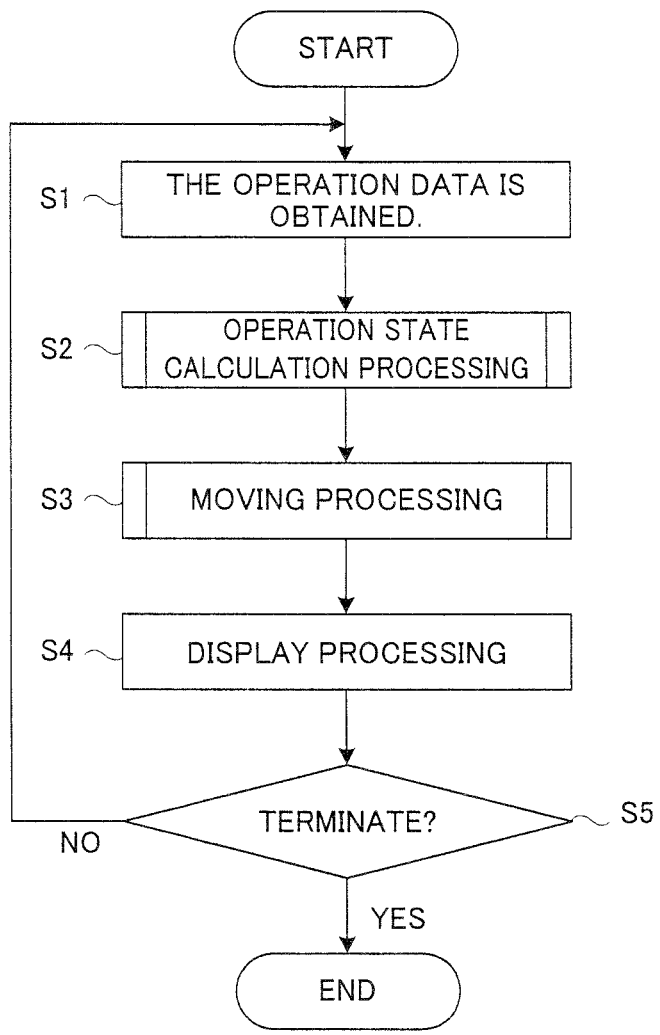
FIG. 12 is a flowchart illustrating a flow of game processing executed by the game apparatus 3.

Next, the game processing executed by the game apparatus 3 will be described in detail with reference to FIG. 12 through FIG. 18B. FIG. 12 is a flowchart illustrating a flow of the game processing executed by the game apparatus 3. When the game apparatus 3 is turned on the CPU 10 of the game apparatus 3 executes a start program stored on the boot ROM (not shown) to initialize each unit, such as, for example, the main memory 13. The game program stored on the optical disc 4 is read into the main memory 13, and the CPU 10 starts the execution of the game program. The flowchart shown in FIG. 12 illustrates the game processing after the above-described processing is completed. In the following description given with reference to FIG. 12 through FIG. 18B, the game processing regarding the position and the direction of the controller 7 will be explained in detail, and other game processing not directly relevant will be omitted.

With reference to FIG. 12, in step S1, the operation data is obtained from the controller 7. The CPU 10 stores the operation data on the main memory 13 as the current operation data 50. The contents of the data which have been the current first coordinate set data 51 and the current second coordinate set data 52 so far are stored on the main memory 13 as the previous first coordinate set data 54 and the previous second coordinate set data 55. At this point, it has not been determined which of the two pieces of coordinate set data included in the operation data is to be the current first coordinate set data 51 and which is to be the current second coordinate set data 52. Accordingly, at this point, neither the current first coordinate set data 51 nor the current second coordinate set data 52 is stored on the main memory 13, and the two pieces of coordinate set data included in the operation data are stored on the main memory 13 separately from the current first coordinate set data 51 and the current second coordinate set data 52.

The operation data obtained in step S1 includes the coordinate set data representing positions of the markers 8a and 8b in the taken image, and also data representing whether or not each operation button of the controller 7 has been pressed and data representing accelerations of the controller 7 in the up-down direction and the left-right direction. In this embodiment, the controller 7 transmits the operation data at a time interval shorter than one frame, and the CPU 10 obtains the operation data frame by frame. Accordingly, the processing loop of steps S1 through S5 shown in FIG. 12 is repeated frame by frame.

Next in step S2, operation state calculation processing is executed. In the operation state calculation processing, an operation state of controller 7 (a value corresponding to a position, a posture or the like of the controller 7) is calculated based on the operation data from the controller 7. Hereinafter, with reference to FIG. 13 and FIG. 14, the operation state calculation processing will be described in detail.

Figure 13:
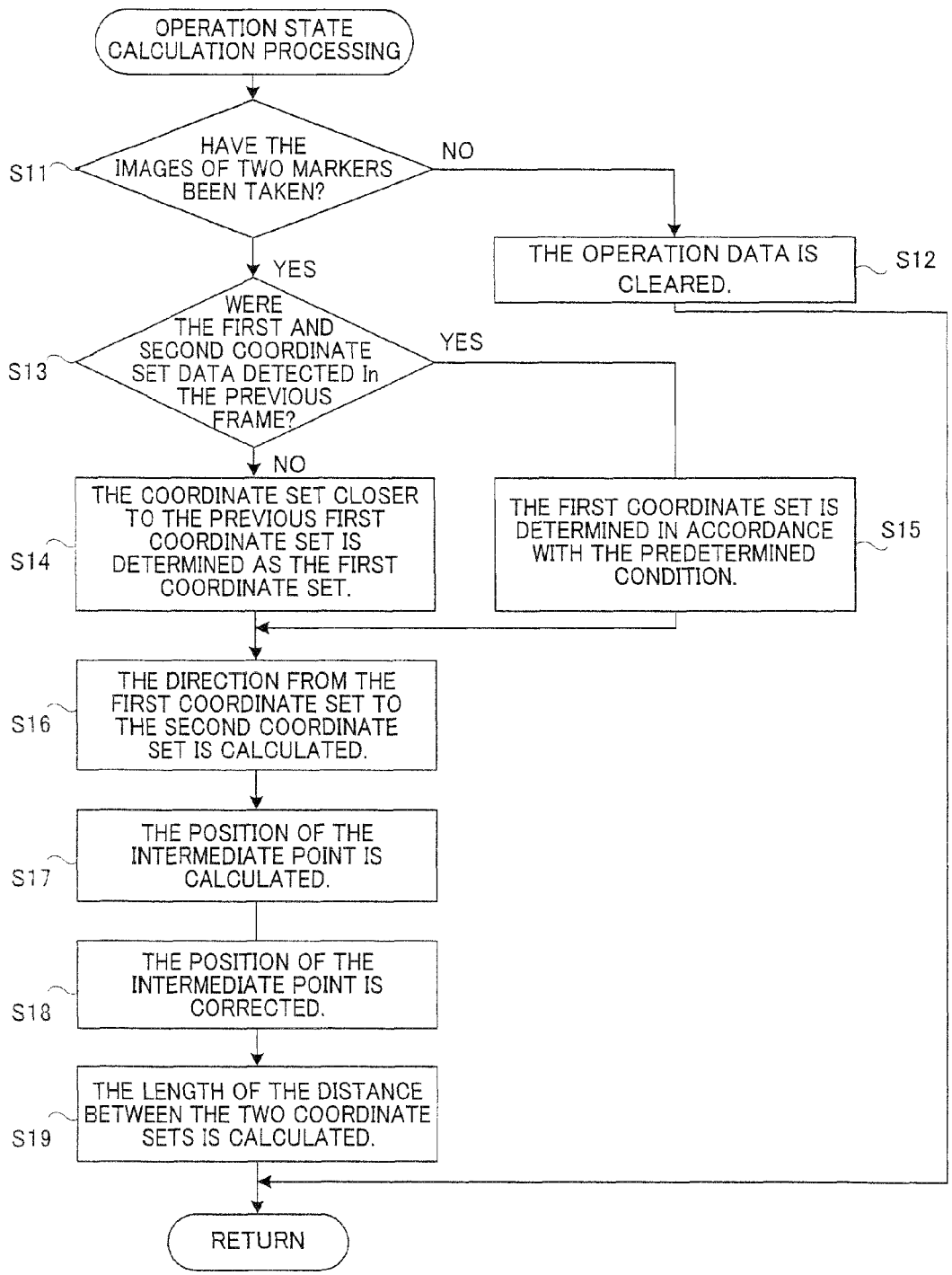
FIG. 13 is a flowchart illustrating a detailed flow of operation state calculation processing (S2) shown in FIG. 12.

FIG. 13 is a flowchart illustrating a detailed flow of the operation state calculation processing (S2) shown in FIG. 12. The operation state calculation processing is executed as follows. First in step S11, it is determined whether or not images of the two markers 8a and 8b have been taken by the imaging information calculation section 35 of the controller 7. The determination in step S11 is executed in order to determine whether or not the controller 7 is held in the operable range. When the images of the two markers 8a and 8b have not been taken by the imaging information calculation section 35 (when the controller 7 is not held in the operable range), the operation data from the controller 7 does not include two pieces of coordinate set data. Namely, when the image of only one marker is taken by the imaging information calculation section 35, the image processing circuit 41 outputs only one piece of coordinate set data, and the operation data from the controller 7 includes only one piece of coordinate set data. When the image of neither the marker 8a nor 8b is taken by the imaging information calculation section 35, the image processing circuit 41 does not output any coordinate set data, and the operation data from the controller 7 does not include any coordinate set data. Accordingly, the determination in step S11 can be performed based on whether or not the operation data obtained in step S1 includes two pieces of coordinate set data. When it is determined in step S11 that the images of the two markers 8a and 8b have been taken, processing in step S13 is executed. When it is determined in step S11 that the images of the two markers 8a and 8b have not been taken, processing in step S12 is executed.

In step S12, the contents of the operation state data 56 stored on the main memory 13 are cleared. In the case where the operation state data 56 is not stored on the main memory 13, the operation target is not moved in moving processing described later. Namely, in this embodiment, in the case where the images of two markers 8a and 8b are not taken, no game processing is executed. After step S12, the CPU 10 terminates the operation state calculation processing.

Figure 14:
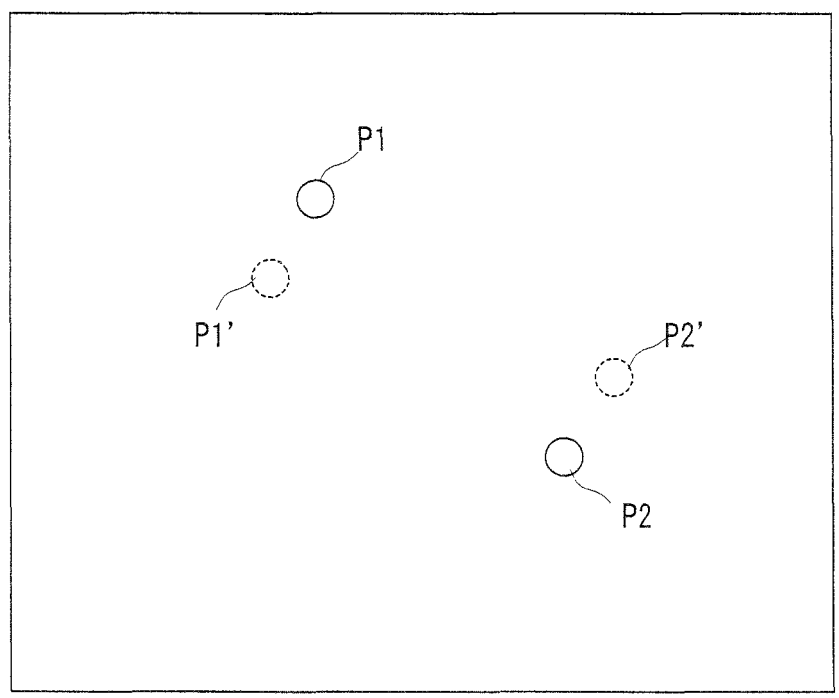
FIG. 14 illustrates processing for determining a first coordinate set and a second coordinate set.

In steps S13 through S15, it is determined which of the two pieces of coordinate set data represents the first coordinate set and which of the data represents the second coordinate set. FIG. 14 illustrates the processing for determining which is the first coordinate set and which is the second coordinate set. In FIG. 14, point P1' indicated with the dashed circle represents the position of the previous first coordinate set, and point P2' indicated with the dashed circle represents the position of the previous second coordinate set. Points P1 and P2 indicated with the solid circles show the positions of the coordinate sets represented by the two pieces of coordinate set data obtained at the current time.

Referring to FIG. 14, it cannot be detected, only from the coordinate sets P1 and P2, which of the coordinate sets P1 and P2, represented by the two pieces of coordinate set data obtained at the current time, is the first coordinate set and which is the second coordinate set. Namely, the game apparatus 3 cannot determine, only from the coordinate sets P1 and P2, whether the coordinate set P1' has moved to become the coordinate set P1 or the coordinate set P2' has moved to become the coordinate set P1. Either one of the first coordinate set and the second coordinate set may represent the position of the image of the marker 8a or the marker 8b. It is important, however, to correctly detect which data represents the first coordinate set and which data represents the second coordinate set, in order to calculate the direction from the first coordinate set to the second coordinate set (step S16 described later). If the first coordinate set and the second coordinate set are detected oppositely, the direction obtained by the calculation is the opposite. If the previous first coordinate set is detected as the current second coordinate set, for example, the direction calculated in step S16 is incorrect.

In order to avoid this, in this embodiment, the first coordinate set and the second coordinate set are detected based on the distances between the previous coordinate sets and the current coordinate sets. Specifically, among the two coordinate sets newly obtained currently, the coordinate set which is closer to the previous first coordinate set is determined as the first coordinate set, and the other coordinate set is determined as the second coordinate set. In the example shown in FIG. 14, the coordinate set P1 which is closer to the previous coordinate set P1' is set as the first coordinate set, and the other coordinate set P2 is set as the second coordinate set. In the case where the controller 7 is rotated at an angle greater than 90° from one frame to the next frame, the coordinate set which is farther from the previous first coordinate set is the correct first coordinate set. However, it is considered that the controller 7 cannot actually rotate at an angle greater than 90° during one frame because the time interval at which the coordinate sets are obtained (the time interval at which the imaging information calculation section 35 takes the images) is usually very short (for example, an interval of 1/200 seconds). Therefore, the first coordinate set can be correctly detected by setting the coordinate set closer to the previous first coordinate set as the first coordinate set.

Specifically, in step S13, it is determined whether or not the first coordinate set and the second coordinate set were detected in the previous frame. The determination in step S13 is performed based on whether or not the operation state data 56 is stored on the main memory 13. When the processing in step S12 was executed in the previous frame, the operation state data 56 is not stored on the main memory 13. In this case, at least one of the first coordinate set and the second coordinate set was not obtained in the previous frame, and so the first coordinate set and the second coordinate set cannot be determined using the previous coordinate sets. When the processing in step S13 was executed in the previous frame, the operation state data 56 is stored on the main memory 13. In this case, the first coordinate set and the second coordinate set can be determined using the previous coordinate sets. The processing in step S13 is executed in order to determine whether or not the first coordinate set and the second coordinate set are to be determined using the previous coordinate sets. When it is determined in step S13 that the first coordinate set and the second coordinate set were detected in the previous frame, processing in step S14 is executed. When it is determined in step S13 that at least one of the first coordinate set and the second coordinate set was not detected in the previous frame, processing in step S15 is executed.

In step S14, among the two coordinate sets represented by the two pieces of coordinate set data included in the operation data obtained in step S1, the coordinate set closer to the previous first coordinate set is determined as the first coordinate set. Specifically, the CPU 10 refers to the previous first coordinate set data 54 stored on the main memory 13 and the two pieces of coordinate set data included in the operation data, and specifies, among the coordinate sets represented by the two pieces of coordinate set data, the coordinate set which is closer to the coordinate set represented by the previous first coordinate set data 54. The CPU 10 stores coordinate set data on the specified coordinate set on the main memory 13 as the current first coordinate set data 51, and also stores coordinate set data on the other coordinate set on the main memory 13 as the current second coordinate set data 52.

In step S15, one of the coordinate sets represented by the two pieces of coordinate set data is determined as the first coordinate set in accordance with a predetermined condition. The predetermined condition may be any condition. For example, the CPU 10 determines the coordinate set having a smaller y-axis coordinate value as the first coordinate set, and determines the other coordinate set as the second coordinate set. Data on the coordinate set determined as the first coordinate set is stored on the main memory 13 as the current first coordinate set data 51, and data on the coordinate set determined as the second coordinate set is stored on the main memory 13 as the current second coordinate set data 52.

In step S16, a direction from the first coordinate set to the second coordinate set is determined. Specifically, the CPU 10 refers to the current first coordinate set data 51 and the current second coordinate set data 52 to calculate a vector having a position of the first coordinate set as a start point and a position of the second coordinate set as an end point. Data on the calculated vector is stored on the main memory 13 as the direction data 57. The direction of the calculated vector corresponds to a rotation angle of the controller 7 around the indicated direction. Namely, as a result of the processing in step S16, the rotation of the controller 7 around the indicated direction is calculated.

Next in step S17, a coordinate set of an intermediate point between the first coordinate set and the second coordinate set is calculated. Specifically, the CPU 10 refers to the current first coordinate set data 51 and the current second coordinate set data 52 to calculate the coordinate set of the intermediate point. Data on the calculated coordinate set of the intermediate point is stored on the main memory 13 as the intermediate point data 58. The intermediate point data 58 represents a position of the target image (the markers 8*a* and 8*b*) in the taken image.

Next in step S18, the coordinate set of the intermediate point calculated in step S17 is corrected. FIG. 15 illustrates the processing in step S18 shown in FIG. 13. FIG. 15 shows the correspondence between the state of the controller 7 and the taken image obtained when the controller 7 is in the respective state. In FIG. 15, in both state A and state B, the center of the display screen of the monitor 2 is the indicated position by the controller 7. In state A, the top surface of the controller 7 is directed upward (in this embodiment, this state will be referred to as the "reference state"); whereas in state B, the top surface of the controller 7 is directed rightward. Since the markers 8*a* and 8*b* are located above the display screen, the positions of the markers 8*a* and 8*b* do not match the indicated position (at the center of the display screen). Therefore, in state A, the target images are above the center of the taken image. In state B, the target images are left to the center of the taken image. As seen from FIG. 15, since the positions of the markers 8*a* and 8*b* do not match the indicated position (at the center of the display screen), the positions of the target images in the taken image change by the rotation angle of the controller 7 around the indicated direction as an axis. For this reason, the indicated position cannot be accurately calculated based on the positions of the target images.

In order to avoid this, in step S18, the coordinate set of the intermediate point calculated in step S17 is corrected based on the direction calculated in step S16. Specifically, the coordinate set of the intermediate point calculated in step S17 is corrected into the coordinate set obtained in the case where the controller 7 is in the reference state. More specifically, the coordinate set of the intermediate point calculated in step S17 is moved on an arc around the center of the taken image as an axis by an amount corresponding to an angular difference between the direction calculated in step S16 and the direction in the reference state. In state B in FIG. 15, a vector inclined at 90° counterclockwise from the reference state is calculated in step S16. Therefore, it is understood that the controller 7 is inclined at 90° clockwise from the reference state. Accordingly, in step S18, the coordinate set of the intermediate point calculated in step S17 is moved on an arc at 90° clockwise around the center of the taken image as an axis. Data representing the coordinate set of the intermediate point corrected as above in step S18 is stored on the main memory 13 as the updated intermediate point data 58. Based on the corrected coordinate set of the intermediate point obtained in step S18, the game apparatus 3 can calculate the indicated position by the controller 7.

Next in step S19, a length of a distance between the first coordinate set and the second coordinate set is calculated. Specifically, the CPU 10 refers to the current first coordinate set data 51 and the current second coordinate set data 52 to calculate the length. Data on the calculated length is stored on the main memory 13 as the length data 59. The length corresponds to the distance from the controller 7 to the markers 8*a* and 9*b*. After step S19, the CPU 10 terminates the operation state calculation processing.

Figure 16:
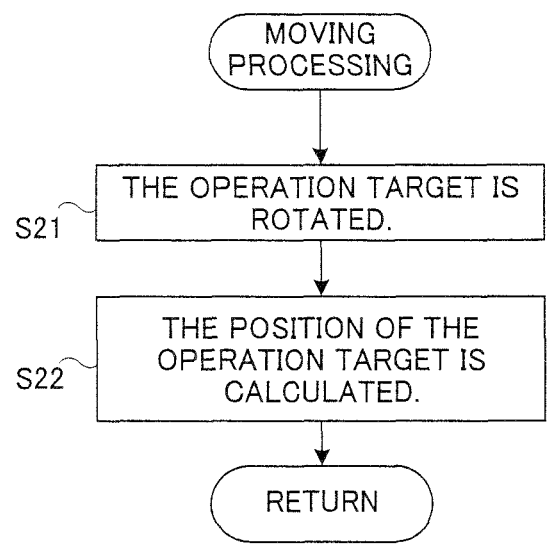
FIG. 16 is a flowchart illustrating a detailed flow of moving processing (S3) shown in FIG. 12.

Returning to FIG. 12, in step S3, the moving processing of moving the operation target is executed. With reference to FIG. 16, the moving processing will be described in detail.

FIG. 16 is a flowchart illustrating a detailed flow of the moving processing (S3) shown in FIG. 12. The moving processing is executed as follows. First in step S21, the operation target is rotated in the direction calculated in step S16. As described above, the operation target may be an object appearing in the virtual game space or a virtual camera. Hereinafter, variations of the rotation motion of the operation target will be described with reference to FIG. 17A through FIG. 18B.

Figure 17A:
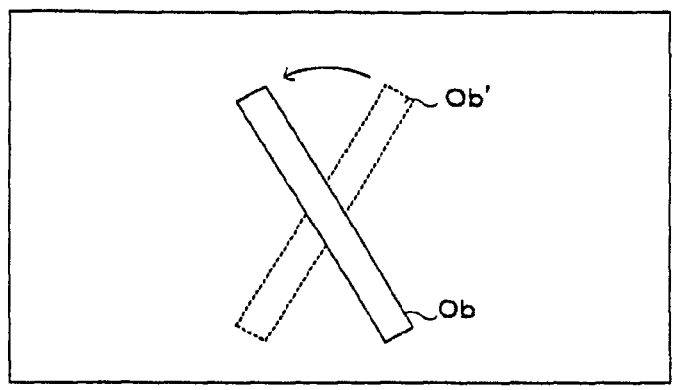
FIG. 17A, FIG. 17B and FIG. 17C show examples of a rotation motion of an operation target.
Figure 17B:
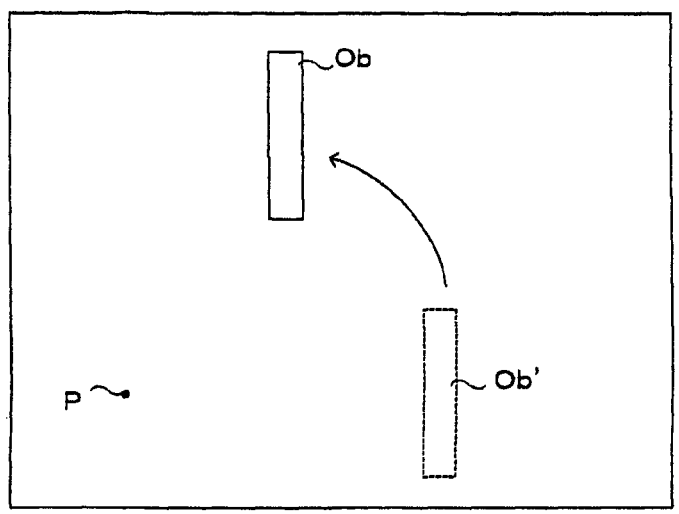
Figure 17C:
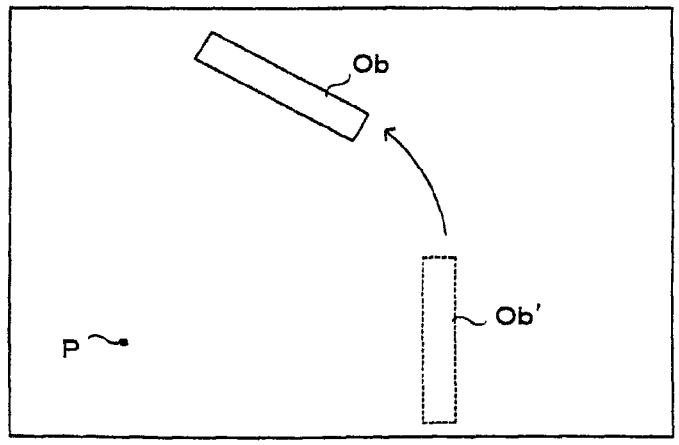
Figure 18A:
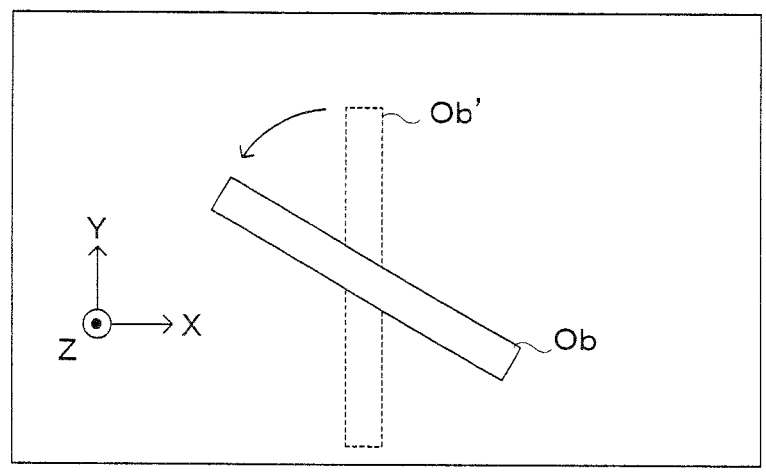
FIG. 18A and FIG. 18B show examples of a rotation motion of an operation target.
Figure 18B:
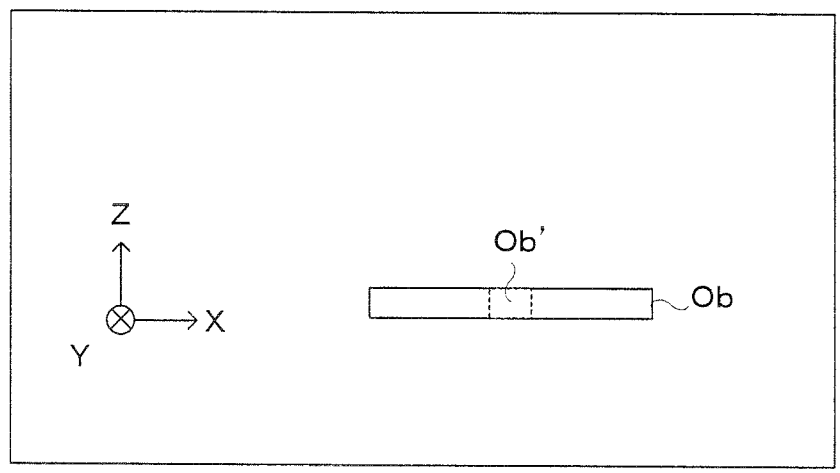

FIG. 17A through FIG. 18B show examples of the rotation motion of the operation target. In FIG. 17A through FIG. 18B, the operation target is an object appearing in the game space. A pre-rotation object Ob' is indicated with the dashed line, and a post-rotation object Ob is indicated with the solid line. The rotation motion of the operation target performed in step S21 may be for changing the position of the operation target on the display screen or in the game space, for changing the posture of the operation target, or for changing both the position and the posture of the operation target. Namely, the rotation motion of the operation target may be, as shown in FIG. 17A, a motion of changing the posture of the operation target without changing the position thereof; as shown in FIG. 17B, a motion of moving the operation target on an arc around a predetermined position P as an axis without changing the posture (direction) thereof; or as shown in FIG. 17C, a motion of moving the operation target on an arc around the predetermined point P as an axis while rotating the operation target, so that both the position and the posture of the operation target are changed. In the case where the operation target is located in the virtual three-dimensional game space, the operation target does not especially need to rotate around an axis vertical to the display screen. FIG. 18A shows the object rotating in the virtual three-dimensional game space. In the case where the object rotates as shown in FIG. 18A, the game space seen from a direction parallel to the Y axis is displayed on the display screen as shown in FIG. 18B. The processing of rotating the object may be processing of rotating the object on the display screen or processing of rotating the object in the game space. In the latter case, the rotation of the object is not easily seen on the display screen.

In step S21, specifically, a posture and/or a position of the operation target is determined in accordance with the direction of the vector represented by the direction data 57 stored on the memory 13 in step S16. More specifically, the determination may be performed as follows. The correspondence between the direction of the vector and the posture and/or the position of the operation target when the vector is inclined in the respective direction is determined in advance. Based on the correspondence, the posture and/or the position of the operation target is determined from the vector. Alternatively, the determination may be performed as follows. An angle made by the vector in the previous frame and the vector in the current frame (angular difference) is calculated, and a changing amount of the posture and/or the position of the operation target is determined based on the angular difference. For example, the operation target may be rotated at an angle in proportion to the angular difference. Data representing the angular difference corresponds to the direction processing data 61 in the operation processing data 60. When the posture and/or the position of the operation target is determined as described above, the contents of the operation target data 64 stored on the main memory 13 are updated. Namely, data representing the posture determined in step S21 is stored on the main memory 13 as the posture data 65, and data representing the position determined in step S21 is stored on the main memory 13 as the position data 66.

In other embodiments, the processing may be set such that in the case where the direction of the vector calculated in step S16 is in a predetermined range of angles, the operation target is not rotated. The reason is that when the operation target rotates as a result of responding too sensitively to the rotation angle of the input device, the operability of the input device may be deteriorated. Depending on the type of, or the situation in, the game, the player may wish to maintain the operation target at a certain posture. If, in such a case, the operation target rotates as a result of responding too sensitively to the rotation angle of the input device, it becomes difficult to maintain the operation target at a certain posture and the operability of the input device is deteriorated. For example, the processing may be set such that the operation target is not rotated when the angle made by the vector and the y axis is in the range of −5° to 5°. Owing to such an arrangement, even if the controller 7 is rotated slightly, the same operation result as in the case where the controller 7 is maintained in a horizontal state is obtained. As described above, the operability of the input device can be improved by setting a so-called "play" margin in the rotation operation performed on the controller 7.

Next in step S22, the operation target is translated. Namely, a post-movement position of the operation target is calculated. When the post-movement position of the operation target is determined in step S21 (when the rotation motion shown in FIG. 17B or FIG. 17C is performed), the processing in step S22 is omitted. When only the posture of the operation target is determined in step S21 (when the rotation motion shown in FIG. 17A is performed), the processing in step S22 is executed.

The translation motion of the operation target in step S22 is determined based on at least one of (i) the coordinate set of the intermediate point corrected in step S18 and (ii) the length of the distance calculated in step S19. Typically, the position of the operation target on the display screen (the position in the game space corresponding to the position on the display screen) is determined based on the coordinate set of the intermediate point corrected in step S18. Based on the distance calculated in step S19, the position of the operation target in the depth direction with respect to the display screen is determined.

The position of the operation target on the display screen is calculated using a function of converting the coordinate set of the intermediate point into a coordinate set on the display screen of the monitor 2. This function converts the coordinate set values of the intermediate point which are calculated from one taken image into coordinate set values corresponding to the position on the display screen which is indicated by the controller 7 (indicated position) when such a taken image is taken. This is performed, for example, as follows. Predetermined reference values are set for both the coordinate set of the intermediate point and the indicated position on the display screen. A displacement of the coordinate set of the intermediate point from the reference values is calculated, and the positive/negative sign of the displacement is inverted and scaled at a predetermined ratio. Thus, a displacement of the current indicated position from the references value is calculated, and the current indicated position is set. This function allows the indicated position on the display screen to be calculated from the coordinate set of the intermediate point. Data representing the indicated position corresponds to the indicated coordinate set data 62 in the operation processing data 60. For converting the coordinate set of the intermediate point into a coordinate set representing the position in the game space (a corresponding coordinate set described later), the indicated position is further converted into the position in the game space corresponding to the indicated position. The "position in the game space corresponding to the indicated position" is a position, in the game space, which is displayed at the indicated position on the display screen.

The position of the operation target in the depth direction with respect to the display screen is calculated based on the length calculated in step S19. Specifically, this is performed as follows. The correspondence between a predetermined position in the depth direction and a predetermined length is determined in advance. The position of the operation target is determined based on the difference between the length calculated in step S19 and the predetermined length. More specifically, the position of the operation target is determined such that as the difference obtained by subtracting the predetermined length from the length calculated in step S19 becomes greater, the position of the operation target becomes deeper. In the case where the difference is a negative value, the position of the operation target is determined to be forward with respect to the predetermined position (i.e., closer to the player in front of the display screen of the monitor 2). Alternatively, the position of the operation target in the depth direction may be determined based on the distance from the imaging means of the controller 7 (the imaging information calculation section 35) to the imaging target (the markers 8a and 8b) (see FIG. 26 described later). Such a distance is calculated from the length calculated in step S19. Data representing such a distance corresponds to the distance data 63 in the operation processing data 60.

Data representing the position of the operation target determined in step S22 is stored on the main memory 13 as the position data 66. In step S22, it is not absolutely necessary to determine both the position of the operation target on the display screen and the position thereof in the depth direction. Either one of the positions may be determined. For example, in the case where the game space is a two-dimensional plane, only the position of the operation target on the display screen may be determined based on the coordinate set of the intermediate point corrected in step S18. After steps S21 and S22, the CPU 10 terminates the moving processing.

In the moving processing in this embodiment, the movement of the operation target is controlled such that the operation target is always moved to the indicated position by the controller 7. In other embodiments, the movement processing may be executed such that when a predetermined operation is performed on the controller 7 (for example, the B button 32*d* is pressed), the operation target is moved to the indicated position by the controller 7 obtained at the time when such an operation is performed. In the case where the operation of moving the operation target and the operation of rotating the operation target are simultaneously performed as in the above embodiment, the player may inadvertently rotate the controller 7 when intending to move the operation target, resulting in rotating the operation target despite his/her intention. In the case where the processing is set such that the operation target is moved only when necessary, the difficulty in simultaneously moving and rotating the operation target can be alleviated.

Returning to FIG. 12, in step S4 after step S3, display processing is executed. The CPU 10 refers to the operation target data 64 stored on the main memory 13 to generate an image in accordance with the posture and the position determined in step S3. The CPU 10 displays the generated image on the display screen of the monitor 2. For example, when the operation target is an object displayed on the display screen, the object is displayed on the display screen with the posture and the position determined in step S3. For example, in the case where the operation target is a virtual camera, an image of the game space seen from the virtual camera which is set at the posture and the position determined in step S3 is generated, and the generated image is displayed. By repeating the processing in step S4 frame by frame, a moving picture representing the operation target rotating can be displayed.

In step S5, it is determined whether or not to terminate the game. The game is terminated when, for example, a condition for terminating the game (for example, the parameter indicating the stamina of the player character becomes zero) or the player has performed an operation of terminating the game. When it is determined not to terminate the game, the processing is returned to step S1 and the processing in steps S1 through S5 is repeated until it is determined to terminate the game in step S5. When it is determined to terminate the game, the CPU 10 terminates the game processing shown in FIG. 12.

As described above, in this embodiment, a value corresponding to the posture of the controller 7 rotating around the front-rear direction thereof as an axis can be calculated from the taken image obtained by the imaging information calculation section 35. Based on the posture of the controller 7, the operation target can be rotated. With such settings, the player can perform a game operation of rotating the controller 7 around the front-rear direction thereof as an axis so as to cause the operation target to rotate in accordance with the rotation of the controller 7. Thus, the game apparatus 3 can allow the player to perform a new game operation of rotating the operation target by rotating the controller 7.

According to a non-limiting illustrative embodiment, the game apparatus 3 only needs to calculate the rotation of the controller 7 around the indicated direction as an axis. The game apparatus 3 does not need to detect the indicated position by the controller 7 or the distance between the controller 7 and the imaging target (the markers 8*a* and 8*b*). In order to calculate the rotation of the controller 7 around the indicated direction thereof as an axis, the game apparatus 3 only needs to obtain information representing at least the direction from the taken image. Therefore, the image processing circuit 41 may output the information representing the direction, instead of the coordinate sets of the above-mentioned two positions. Specifically, the image processing circuit 41 may calculate data on a vector representing the direction from the position of the image of the marker 8*a* to the position of the image of the marker 8*b* (or the direction from the position of the image of the marker 8*b* to the position of the image of the marker 8*a*). Since this vector only needs to represent the direction, the image processing circuit 41 may output data on a unit vector having a constant size.

The indicated position by the controller 7 can be detected by calculating the position of the target image in the taken image. The position of the target image in the taken image can be represented with the position of the coordinate set of the intermediate point as described in the above embodiment. Accordingly, in the case where the indicated position by the controller 7 is used for moving the operation target, the image processing circuit 41 may output data representing the position of the target image in the taken image and data representing the direction. Namely, the image processing circuit 41 may output the data on the vector representing the direction from the position of the image of the marker 8*a* to the position of the image of the marker 8*b* (or the direction from the position of the image of the marker 8*b* to the position of the image of the marker 8*a*) and the data on the coordinate set of the intermediate point, instead of outputting the data on the coordinate sets representing the positions of the images of the markers 8*a* and 8*b*. In this case, the game apparatus 3 does not need to calculate the direction data or the intermediate point data (steps S16 and S17), the processing load of the game apparatus 3 can be alleviated. The correction processing in step S18 may be executed by the image processing circuit 41 or by the game apparatus 3.

In other embodiments, the imaging information calculation section 35 may not include the image processing circuit 41. In this case, the imaging information calculation section 35 outputs the image data of the taken image to the microcomputer 42, and the image data is transmitted from the controller 7 to the game apparatus 3 as the operation data. The game apparatus 3 calculates the direction data based on the image data. As described above, the processing of calculating the direction data from the image data of the taken image may be partially executed by a dedicated circuit (the image processing circuit 41), entirely executed by such a circuit, or executed by the game apparatus 3 as software processing.

In the above embodiment, the two markers 8*a* and 8*b* for outputting infrared light are the imaging targets. Some other elements may be the imaging targets. An imaging target may be anything, an image of which can provide a direction. For example, three or more markers may be imaging targets, or one marker which can provide a direction can be an imaging target. In the case where one marker is the imaging target, it is desirable that the marker has a linear shape or the like, from which two predetermined points can be specified. The reason is that it is necessary to detect the direction from the marker. A circular shape is not desirable. The game apparatus 3 calculates the direction connecting the predetermined two points of the taken image to calculate the direction of the target image in the taken image. The marker is preferably a light emitting element. The marker may output light of other wavelengths than infrared, or may output white light. The frame of the display screen of the monitor 2 may be an imaging target, or the imaging target may be displayed on the display screen. With such a structure, it is not necessary to prepare a marker in addition to the monitor, and the structure of the system can be simplified.

In other embodiments, when the controller 7 goes outside the operable range, the operation target may be rotated using an output from the acceleration sensor. Specifically, when the determination result in step S11 in FIG. 13 is negative, processing of detecting the rotation state of the controller 7 around the indicated direction as an axis is executed using the output from the acceleration sensor, instead of the processing in step S12. The CPU 10 refers to data representing the acceleration included in the operation data to determine the rotation state of the controller 7. In the moving processing in step S3, the operation target is rotated in accordance with the rotation state determined by the above processing. Thus, even if the controller 7 goes outside the operable range, the operation of rotating the operation target can be continued. In the case where the controller 7 goes outside the operable range and then returns to the operable range with the posture thereof being changed, the posture of the controller 7 can be determined using an output from the acceleration. Therefore, the two markers can be each identified.

Now, it is assumed in the above embodiment that the controller 7 goes outside the operable range and then returns to the operable range. In this case, it cannot be determined only from the taken image whether the controller 7 has returned to the operable range in an upward state (with the top surface thereof directed upward) or in a downward state (with the top surface thereof directed downward). The position of the target image in the taken image is different between the upward state and the downward state. Therefore, when the controller 7 returns to the operable range in the downward state, the indicated position cannot be accurately calculated based on the position of the target image.

Therefore, in other embodiments, when the controller 7 returns to the operable range after once going outside, the game apparatus 3 may determine whether or not the controller 7 is in the downward state using the detection result of the acceleration sensor 37. When it is determined that the controller 7 is in the downward state, the correction processing in step S18 is executed. This will be described with reference to the flowchart in FIG. 13. When the determination result of step S13 is negative, the CPU 10 refers to the acceleration data included in the operation data to determine whether or not the controller 7 is in the downward state. When it is determined that the controller 7 is in the downward state, the correction processing in step S18 is executed as follows. The coordinate set of the intermediate point is moved on an arc at an angle obtained by adding 180° to the angular difference between the direction calculated in step S16 and the direction in the reference state. This processing is continued until the next time that the controller 7 goes outside the operable range. Thus, even if the controller 7 returns to the operable range in the downward state, the indicated position by the controller 7 can be accurately calculated.

The above embodiment is applicable to various games in which the controller 7 is rotated around the indicated direction as an axis. Hereinafter, specific games will be described as non-limiting examples.

First Example

Figure 19:
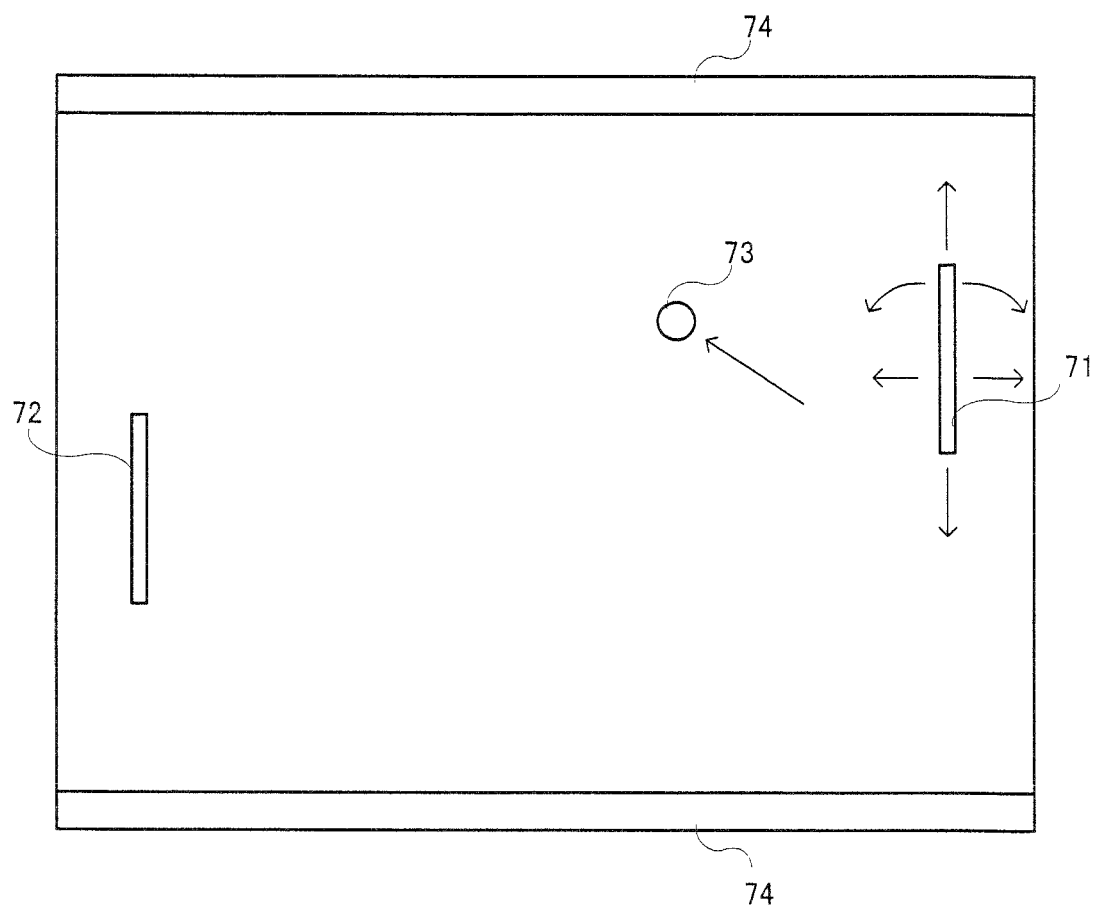
FIG. 19 shows an example of a game screen in a first example.

FIG. 19 shows an example of a game screen in a first example. In FIG. 19, plate-like objects 71 and 72, a ball object 73, and wall objects 74 are located in a two-dimensional game space. The plate-like object 71 is an operation target to be operated by the player. The plate-like object 71 is movable up, down, left and right on the display screen and rotatable by an operation of the player (as indicated by the arrows in FIG. 19). The plate-like object 72 is controlled by the CPU 10 of the game apparatus 3 and is movable up, down, left and right on the display screen and rotatable like the plate-like object 71. Hereinafter, the plate-like object 71 to be operated by the player will be referred to as a "player object", and the plate-like object 72 to be controlled by the CPU 10 will be referred to as an "opponent object". The ball object 73 (hereinafter, also referred to simply as a "ball") moves in the two-dimensional game space on the display screen. The ball 73 linearly moves in the game space, and when colliding against the player object 71, the opponent object 72, or the wall objects 74, bounces back and continues moving. The wall objects 74 are fixedly located at the top and bottom of the display screen. In the game in the first example, two parties fight against each other. More specifically, the game in the first example is a hockey game in which the player operates the player object 71 to hit the ball object 73 with the opponent object 72. The player operates the player object 71 so as to put the ball 73 into the opponent's side (the left end of the display screen, i.e., left to the opponent object 72) while hitting the ball 73 back such that the ball 73 does not reach the player's side (the right end of the display screen, i.e., right to the player object 71).

Next, a method for operating the player object 71 using the controller 7 will be described. The player object 71 moves (translates) up, down, left or right in accordance with a position designation operation performed by the controller 7. The "position designation operation" is an operation of designating the indicated position. Specifically, the position or the direction of the controller 7 is changed to change the position at which the phantom straight line extending from the front end of the controller 7 in the longitudinal direction crosses the display screen of the monitor 2. The indicated position is determined in accordance with the position or the direction of the controller 7. The player can move the indicated position up, down, left or right on the display screen to move the player object 71 up, down, left or right on the display screen. Specifically, the game apparatus 3 controls the operation of the player object 71 to be located at the indicated position.

Figure 20:
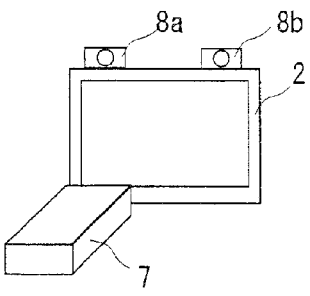
FIG. 20 illustrates an operation of a player object 71 by a rotation operation.
Figure 20:
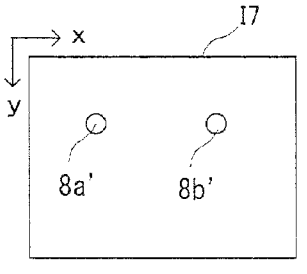
Figure 20:
Figure 20:
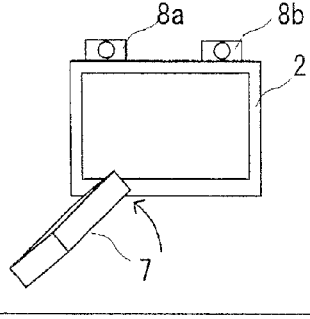
Figure 20:
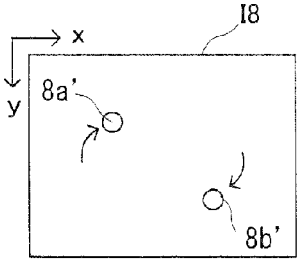
Figure 20:
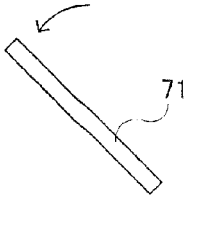
Figure 20:
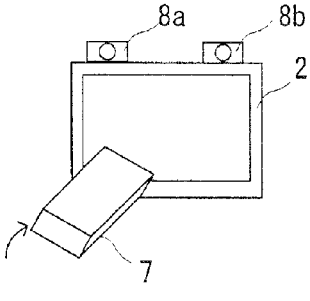
Figure 20:
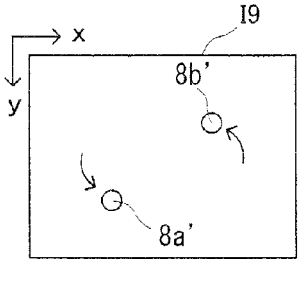
Figure 20:
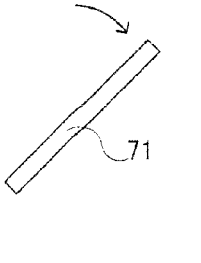

The player object 71 rotates around the center thereof in accordance with a rotation operation. The "rotation operation" is an operation of rotating the controller 7 around the indicated direction as an axis. FIG. 20 illustrates the operation of the player object 71 provided by the rotation operation. FIG. 20 shows the correspondence among the state of the controller 7, the taken image obtained when the controller 7 is in the respective state, and the posture of the player object 71 when the controller 7 is in the respective state.

In FIG. 20, in state A, the top surface of the controller 7 is directed upward. In a taken image I7 obtained in state A, the images 8a' and 8b' of the markers 8a and 8b are located horizontally (the y-axis coordinates of the images 8a' and 8b' are the same). In this state, the player object 71 assumes a posture horizontal to the up-down direction of the display screen of the monitor 2. In this example, this state will be referred to as a "reference state".

In state B shown in FIG. 20, the controller 7 has been rotated counterclockwise at a predetermined angle from state A. In a taken image I8 obtained in state B, the images 8a' and 8b' have been moved on an arc clockwise at the predetermined angle from state A. In this state, the player object 71 assumes a posture rotated counterclockwise at the predetermined angle from the up-down direction of the display screen. In state C shown in FIG. 20, the controller 7 has been rotated clockwise at a predetermined angle from state A. In a taken image I9 obtained in state C, the images 8a' and 8b' have been moved on an arc counterclockwise at the predetermined angle from state A. In this state, the player object 71 assumes a posture rotated clockwise at the predetermined angle from the up-down direction of the display screen. As described above, the game apparatus 3 controls the posture of the player object 71 to rotate in the direction in which the controller 7 has been rotated from the reference state at the same angle as the controller 7.

Next, the game processing in the first example will be described in detail. In the first example, the length data 59 in the operation state data 56 shown in FIG. 11 is not necessary for the game processing and is not stored on the main memory 13. The direction processing data 61 and the distance data 63 in the operation processing data 60 are not necessary for the game processing and are not stored on the main memory 13. The operation target data 64 shown in FIG. 11 represents a position and a posture of the player object 71 as the operation target. Namely, the posture data 65 represents a posture of the player object 71. Specifically, the posture data 65 represents a vector indicating a direction of the player object 71 on the display screen. This vector is represented with a coordinate system in which the upper left corner of the display screen is the origin, the downward direction from the origin is a positive y'-axis direction, and the rightward direction from the origin is a positive x'-axis direction (x'-y' coordinate system). In this example, the vector represented by the posture data 65 indicates a direction vertical to the longitudinal direction of the rectangular player object 71. The position data 66 represents a position of the player object 71 on the display screen. A coordinate set representing the position is in the x'-y' coordinate system. In this example, the position represented by the position data 66 indicates the central position of the player object 71.

In the first example, the data shown in FIG. 11, image data of the objects, data representing the position and the posture of the opponent object 72, data representing the position and the velocity of the ball object 73, and the like are stored on the main memory 13.

Figure 21:
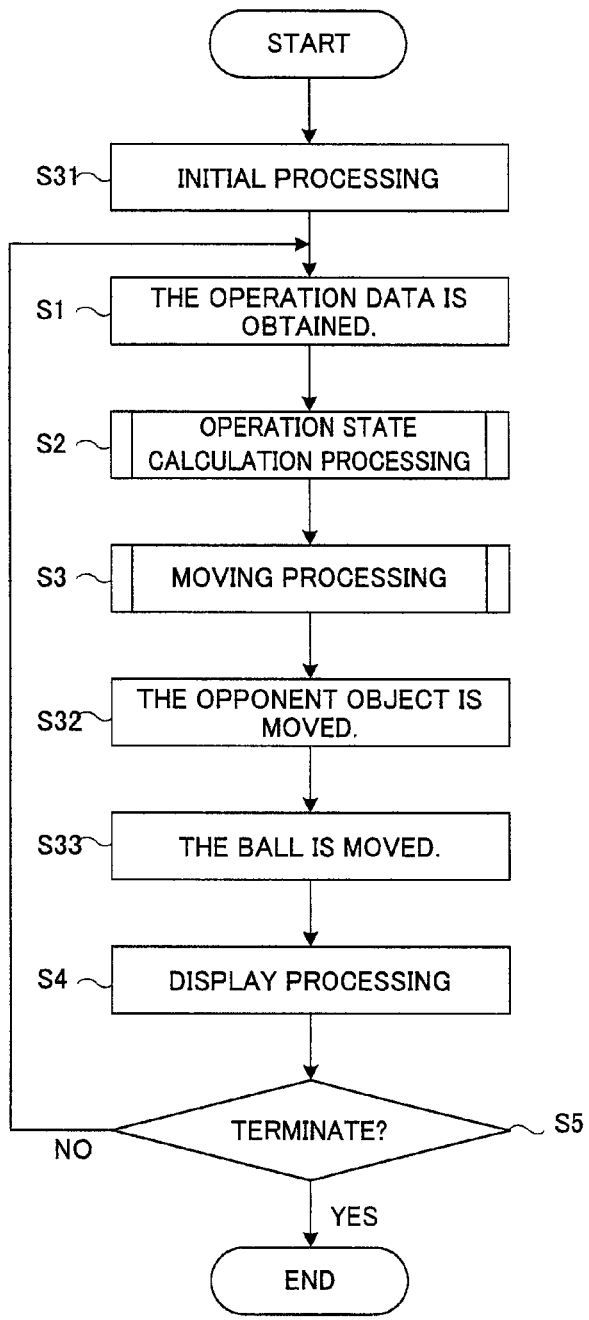
FIG. 21 is a flowchart illustrating a flow of game processing in the first example.

FIG. 21 is a flowchart illustrating a flow of the game processing in the first example. In FIG. 21, substantially the same steps as those in the game processing shown in FIG. 12 bear the same step numbers, and detailed descriptions thereof will be omitted. The processing until the processing in the flowchart shown in FIG. 21 is started is the same as in the case of FIG. 12.

The game processing in the first example is executed as follows. First in step S31, initial processing is executed. In the initial processing, the CPU 10 displays a game screen in an initial state. Namely, the objects 71 through 74 are located at respective initial positions. Regarding the operation target data 64, data representing the posture of the player object 71 in the initial state is stored on the main memory 13 as the posture data 65, and data representing the position of the player object 71 in the initial state is stored on the main memory 13 as the position data 66. The CPU 10 displays the game screen in which the objects 71 through 74 are at the respective initial positions on the monitor 2.

After step S31, the processing in step S1 described above is executed, and then the operation state calculation processing in step S2 is executed. In the operation state calculation processing in the first example, the processing of calculating the distance between the two coordinate sets (step S19) is not executed. The operation state calculation processing in the first example is substantially the same as described above with reference to FIG. 12 except for step S19.

Next, the moving processing in step S3 is executed. As described above with reference to FIG. 16, the processing of rotating the player object 71 (step S21) in the direction calculated in accordance with the rotation of the controller 7 around the indicated direction as an axis (around the direction calculated in step S16) is executed. Hereinafter, specific processing in step S21 in the first example will be described.

In step S21 in the first example, the vector representing the direction in the taken image (the direction in the x-y coordinate system) is converted into a vector representing a direction on the display screen (the direction in the x'-y' coordinate system). The "vector representing the direction in the taken image" is the vector calculated in step S16, which is represented by the direction data 57. By converting the vector into the vector representing the direction on the display screen, the vector representing the direction of the player object 71 is calculated. Specifically, in step S21, the direction of the vector represented by the direction data 57 stored on the main memory 13 is inverted regarding the x axis or the y axis. For example, where the vector represented by the direction data 57 is (vx1, vy1), the CPU 10 calculates the post-conversion vector as (−vx1, vy1). Thus, the vector is inverted regarding the y axis, i.e., converted into the vector representing the direction in the x'-y coordinate system. The CPU 10 stores data representing the post-conversion vector on the main memory 13 as the updated posture data 65.

Next in step S22, the player object 71 is translated. Namely, a position of the player object 71 on the display screen is calculated. Specifically, like in step S22 described above, the CPU 10 calculates a coordinate set (indicated coordinate set), in the x'-y' coordinate system, which represents the indicated position on the display screen, from the coordinate set representing the intermediate point in the x-y coordinate system. Data on the calculated indicated coordinate set is stored on the main memory 13 as the indicated coordinate set data 62. Next, the calculated indicated coordinate set is determined as the position of the player object 71. In the case where the indicated coordinate set is outside a movable range of the player object 71 which is set in the game (for example, the area interposed between the wall objects 74) or the like, the position of the player object 71 is set at a different position from the indicated coordinate set, for example, in the vicinity of the boundary of the movable range. Data on the coordinate set representing the position of the player object 71 on the display screen (indicated coordinate set) determined in step S22 is stored on the memory 13 as the position data 66.

In step S32 after step S3, the opponent object 72 is moved. The CPU 10 determines a position and a posture of the opponent 72 after the movement in accordance with a predetermined algorithm. Next in step S33, the ball 73 is moved. The CPU 10 determines whether or not the ball 73 has collided against the player object 71, the opponent object 72, or the wall objects 74. When the ball 73 has collided, a post-collision moving direction of the ball 73 is determined based on the pre-collision moving direction of the ball 73 and an angle made by the ball and the object against which the ball 73 has collided. When ball 73 did not collide, the moving direction of the ball 73 is maintained. The velocity of the ball 73 may be changed in accordance with the moving velocity or the rotating velocity of the player object 71 or the opponent object 72 at the time of collision.

Next in step S4, the display processing is executed. Namely, the objects 71 through 73 are displayed on the display screen with the new positions and postures determined in steps S3 through S5. By repeating the processing in step S4 frame by frame, the objects 71 through 73 are displayed as moving. Next in step S5, it is determined whether or not to terminate the game. In the first example, this determination is performed based on, for example, the number of times that the ball 73 reached the player's side or the opponent's side.

In the first example described above, the game can be enjoyed with a new game operation of moving or rotating the controller 7 to move or rotate the player object 71.

In the first example, one controller 7 is used to operate only the player object 71. Two controllers 7 may be used to operate two objects (for example, the objects 71 and 72 shown in FIG. 19). In this case, two players can operate the respective objects, each using one controller 7, and fight against each other.

Second Example

Figure 22:
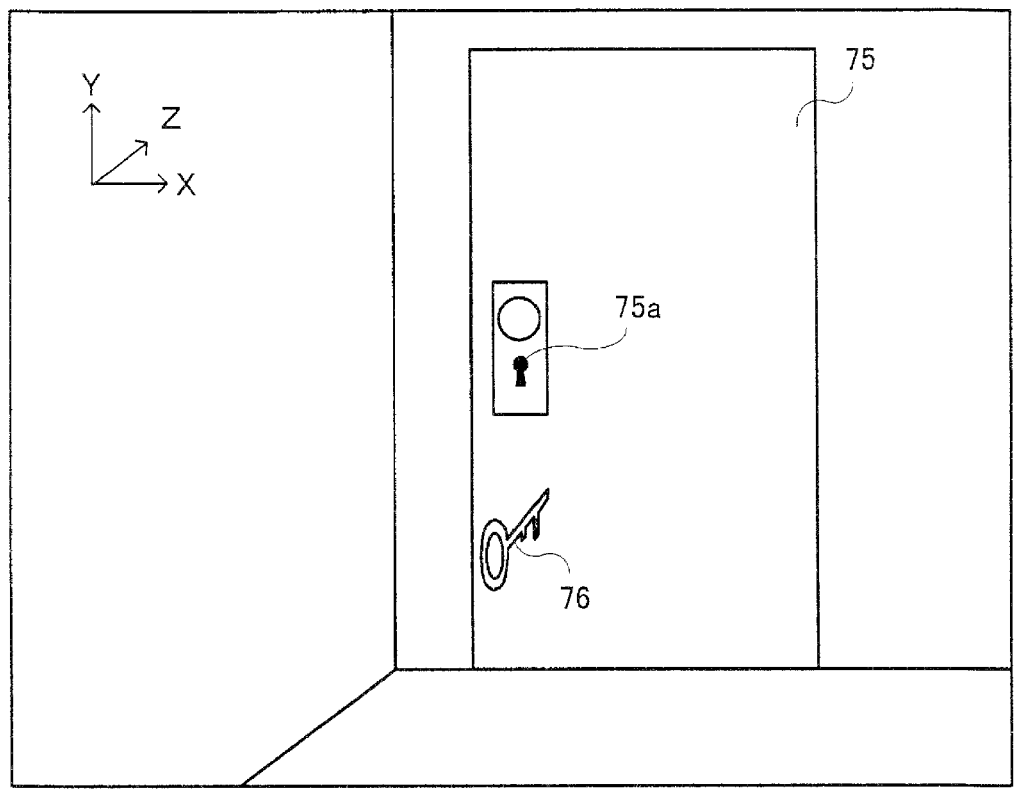
FIG. 22 shows an example of a game screen in a second example.

FIG. 22 shows an example of a game screen in a second example. FIG. 22 shows a game scene in which the player can open the door using a key. In FIG. 22, a three-dimensional game space is constructed, and a door 75 and a key 76 are located in the game space. The door 75 has a key hole 75a. The player can move or rotate the key 76 by operating the controller 7. The player performs an operation of moving the key 76 in the three-dimensional game space using the controller 7 and thus puts the key 76 into the key hole 75a. When the player performs an operation of rotating the key 76 in the state where the key 76 is in the key hole 75a, the door 75 opens. An X-Y-Z coordinate system shown in FIG. 22 is a coordinate system in a three-dimensional game space and is not actually displayed on the display screen. In this example, the Z-axis direction is the depth direction, which is parallel to the viewing direction of a virtual camera.

In the second example, the key 76 moves in the three-dimensional game space in accordance with the position designation operation and a depth designation operation performed by the controller 7. The "depth designation operation" is an operation of changing the distance from the controller 7 to the markers 8a and 8b. Specifically, the game apparatus 3 moves the key 76 in the X-axis direction and the Y-axis direction in the game space in accordance with the position designation operation. In accordance with the depth designation operation, the game apparatus 3 moves the key 76 in the Z-axis direction in the game space. The key 76 is rotated by the rotation operation performed by the player. In this example, the key 76 rotates around the Z axis in the game space.

Next, the game processing in the second example will be described in detail. In the second example, the operation target data 64 stored on the main memory 13 (see FIG. 11) represents a position and a posture of the key 76 as the operation target. Namely, the posture data 65 represents a posture of the key 76 rotating around the Z axis. The position data 66 represents a position of the key 76 in the three-dimensional game space. The position data 66 represents a three-dimensional coordinate set. In the second example, the direction processing data 61 is not necessary for the game processing and is not stored on the main memory 13.

Figure 23:
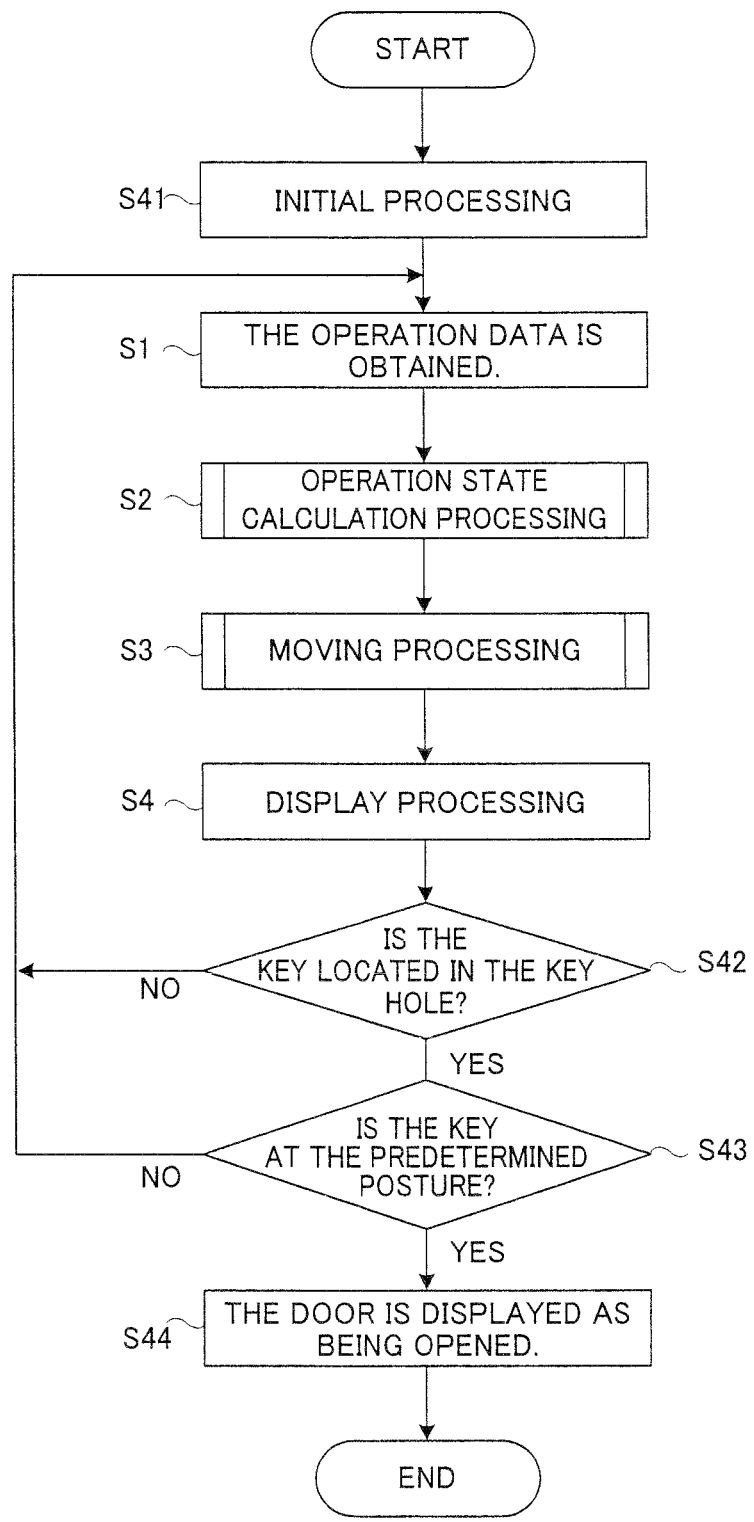
FIG. 23 is a flowchart illustrating a flow of game processing in the second example.

FIG. 23 is a flowchart illustrating a flow of the game processing in the second example. In FIG. 23, substantially the same steps as those in the game processing shown in FIG. 12 bear the same step numbers, and detailed descriptions thereof will be omitted. The processing until the processing in the flowchart shown in FIG. 23 is started is the same as in the case of FIG. 12.

The game processing in the second example is executed as follows. First in step S41, initial processing is executed. In the initial processing, the CPU 10 displays a game screen in an initial state. Namely, a three-dimensional game space is constructed, and the door 75, the key 76 and the like are located. The key 76 is located at a predetermined initial position. Regarding the operation target data 64, data representing the posture of the key 76 in the initial state is stored on the main memory 13 as the posture data 65, and data representing the position of the key 76 in the initial state is stored on the main memory 13 as the position data 66. The CPU 10 generates an image of the game space, in which the door 75 and the key 76 are located, seen from a predetermined virtual camera and displays the game screen on the monitor 2.

After step S41, the processing in step S1 described above is executed, and then the operation state calculation processing in step S2 is executed. The processing in steps S1 and S2 is the substantially same as described above with reference to FIG. 12.

Figure 24:
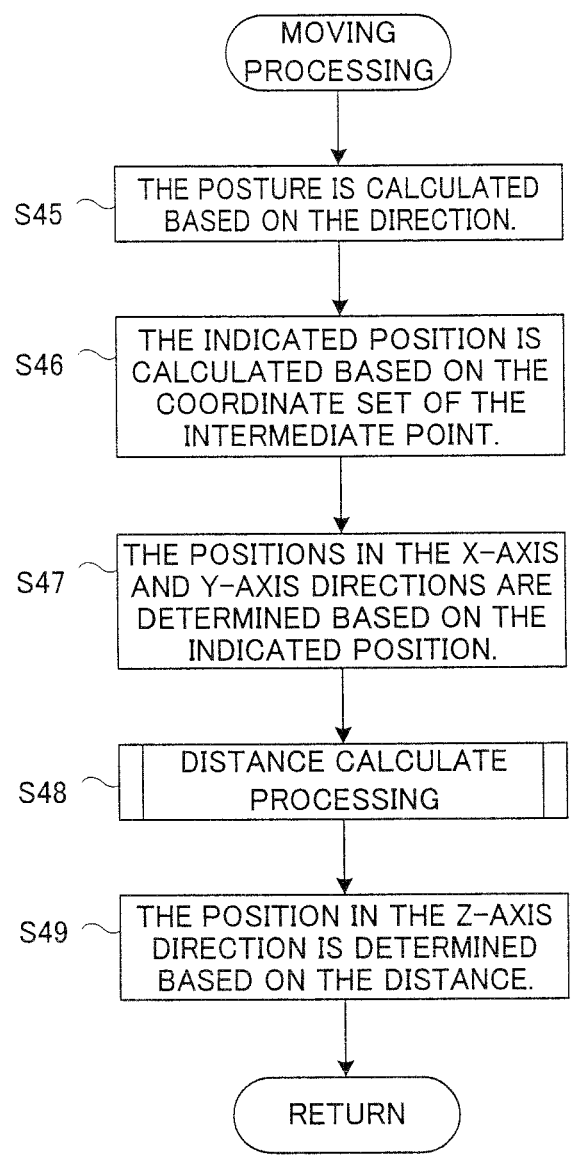
FIG. 24 is a flowchart illustrating a detailed flow of the moving processing in the second example.

Next, the moving processing in step S3 is executed. FIG. 24 is a flowchart illustrating a detailed flow of the moving processing in the second example. The moving processing in the second example is executed as follows. First in step S45, the posture of the key 76 is calculated in accordance with the direction calculated in step S16. Step S45 corresponds to step S21 described above. In the second example, the key 76 is rotated around the depth direction of the display screen as an axis (around the Z axis) in accordance with the rotation of the controller 7 around the indicated direction. Namely, the rotation direction of the controller 7 is the same as the rotation direction of the key 76 displayed on the display screen. Accordingly, the player can feel as if he/she was actually rotating the key 76 by performing an operation of rotating the controller 7.

Next in steps S46 through S49, the position of the key 76 in the game space is determined. The processing in steps S46 through S49 correspond to step S22 described above.

In step S46, the indicated position on the display screen is calculated based on the intermediate point data 58 in the operation state data 56 stored on the main memory 13. A method for calculating the indicated coordinate set is the same as described above regarding step S22. The above-described function is used. Data on the coordinate set representing the indicated position (indicated coordinate set) is stored on the main memory 13 as the indicated coordinate set data 62.

In step S47, the positions of the key 76 in the X-axis direction and the Y-axis direction in the game space are determined based on the indicated position calculated in step S46. More specifically, the position of the key 76 in the X-axis direction in the game space is determined based on the x component of the coordinate set represented by the indicated coordinate set data 62, and the position of the key 76 in the Y-axis direction in the game space is determined based on the y component of the coordinate set. Accordingly, the direction in which the controller 7 is moved is the same as the direction in which the key 76 is moved on the display screen.

In step S48, processing of calculating the distance from the imaging means to the markers 8a and 8b (distance calculation processing) based on the length calculated in step S19 is executed. Hereinafter, the distance calculation processing will be described in detail.

Figure 25:
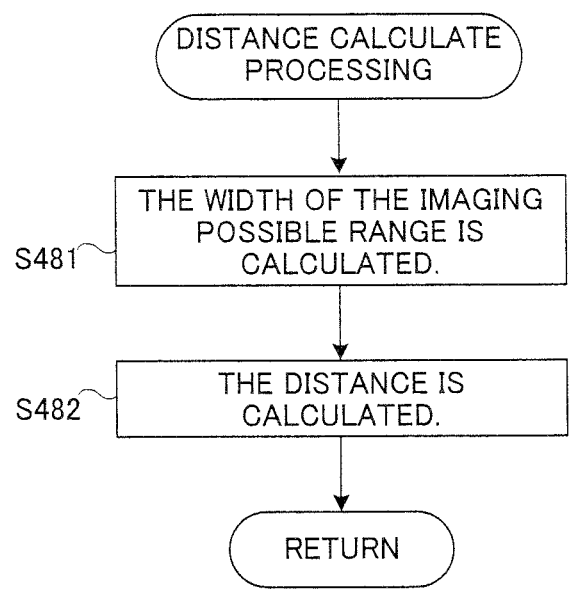
FIG. 25 is a flowchart illustrating a detailed flow of the processing in step S48 shown in FIG. 24.
Figure 26A:
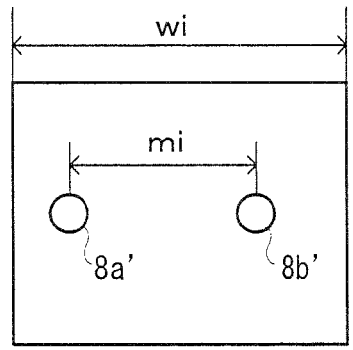
FIG. 26A and FIG. 26B show the processing in step S48 shown in FIG. 24.
Figure 26B:
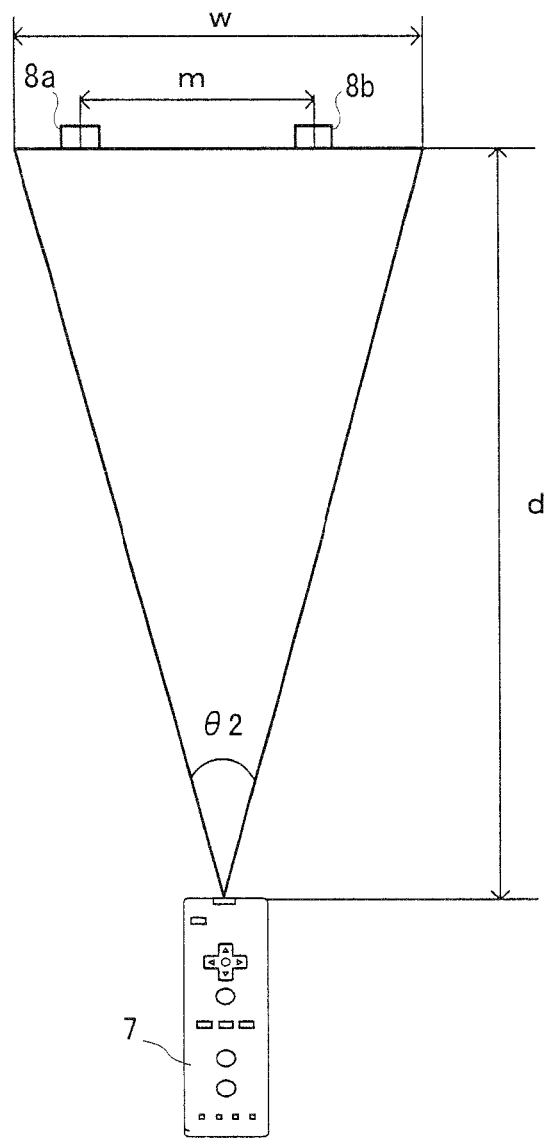

FIG. 25 is a flowchart illustrating a detailed flow of the distance calculation processing in step S48 shown in FIG. 24. FIG. 26A and FIG. 26B illustrate the processing in step S48. FIG. 26A shows an example of a taken image obtained by the controller 7, and FIG. 26B shows the positional relationship between the markers 8a and 8b and the controller 7 when the taken image is obtained. In step S19 described above, a length mi between the two points in the taken image is calculated.

The distance calculation processing is executed as follows. First in step S481, a width w (see FIG. 26B) of an imaging possible range of the imaging element 40 with respect to the positions of the markers 8a and 8b is calculated. Specifically, the CPU 10 calculates the width w from the following equation.

$$w = wi \times m/mi$$

In the above equation, m is the interval between the markers 8a and 8b (for example, 30 cm), which is a fixed value. wi is the width of the taken image obtained by the imaging element 40 which corresponds to the width w. wi is also a fixed value. The interval m and the width wi are both fixed values and therefore are stored on storage means (not shown) in the game apparatus 3 in advance. The interval m may have any value determined by the player in accordance with the environment; i.e., the player can place the markers 6a and 8b at any interval. In this case, the player may input the interval m.

Next in step S482, a distance d between the markers 8a and 8b and the imaging element 40 (the controller 7) is calculated based on the width w and the viewing angle θ2 of the imaging element 40. Specifically, the CPU 10 calculates the distance d from the following equation.

$$\tan(\theta 2/2) = (w/2)/d = w/2d$$

The viewing angle θ2 is a fixed value, and therefore is stored on storage means (not shown) in the game apparatus 3 in advance. Data on the distance d calculated by the above equation is stored on the main memory 13 as the distance data 63. After step S482, the CPU 10 terminates the distance calculation processing.

Returning to FIG. 24, in step S49, the position of the key 76 in the Z-axis direction in the game space is determined based on the distance data 63 calculated in step S48. For example, the position of the key 76 in the Z-axis direction is determined such that as the value of the distance represented by the distance data 63 is greater, the key 76 is located forward with respect to the display screen (i.e., closer to the player in front of the display screen of the monitor 2). Accordingly, with respect to the depth direction as well as the up, down, left and right directions of the display screen, the direction in which the controller 7 is moved is the same as the direction in which the key 76 is moved. With such settings, the player can feel as if he/she was actually moving the key 76 by performing an operation of moving the controller 7. Data on the position of the key 76 determined by the processing in steps S46 through S49 is stored on the main memory 13 as the position data 66. After step S49, the CPU 10 terminates the moving processing.

In the case where the position of the key 76 determined in the moving processing in step S3 is beyond the wall or the door 75, the position data 66 of the key 76 is not updated and the contents of the position data 66 before the moving processing in step S3 are maintained. Namely, in the case where the key 76 collides against the wall or the door 75, the key 76 is not moved. Unless the key 76 is in a predetermined direction around the Z axis, the key 76 does not pass through the key hole 75a.

In step S4 after step S3, the display processing is executed. Namely, the key 76 is displayed on the display screen with the new position and posture determined in step S3. By repeating the processing in step S4 frame by frame, the key 76 is displayed as moving and rotating in accordance with the movement and the rotation of the controller 7.

Next in step S42, it is determined whether or not the key 76 is located in the key hole 75a. This determination can be performed by referring to the position data 66 in the operation target data 64 stored on the main memory 13 and data representing the position of the key hole 75a (stored on the main memory 13). When it is determined in step S42 that the key 76 is located in the key hole 75a, processing in step S43 is executed. When it is determined in step S42 that the key 76 is not located in the key hole 75a, the processing returns to step S1 and the above-described processing is repeated.

In step S43, it is determined whether or not the key 76 is at a predetermined posture around the Z axis. This determination can be performed by referring to the posture data 65 in the operation target data 64 stored on the main memory 13. When it is determined in step S43 that the key 76 is at the predetermined posture, processing in step S44 is executed. When it is determined in step S43 that the key 76 is not at the predetermined posture, the processing returns to step S1 and the above-described processing is repeated.

In step S44, the door 75 is displayed as being opened on the display screen. The processing after step S44 is not directly relevant and thus will not be described in detail. After this, a player character can move beyond the door 75 or the scene beyond the door 75 is displayed on the display screen. So far, the game processing in the second example has been described.

As described above, in the second example, the direction in which the controller 7 is moved or rotated is matched to the direction in which the operation target is moved or rotated. Thus, the player can feel as if he/she was actually moving or rotating the operation target, which was not possible conventionally.

In the above example, the distance between the imaging target (the markers 8a and 8b) and the imaging means (the imaging element 40) is calculated based on the size of the image in the taken image (the total length of the two target images 8a' and 8b'). In other embodiments, in the case where the strength of the light received by the imaging means is detectable, the distance may be calculated based on the strength of the light from the markers which is received by the imaging means.

Third Example

Next, the game processing in a third example will be described. In the third example, a three-dimensional game space is constructed, and a virtual camera for generating an image of the game space is set. In the third example, the virtual camera is the operation target. In this example, processing of moving the virtual camera will be mainly described, and other game processing will be omitted.

Figure 27:
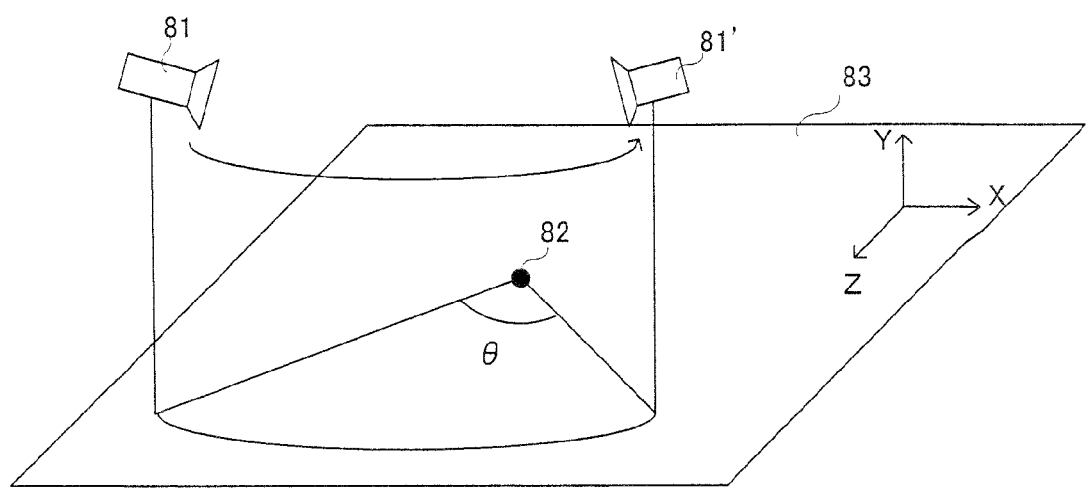
FIG. 27 shows an example of a game screen in a third example.

FIG. 27 shows an example of a game space in the third example. FIG. 27 shows a virtual camera 81, as the operation target, rotating or moving on an arc. In FIG. 27, the reference numeral 81 represents a pre-movement position and direction of the virtual camera, and reference numeral 81' represents a post-movement position and direction of the virtual camera. In FIG. 27, a coordinate system representing positions in the game space (X-Y-Z coordinate system) is set. In this coordinate system, a ground 83 is parallel to the X axis and the Z axis, and the Y axis is vertical to the ground 83. The virtual camera 81 moves on an arc around a predetermined point in the game space which is designated by the player in accordance with the rotation operation. Specifically, the virtual camera 81 moves on an arc parallel to the X-Z plane without the Y-axis coordinate thereof being changed. The direction of the virtual camera 81 is controlled such that the point of attention of the virtual camera 81 is not changed even when the virtual camera is moved on an arc. In the third example, the only motion performed by the virtual camera is to move on an arc.

Figure 28:
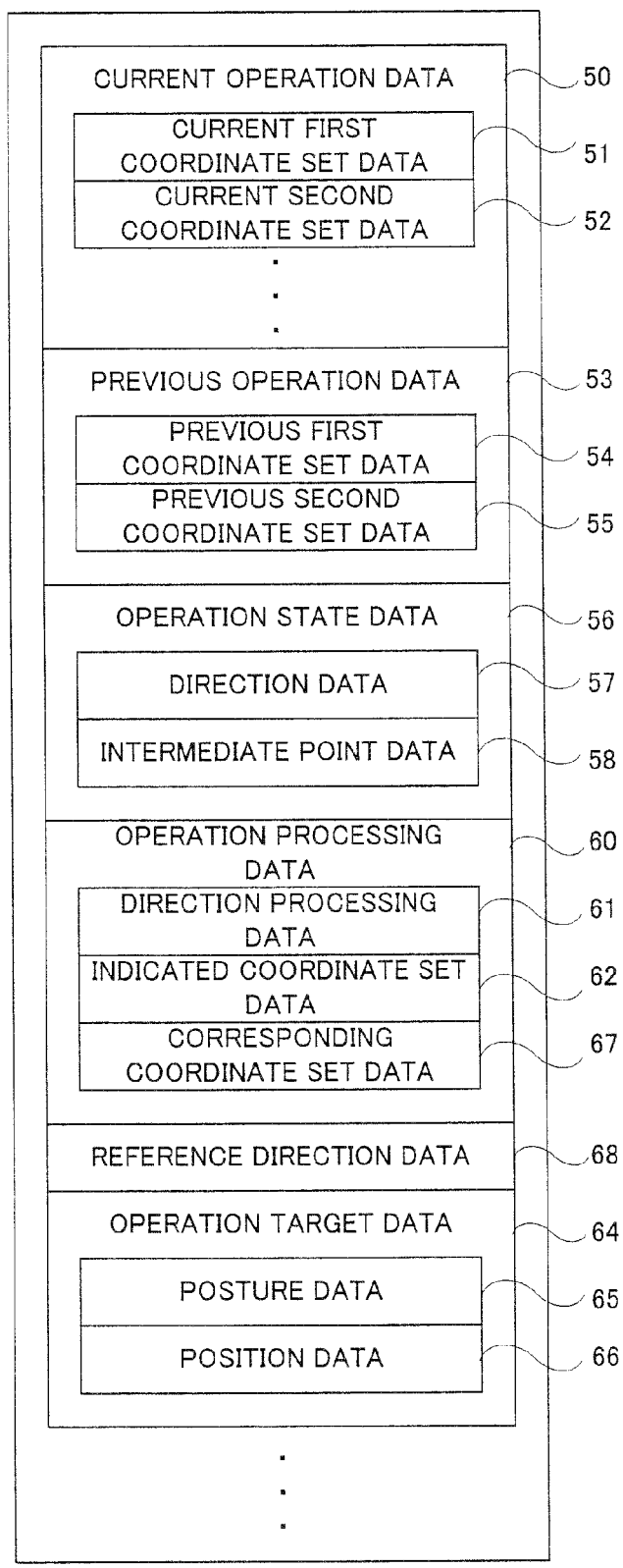
FIG. 28 shows main data stored on the main memory 13 in the third example.

Next, the game processing in the third example will be described in detail. FIG. 28 shows main data stored on the main memory 13 in the third example. The length data 59 in the operation state data 56 shown in FIG. 11 is not necessary for the game processing and is not stored on the main memory 13. The distance data 63 in the operation processing data 60 is not necessary for the game processing and is not stored on the main memory 13. The operation target data 64 shown in FIG. 11 represents a position and a posture of the virtual camera as the operation target. Namely, the posture data 65 represents a posture of the virtual camera, and the position data 66 represents a position of the virtual camera in the game space.

In the third example, corresponding coordinate set data 67 is stored on the main memory 13 in addition to the data shown in FIG. 11. The corresponding coordinate set data 67 represents a three-dimensional coordinate set indicating the position in the game space corresponding to the indicated position. In the third example, reference direction data 68 representing a reference direction is stored on the main memory 13 in addition to the data shown in FIG. 11. The "reference direction" is a direction used as the reference with respect to the direction obtained from the taken image. The reference direction is used when determining a rotation amount of the virtual camera, and the rotation amount of the virtual camera is determined based on an angular difference between the reference direction and the current direction (the direction represented by the direction data 57). In the third example, the reference direction is set by the player at the start of the game.

Figure 29:
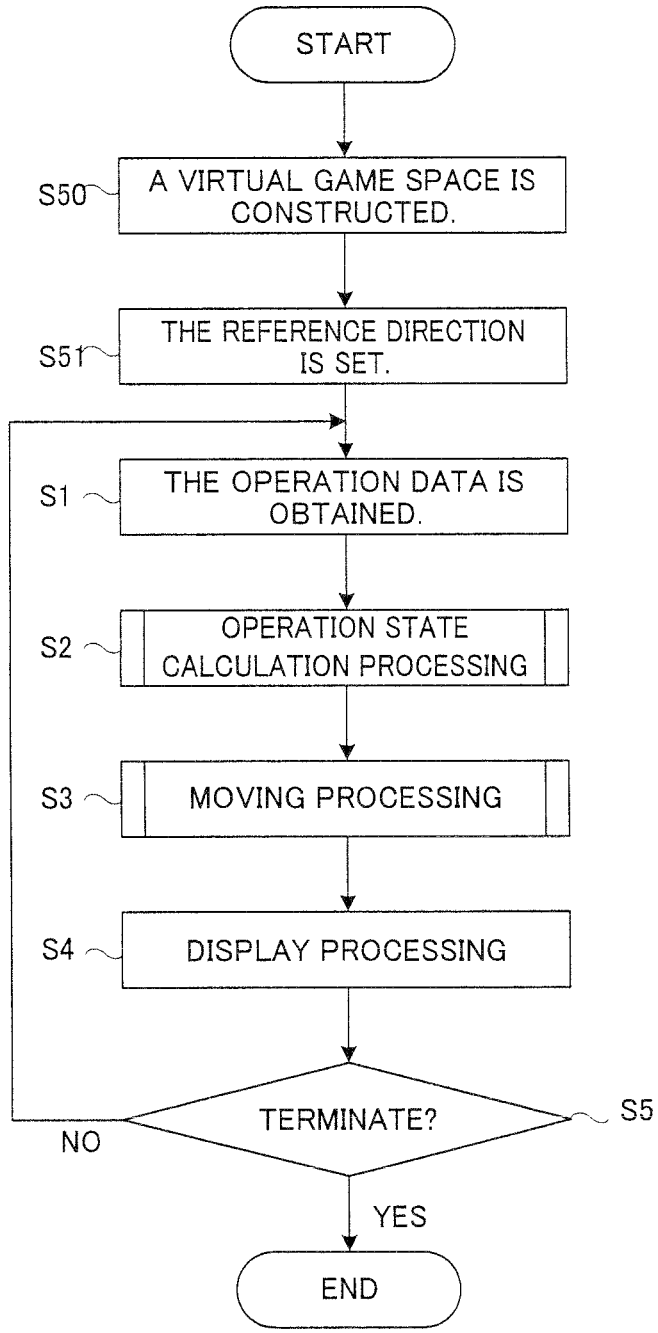
FIG. 29 is a flowchart illustrating a flow of game processing in the third example.

FIG. 29 is a flowchart illustrating a flow of the game processing in the third example. In FIG. 29, substantially the same steps as those in the game processing shown in FIG. 12 bear the same step numbers, and detailed descriptions thereof will be omitted. The processing in the flowchart shown in FIG. 29 is started is the same as in the case of FIG. 12.

The game processing in the third example is executed as follows. First in step S50, a three-dimensional game space is constructed. Namely, the CPU 10 constructs a three-dimensional game space and locates objects in the game space. The CPU 10 also sets a virtual camera at a predetermined position in the game space with a predetermined viewing direction. The predetermined position and the predetermined viewing direction are determined in advance.

Next in step S51, processing of setting the reference direction is executed. Specifically, the CPU 10 urges the player to perform an operation of setting the reference direction through display or the like. In accordance with this, the player holds the controller 7 with an arbitrary posture with respect to the indicated direction and performs an operation of setting the reference direction (for example, presses the A button). When this operation is performed, the CPU 10 calculates the reference direction based on the taken image obtained when the operation is performed, by substantially the same processing as in step S16. Data representing a vector indicating the calculated reference direction is stored on the main memory 13 as the reference direction data 68. In the third example, such processing in step S51 is executed before the processing of moving the virtual camera (steps S1 through S3).

After step S51, the processing in step S1 described above is executed, and then the operation state calculation processing in step S2 is executed. In the operation state calculation processing in the third example, the processing of calculating the distance between the two coordinate sets (step S19) is not executed. The operation state calculation processing in the third example is substantially the same as described above with reference to FIG. 12 except for step S19.

Figure 30:
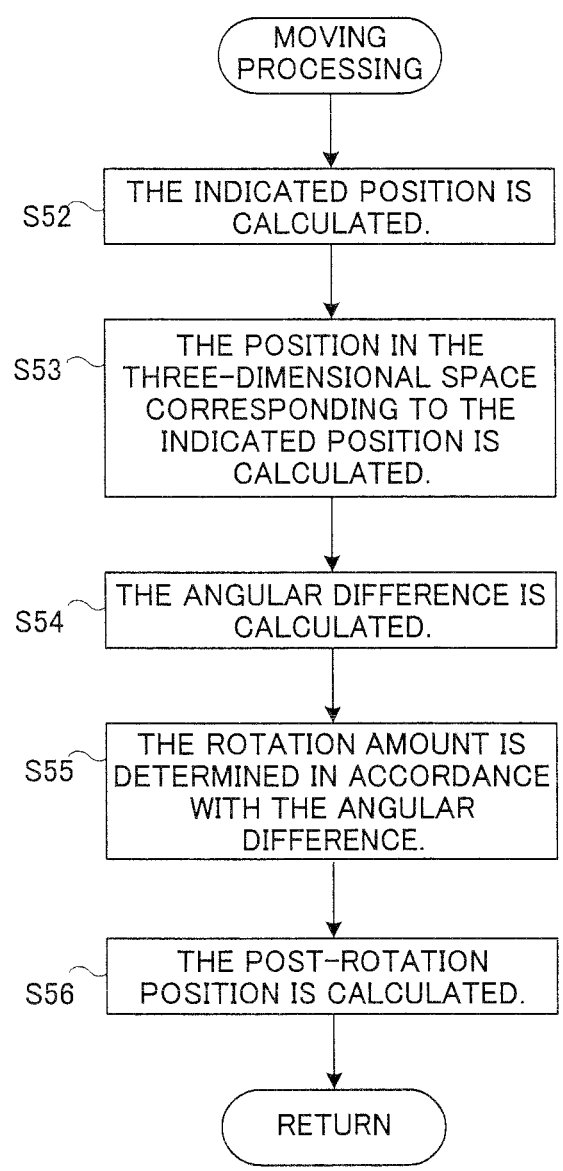
FIG. 30 is a flowchart illustrating a detailed flow of the moving processing in the third example.

Next, the moving processing in step S3 is executed. FIG. 30 is a flowchart illustrating a detailed flow of the moving processing in the third example. The moving processing in the third example is executed as follows. First in steps S52 and S53, a position of the central point around which the virtual camera moves is determined. First in step S52, the indicated position on the display screen is calculated. A method for calculating the indicated position (indicated coordinate set) is the same as described above regarding steps S46 and S22. Next in step S53, the corresponding coordinate set corresponding to the indicated coordinate set is calculated. In this example, the position of the corresponding coordinate set is the central position around which the virtual camera is moved. Specifically, the position of the corresponding coordinate set may be a three-dimensional position at which a target displayed at the indicated position on the display screen (for example, the ground) exists in the game space, or a three-dimensional position which is set based on the indicated position on the display screen and a predetermined depth direction (the viewing direction of the virtual camera). Data on the corresponding coordinate set calculated in step S53 is stored on the main memory 13 as the corresponding coordinate set data 67. The processing in steps S52 and S53 correspond to step S22 described above.

In steps S54 through S56, processing of rotating the virtual camera in a direction calculated in accordance with the rotation of the controller 7 around the indicated direction (i.e., rotating the virtual camera in the direction calculated in step S16). The processing in steps S54 through S56 corresponds to the processing in step S21 shown in FIG. 2. Hereinafter, specific processing in step S21 in the third example will be described.

First in step S54, the CPU 10 calculates an angle (angular difference) made by the direction calculated in step S16 and the reference direction. Specifically, the CPU 10 calculates an angle made by the vector represented by the reference direction data 67 stored on the main memory 13 and the vector represented by the direction data 57 in the operation state data 56. The obtained angle $\theta'$ is represented in the range of, for example, $-180° < \theta' \leq 180°$. Data on the calculated angular difference is stored on the main memory 13 as the direction processing data 61.

Next in step S55, the CPU 10 determines a rotation amount of the virtual camera (the rotation angle $\theta$ shown in FIG. 27) in accordance with the angle calculated in step S54. For example, the rotation amount of the virtual camera may be the calculated angle, or may be obtained by multiplying the calculated angle by a constant. The virtual camera as the operation target may be set to be rotated only when the angle is a predetermined value or greater. The CPU 10 rotates the virtual camera in a different direction when the calculated angle has a positive value from when the calculated angle has a negative value.

Next in step S56, a post-rotation position and posture of the virtual camera are calculated. Specifically, the CPU 10 calculates a position of the virtual camera after the virtual camera is rotated by the rotation amount determined in step S55 around the central position (the position of the corresponding coordinate set) determined in step S52. As described above, the direction of the virtual camera is controlled such that the point of attention is not changed from before the rotation. Data representing the position of the virtual camera calculated in step S56 is stored on the main memory 13 as the position data 66. Data representing the posture of the virtual camera calculated in step S56 is stored on the main memory 13 as the posture data 65. After step S56, the CPU 10 terminates the moving processing.

In step S4, the display processing is executed using the position and the posture (the viewing direction) of the virtual camera which has been moved in step S3. Namely, an image of the game space seen from the post-movement virtual camera is generated, and the generated image is displayed on the display screen. The processing in step S5 is substantially the same as described above with reference to FIG. 12.

As described above, in the third example, the operation target may be rotated using the direction obtained from the taken image (the direction calculated in step S16) or may be rotated using the angular difference between the direction obtained from the taken image and the reference direction. The center of the rotation may be designated by the player by performing the position designation operation. In other embodiments, the point of attention of the virtual camera may be the center of the rotation. The direction of the virtual camera may be moved such that the corresponding coordinate set corresponding to the indicated coordinate set is the point of attention, in which case the virtual camera is moved on an arc around the point of attention as the center of rotation while the point of attention is fixed. In this case, both the point of attention and the direction of the virtual camera can be simultaneously set. Alternatively, only the posture (direction) of the virtual camera may be changed in accordance with the angular difference without changing the position of the virtual camera.

In the third example, the virtual camera is rotated based on the angular difference. Even in the case where an object appearing in the game space is the operation target, the object can be rotated based on the angular difference. For example, the objects described in the first and second examples (the player object 71 and the key 76) may be rotated based on the angular difference. The virtual camera may be rotated based on a calculation using the direction obtained from the taken image itself, instead of the angular difference.

In other embodiments, an object appearing in the game space may be set as the operation target and translated to the position of the corresponding coordinate set and rotated in the direction represented by the direction data 57.

In the third example, the difference between the direction represented by the direction data 57 and the reference direction is calculated as the angular difference. Alternatively, the difference between the vector represented by the direction data 57 and the vector representing the reference direction may be calculated as a vector. The value of a predetermined component of the calculated vector may be used instead of the angular difference. Thus, the processing cost of calculating the angular difference can be alleviated while allowing controls to be performed based on the inclination of the controller 7.

Fourth Example

Figure 31:
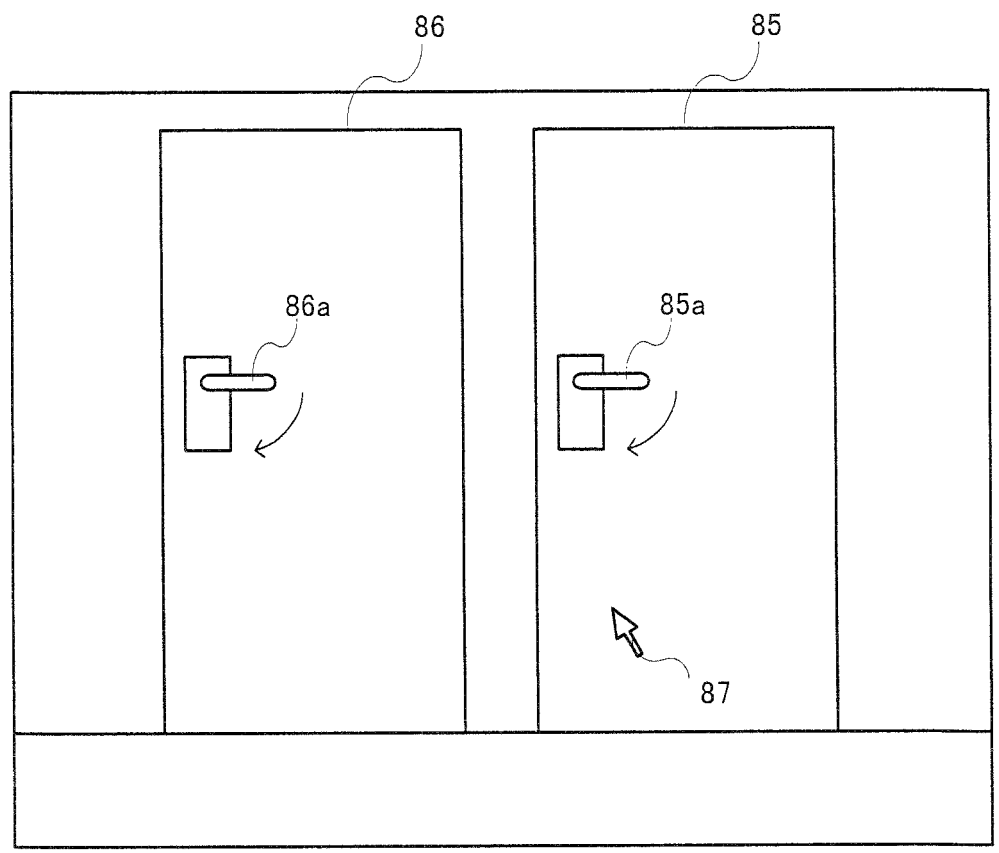
FIG. 31 shows an example of a game screen in a fourth example.

FIG. 31 shows an example of a game screen in a fourth example. FIG. 31 shows a game scene in which the player can open the door in the game space. In FIG. 31, a three-dimensional game space is constructed, and two doors 85 and 86 are located in the game space. The door 85 has a door knob 85a, and the door 86 has a door knob 86a. In this example, the two door knobs 85a and 86a are objects, each of which can be an operation target.

On the display screen, a cursor 87 movable by the player is displayed. The player operates the controller 7 to move the cursor 87. The cursor 87 is displayed at the indicated position. The player can use the cursor 87 to designate the object to be set as the operation target (the door knob 85a or 86a). In this example, the object designated by the cursor 87 can be the operation target of the rotation operation.

Next, the game processing in the fourth example will be described in detail. In the fourth example, the operation target data 64 is not stored at the start of the game. The door knobs which can be the operation target is only rotatable and does not move, and therefore the operation target data 64 does not include the position data 66 in the fourth example. In this example, the length data 59 in the operation state data 56 shown in FIG. 11 is not necessary for the game processing and is not stored on the main memory 13. The direction processing data 61 and the distance data 63 in the operation processing data 60 shown in FIG. 11 are not necessary for the game processing and are not stored on the main memory 13.

Figure 32:
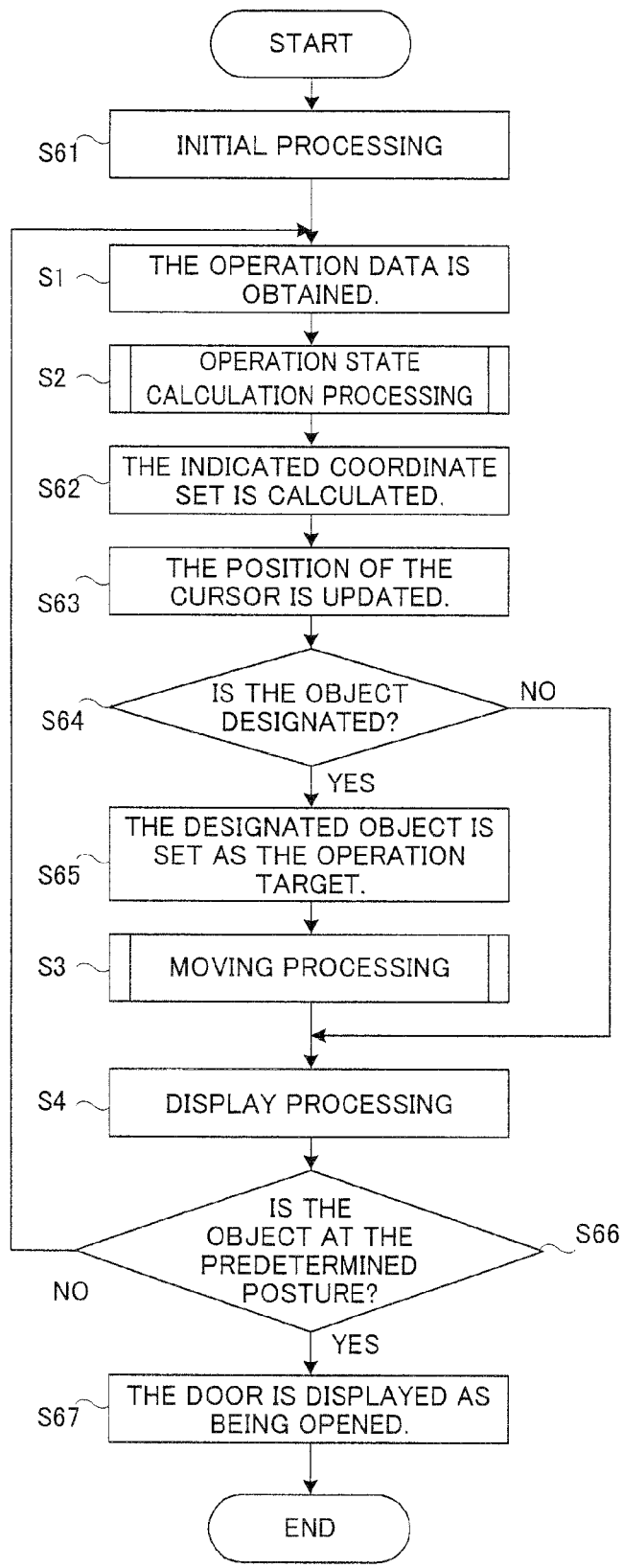
FIG. 32 is a flowchart illustrating a flow of game processing in the fourth example.

FIG. 32 is a flowchart illustrating a flow of the game processing in the fourth example. In FIG. 32, substantially the same steps as those in the game processing shown in FIG. 12 bear the same step numbers, and detailed descriptions thereof will be omitted. The processing until the processing in the flowchart shown in FIG. 32 is started is the same as in the case of FIG. 12.

The game processing in the fourth example is executed as follows. First in step S61, initial processing is executed. In the initial processing, the CPU 10 displays a game screen in an initial state. Namely, a three-dimensional game space is constructed, and the doors 85 and 86 and the like are located. The cursor 87 is displayed at a predetermined position on the display screen.

After step S61, the processing in step S1 described above is executed, and then the operation state calculation processing in step S2 is executed. In the operation state calculation processing in the fourth example, the processing of calculating the distance between the two coordinate sets (step S19) is not executed. The operation state calculation processing in the fourth example is substantially the same as described above with reference to FIG. 12 except for step S19.

In the fourth example, after step S2, processing in step S62 is executed. In the step S62, the indicated position is calculated. The processing in step S62 is substantially the same as in step S46. Data on the coordinate set representing the indicated position (indicated coordinate set) is stored on the main memory 13 as the indicated coordinate set data 62. Next in step S63, the position of the cursor 87 is updated in accordance with the indicated coordinate set. The position of the cursor 87 is determined as the position of the indicated coordinate set.

In step S64, it is determined whether or not the cursor 87, the position of which was updated in step S63, designates an object which can be the operation target (the door knob 85a or 86a). Namely, it is determined whether or not the position indicated by the cursor 87 is a display position of the door knob 85a or 86a (i.e., whether or not the cursor 87 is in a predetermined range from the display position of the door knob 85a or 86a). When it is determined in step S64 that the cursor 87 designates an object, processing in step S65 is executed. When it is determined in step S64 that the cursor 87 does not designate an object, the processing in steps S65 and S3 is skipped and the processing in step S4 is executed.

In step S65, the object which is determined to be designated by the cursor 87 in step S64 is set as the operation target. Specifically, data representing a posture of such an object is stored on the main memory 13 as the posture data 65 in the operation target data 64.

In step S3, the moving processing is executed. In the moving processing in the fourth example, as described above, the processing of rotating the operation target (step S21) in a direction calculated in accordance with the rotation of the controller 7 around the indicated direction as an axis (around the direction calculated in step S16) is executed. In the fourth example, the operation target is the object, the posture of which is stored on the main memory 13 as the operation target data 64, i.e., the door knob designated by the cursor 87.

In step S4, the display processing is executed. Specifically, the cursor 87 is displayed at the position updated in step S63. In the case where the processing in step S3 is executed, the door knob 85a or 86a is displayed as being rotated. Next in step S66, it is determined whether or not either the door knob 85a or 86a assumes a predetermined posture. This determination is substantially the same as the processing in step S43 in the second example. When it is determined in step S66 that either the door knob 85a or 86a assumes the predetermined posture, processing in step S67 is executed. When it is determined in step S66 that neither the door knob 85a nor the door knob 86a assumes the predetermined posture, the processing returns to step S1 and the above-described processing is repeated. In step S67, the door having the door knob assuming the predetermined posture is displayed on the display screen as being opened.

As described above, in the fourth example, the operation target which is to be rotated by the player is not limited to a predetermined object and may be an object designated by the player. Alternatively, an object as the operation target may be designated using the indicated position by the controller 7.

In the fourth example, a position on the display screen is designated by the controller 7 to move the cursor to the position, and thus the door knob as the operation target is selected. In other embodiments, any method is usable for designating the position on the display screen. For example, the cursor may be moved by a cross key provided on the controller 7.

In the fourth example, the cursor 87 is set on the display screen and moves on the two-dimensional plane of the display screen. In other embodiments, the cursor 87 may be movable in a three-dimensional game space. The cursor 87 may be moved in the three-dimensional game space in, for example, the same manner as with the virtual camera in the third example. The door knob may be set to be rotatable only when the position of the cursor 87 in the Z-axis direction matches the position of the door knob in the Z-axis direction (or when the distance between the two positions is within a predetermined distance). In this case, the CPU 10 determines whether or not there is any object (door knob) which can be the operation target at the Z-axis direction position of the coordinate set of the cursor 87. When it is determined that there is an object, the object is set as the operation target.

Other Examples

Other non-limiting illustrative embodiments may be usable with various games other than those described above. For example, one non-limiting illustrative embodiment may be applicable to a racing game. Specifically, the racing car operated by the player is set as the operation target, and the direction of the racing car seen from the above is changed by rotating the racing car in accordance with the rotation of the controller 7 around the indicated direction as an axis. Namely, the driving direction of the racing car is changed. Thus, the racing car rotates as shown in FIG. 17A or FIG. 17C. The player can change the driving direction of the racing car by rotating the controller 7 as if he/she was turning the steering wheel of an actual automobile. The player can intuitively operate the racing car.

In the above description, the information processing system and the program may be realized as a game system and a game program. However, other non-limiting illustrative embodiments may be applicable to any information processing system using an input device for determining the position or direction of the input device itself using a taken image.

A non-limiting illustrative embodiment provides a novel operation of an information processing system using an input device which is used by the user while being held in his/her hand, and is applicable to a game apparatus or a game program, for example.

While the non-limiting illustrative embodiments have been described in detail, the foregoing description is in all aspects illustrative and not restrictive. It is understood that numerous other modifications and variations can be devised to form yet more non-limiting illustrative embodiments. The invention is intended to be defined by the claims and to cover all corresponding and equivalent arrangements whether or not specifically disclosed herein.

The invention claimed is:

1. An information processing system comprising:
   a user input device that includes:
      an imager that is configured to obtain an image; and
      an inertial sensor that is configured to measure an inertial quantity that is applied to the user input device;
   a processing system that includes at least one processor, the processing system configured to:
      identify a predetermined target within the obtained image;
      rotate a computer generated object in response to the identified predetermined target and the measured inertial quantity;
      output a display to a display device based on the rotated computer generated object.

2. The information processing system of claim 1, wherein the predetermined target includes at least two predetermined targets and the processing system is further configured to identify positions within the obtained image that correspond to the at least two predetermined targets.

3. The information processing system of claim 2, wherein the processing system is further configured to calculate positions of the at least two predetermined targets in at least two obtained images, wherein rotation of the computer generated object is based on a change in position of the at least two predetermined targets between the at least two obtained images.

4. The information processing system of claim 1, wherein the processing system is further configured to rotate the computer generated object based on the measured inertial quantity when the predetermined target is not identified.

5. The information processing system of claim 4, wherein the processing system is further configured to rotate the computer generated object based on the obtained image when the predetermined target is identified and without measured inertial quanity.

6. The information processing system of claim 1, wherein the inertial sensor is an acceleration sensor and the inertial quantity is acceleration.

7. The information processing system of claim 1, wherein the inertial sensor is a gyro sensor and the inertial quantity is velocity.

8. The information processing system of claim 1, wherein the processing system is further configured to determine an up/down direction of the user input device based on the measured inertial quantity,
   wherein identification of the predetermined target within the obtained image is further based on the determined up/down direction.

9. The information processing system of claim 1, wherein the computer generated object is a virtual camera and the display is based on a view through the virtual camera.

10. A method of rotating an object in a virtual space based on input from a user input device, the user input device including a camera and at least one inertial sensor, the method comprising:

generating a first image based on the object of the virtual space being in a first orientation;
outputting the first image to a display device;
obtaining at least one image via the camera of the user input device;
measuring an inertial quantity, via the at least one inertial sensor, that is applied to the user input device;
identifying a target within the obtained at least one image;
rotating, via a processing system that includes at least one processor, the object from the first orientation to a second orientation based on identification of the target within the image and the measured inertial quantity;
generating a second image based on the object of the virtual space being in the second orientation; and
outputting the second image to the display device.

11. The method of claim 10, further comprising rotating the object of the virtual space to a third orientation based on another measured inertial quantity when the target is not identified with the at least one image.

12. The method of claim 10, further comprising determining whether the user input device is oriented upwards or downwards based on the measured inertial quantity,
wherein the identification of the target is further based on determination of whether the user input device is oriented upwards or downwards.

13. The method of claim 10, wherein the object is a virtual camera and the generated first and second images are generated based on views from the virtual camera.

14. A user input device adapted to supply input to rotate a virtual object that is processed by a processing system and output to a display device, the user input device comprising:
an imager that is configured to obtain an image;
an inertial sensor that is configured to measure an inertial quantity that is applied to the user input device; and
a communication device that is configured to at least transmit data to the processing system that is based on the obtained image and the measured inertial quantity,
wherein at least one processor is configured to identify a predetermined target within the image obtained by the imager,
wherein the processing system is configured to rotate the virtual object from a first state to a second state based on identification of the predetermined target within the image and the measured inertial quantity,
wherein the processing system is further configured to output an image to the display device based on rotation of the virtual object by the processing system.

15. The user input device of claim 14, further comprising the at least one processor.

16. The user input device of claim 14, wherein the processing system includes the at least one processor.

17. The user input device of claim 14, wherein the processing system is further configured to rotate the virtual object based on another measured inertial quantity without identification of the predetermined target within the image.

18. The user input device of claim 14, wherein the inertial sensor is a gyro sensor or an acceleration sensor.

19. A computing apparatus for rotating a virtual object, the computing apparatus being configured to receive data from an input device, the input device including an imager that is configured to obtain an image and at least one inertial sensor that is configured to measure an inertial quantity that is applied to the input device, the computing apparatus comprising:
a receiver that is configured to receive data that is transmitted from the input device, the received data based on the image obtained by the imager of the input device and the measured inertial quantity; and
a processing system that includes at least one processor, the processing system configured to:
rotate the virtual object from a first rotational state to a second rotational state based on: 1) identification of a predetermined target within the obtained image, and 2) the measured inertial quantity; and
output a display image to a display device based on the rotated virtual object.

20. The computing apparatus of claim 19, wherein the processing system is further configured to identify the predetermined target within the obtained image based on the received data.

21. The computing apparatus of claim 20, wherein the received data includes the obtained image.

22. The computing apparatus of claim 19, wherein the user input device is further configured to include at least one processor that is configured to identify the predetermined target within the image obtained by the imager.

23. The computing apparatus of claim 19, wherein the processing system is further configured to rotate the virtual object to a third rotational state based on another measured inertial quantity when the predetermined target is not identified in another obtained image.

24. The computing apparatus of claim 19, wherein the processing system is further configured to determine an up/down direction of the input device based on the measured inertial quantity,
wherein identification of the predetermined target is further based on the determined up/down direction of the input device.

25. The computing apparatus of claim 19, wherein the virtual object is a virtual camera.

26. The computing apparatus of claim 19, wherein the virtual object is an object that is displayed on the display device.

* * * * *